United States Patent
Park et al.

(10) Patent No.: US 9,733,752 B2
(45) Date of Patent: Aug. 15, 2017

(54) MOBILE TERMINAL AND CONTROL METHOD THEREOF

(71) Applicant: LG Electronics Inc., Seoul (KR)

(72) Inventors: Jongseok Park, Seoul (KR); Jaeyoung Ji, Seoul (KR); Younghoon Lee, Seoul (KR); Byoungzoo Jeong, Seoul (KR); Nayeoung Kim, Seoul (KR); Gijae Yi, Seoul (KR); Jinhae Choi, Seoul (KR); Youngjoon Kim, Seoul (KR); Yoonchan Won, Seoul (KR); Hangshin Cho, Seoul (KR); Soohyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/795,658

(22) Filed: Jul. 9, 2015

(65) Prior Publication Data

US 2015/0309657 A1    Oct. 29, 2015

Related U.S. Application Data

(63) Continuation of application No. 14/181,326, filed on Feb. 14, 2014, now Pat. No. 9,111,076.

(30) Foreign Application Priority Data

Nov. 20, 2013  (KR) .................. 10-2013-0141700
Nov. 28, 2013  (KR) .................. 10-2013-0146681
Dec. 5, 2013   (KR) .................. 10-2013-0150977

(51) Int. Cl.
G06F 3/14     (2006.01)
G06F 3/0488   (2013.01)
(Continued)

(52) U.S. Cl.
CPC .......... *G06F 3/0416* (2013.01); *G06F 3/041* (2013.01); *G06F 3/0412* (2013.01);
(Continued)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS 6,144,293 A    11/2000  Plaschko et al.
6,927,668 B1   8/2005   Odle et al.
(Continued)

FOREIGN PATENT DOCUMENTS

EP    0 803 623 A1    10/1997
EP    0 976 897 A1     2/2000
(Continued)

OTHER PUBLICATIONS

Tysen, "Unlock Android phone after too many pattern attempts," Jan. 8, 2010, XP55056490, pp. 1-18, http://einartysen.se/unlock-android-phone-after-too-many-pattern-attempts/.

*Primary Examiner* — Kent Chang
*Assistant Examiner* — William Lu
(74) *Attorney, Agent, or Firm* — Birch, Stewart, Kolasch & Birch, LLP

(57) ABSTRACT

A mobile terminal including a touch screen configured to switch between an inactivated state in which illumination is not applied to the touch screen and an activated state in which illumination is applied to the touch screen, and a controller configured to release a locked state of the mobile terminal and switch the touch screen to the activated state, when a plurality of touch inputs is input in the inactivated state and the plurality of touch inputs matches a predefined (Continued)

pattern. Further, the predetermined pattern is initially set using a quadrant image displayed on the touch screen in the activated state, touch inputs for setting the predetermined pattern are applied to at least one of quadrant I, II, III and IV included in the quadrant image displayed on the touch screen in the activated state of the touch screen, a first touch input included in the plurality of touch inputs in the inactivated state is applied to the touch screen, and quadrant areas on the touch screen for receiving the plurality of touch inputs in the inactivated state change based on a first touch position of the first touch input and a second touch position of a second touch input of the plurality of touch inputs in the inactivated state.

16 Claims, 45 Drawing Sheets

(51) Int. Cl.
*G06F 3/041* (2006.01)
*H04M 1/725* (2006.01)
*G06F 21/31* (2013.01)
*G06F 21/36* (2013.01)
*G06K 9/00* (2006.01)
*G06K 9/48* (2006.01)

(52) U.S. Cl.
CPC ...... *G06F 3/04883* (2013.01); *G06F 3/04886* (2013.01); *G06F 21/31* (2013.01); *G06F 21/36* (2013.01); *G06K 9/00355* (2013.01); *G06K 9/481* (2013.01); *G06F 2203/04101* (2013.01); *G06F 2203/04104* (2013.01); *G06F 2203/04803* (2013.01); *G06F 2203/04808* (2013.01)

(56) References Cited

U.S. PATENT DOCUMENTS

| | | | |
|---|---|---|---|
| 7,593,000 B1* | 9/2009 | Chin | G06F 21/32 345/156 |
| 8,385,885 B2 | 2/2013 | Hainzl | |
| 8,489,150 B2* | 7/2013 | Lee | H04M 1/67 340/571 |
| 8,816,985 B1* | 8/2014 | Tate | G06F 3/041 345/173 |
| 9,442,624 B2* | 9/2016 | Yang | G06F 21/31 |
| 9,471,270 B2* | 10/2016 | Lee | G06F 3/0416 |
| 9,495,058 B2* | 11/2016 | Lee | G06F 3/041 |
| 2004/0155752 A1* | 8/2004 | Radke | G06K 9/00013 340/5.53 |
| 2006/0145825 A1 | 7/2006 | Mc Call | |
| 2008/0001927 A1* | 1/2008 | Yoshida | G06F 3/0488 345/173 |
| 2008/0104547 A1 | 5/2008 | Morita et al. | |
| 2009/0284482 A1* | 11/2009 | Chin | G06F 3/04883 345/173 |
| 2009/0322688 A1* | 12/2009 | Ording | G06F 3/04886 345/173 |
| 2009/0322700 A1* | 12/2009 | D'Souza | G06F 3/045 345/174 |
| 2010/0109838 A1 | 5/2010 | Fisher | |
| 2010/0269040 A1 | 10/2010 | Lee | |
| 2011/0006996 A1 | 1/2011 | Smith et al. | |
| 2011/0053641 A1* | 3/2011 | Lee | G06F 1/1626 455/556.1 |
| 2011/0081889 A1 | 4/2011 | Gao et al. | |
| 2011/0256848 A1* | 10/2011 | Bok | G06F 3/04883 455/411 |
| 2011/0279384 A1 | 11/2011 | Miller et al. | |
| 2011/0300831 A1* | 12/2011 | Chin | G06F 1/3203 455/411 |
| 2011/0316797 A1* | 12/2011 | Johansson | G06F 3/04847 345/173 |
| 2012/0036556 A1 | 2/2012 | LeBeau et al. | |
| 2012/0052817 A1 | 3/2012 | Lee et al. | |
| 2012/0105357 A1* | 5/2012 | Li | G06F 3/044 345/174 |
| 2012/0146927 A1* | 6/2012 | Chang | G06F 3/04886 345/173 |
| 2012/0154303 A1* | 6/2012 | Lazaridis | G06F 1/3203 345/173 |
| 2012/0191993 A1* | 7/2012 | Drader | G06F 1/3215 713/320 |
| 2012/0274604 A1* | 11/2012 | Norton | H03K 17/962 345/174 |
| 2012/0306927 A1* | 12/2012 | Lee | G06F 3/041 345/660 |
| 2013/0042209 A1 | 2/2013 | de Léon | |
| 2013/0067566 A1 | 3/2013 | Oh | |
| 2013/0100044 A1* | 4/2013 | Zhao | G06F 1/1694 345/173 |
| 2013/0278520 A1* | 10/2013 | Weng | G06F 3/041 345/173 |
| 2013/0285934 A1* | 10/2013 | Ting | G06F 3/04883 345/173 |
| 2013/0290761 A1* | 10/2013 | Moon | G06F 1/3215 713/323 |
| 2013/0293484 A1* | 11/2013 | Singh | G06F 3/0416 345/173 |
| 2013/0314331 A1* | 11/2013 | Rydenhag | G06F 3/04883 345/173 |
| 2013/0332354 A1* | 12/2013 | Rhee | G06Q 20/085 705/41 |
| 2014/0022190 A1* | 1/2014 | Tokutake | G06F 1/3262 345/173 |
| 2014/0132508 A1* | 5/2014 | Hodge | G06F 3/013 345/156 |
| 2014/0143859 A1* | 5/2014 | Linge | G06F 21/36 726/19 |
| 2014/0160081 A1* | 6/2014 | Jansson | G06F 3/042 345/175 |
| 2014/0253461 A1* | 9/2014 | Hicks | G06F 1/3215 345/173 |

FOREIGN PATENT DOCUMENTS

| | | |
|---|---|---|
| EP | 1 571 601 A2 | 9/2005 |
| EP | 1 970 265 A2 | 9/2008 |
| EP | 2 463 798 A1 | 6/2012 |
| EP | 2 528 010 A1 | 11/2012 |
| EP | 2 610 727 A2 | 7/2013 |
| JP | 2008-296607 A | 12/2008 |
| JP | 2009-127252 A | 6/2009 |
| WO | WO 2010/043277 A1 | 4/2010 |
| WO | WO 2013/152558 A1 | 10/2013 |

* cited by examiner

FIG. 10B
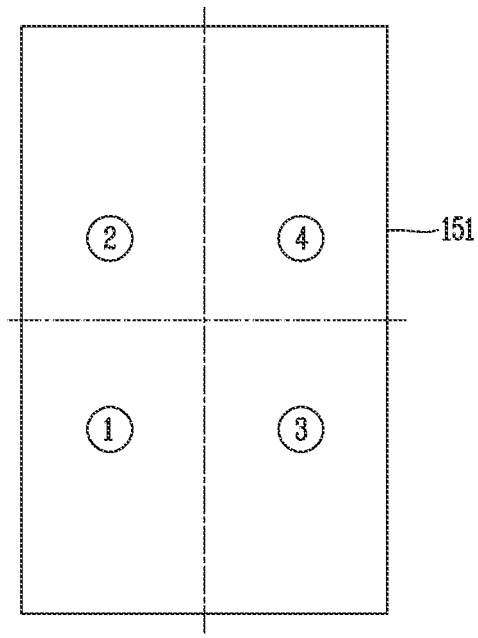
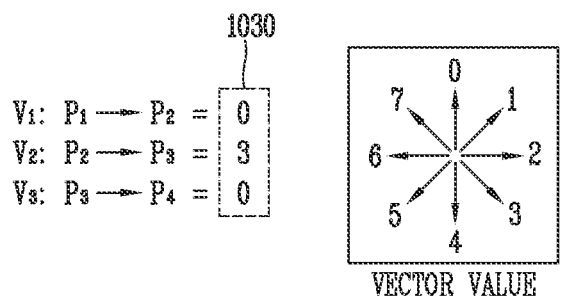

FIG. 11
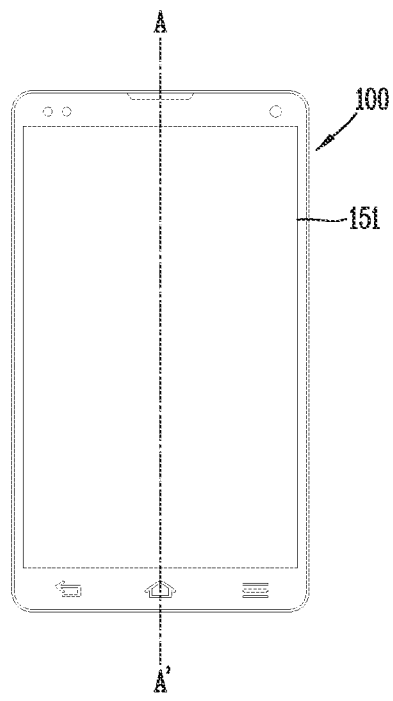
(a)
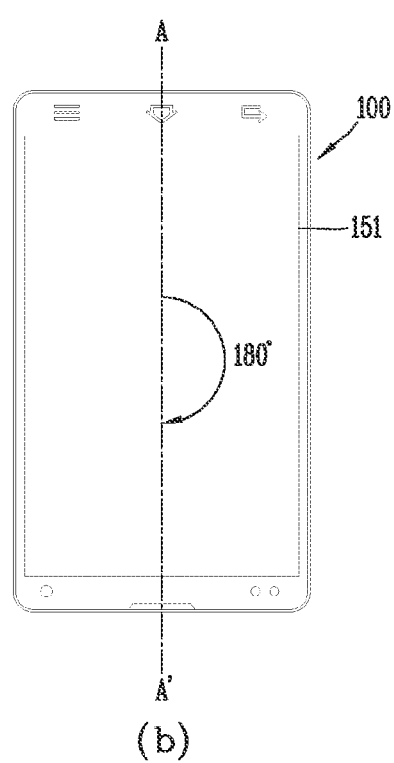
(b)
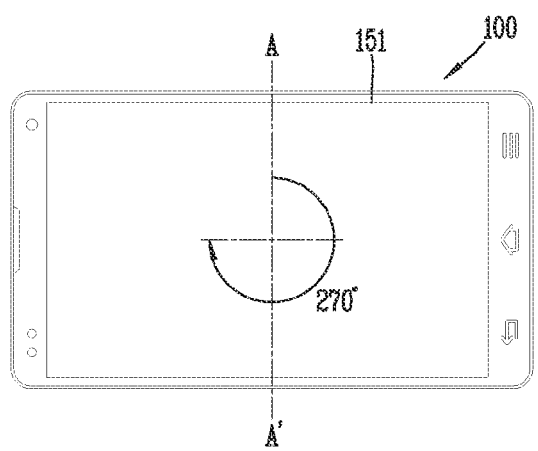
(d)
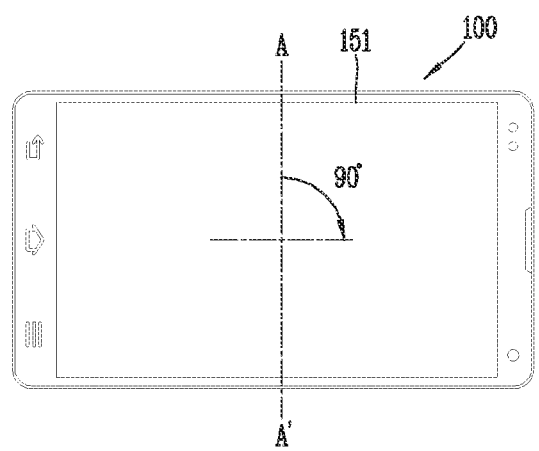
(c)

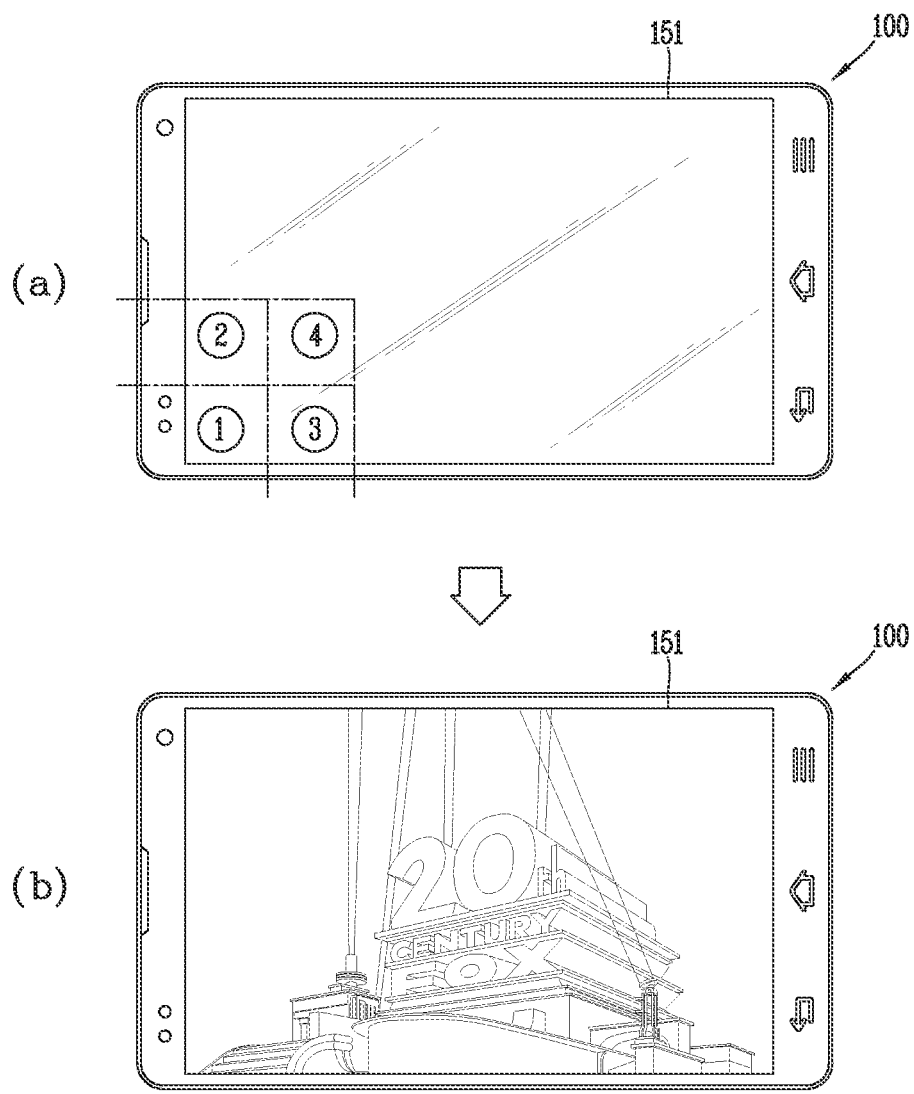

FIG. 24
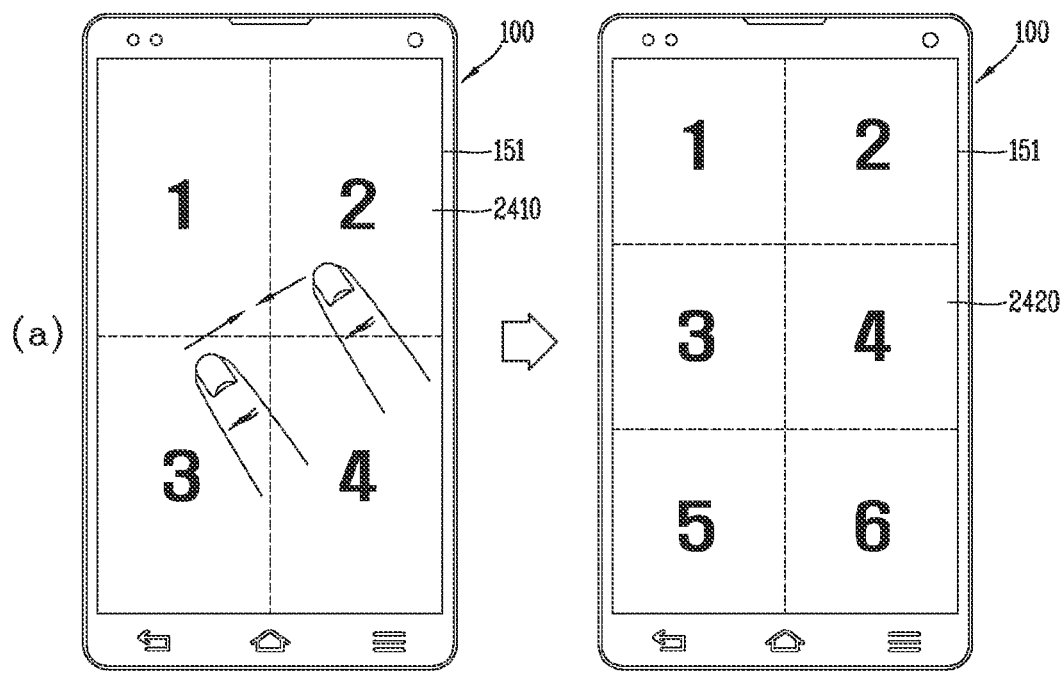
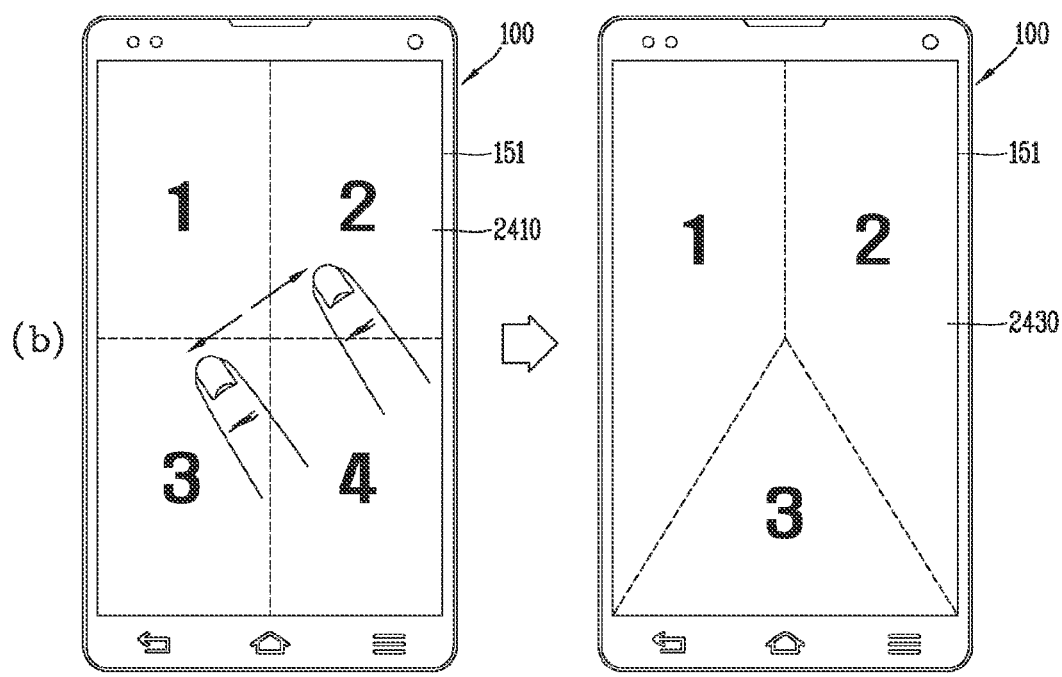

FIG. 28B
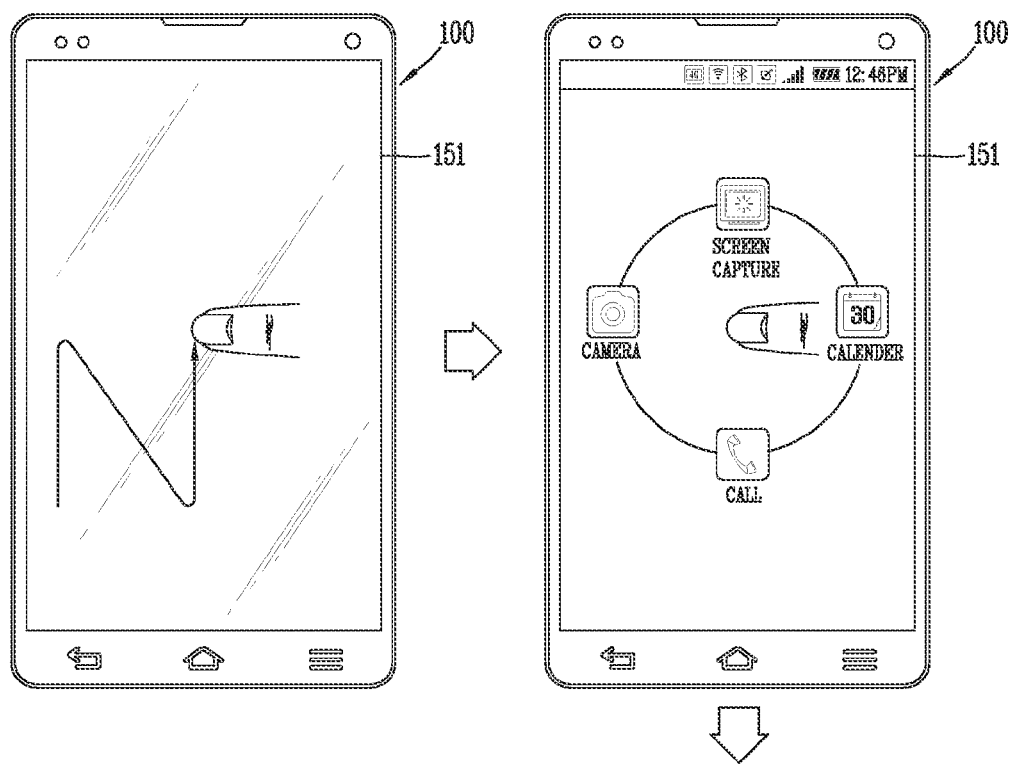
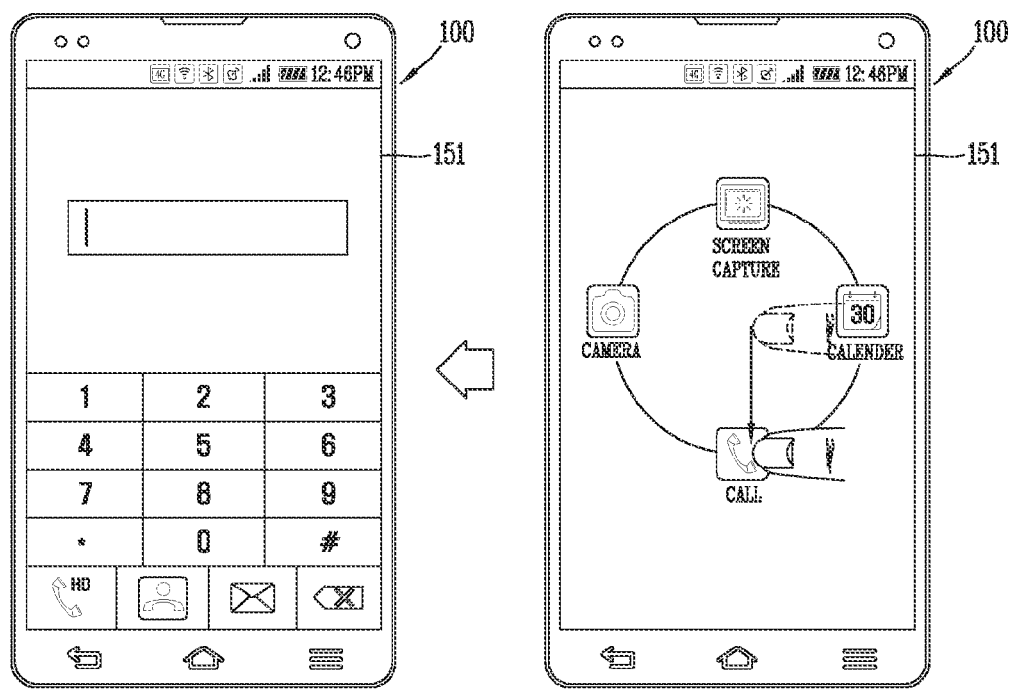

⇒ PLAY NEXT SONG

⇒ PLAY PREVIOUS SONG

MOBILE TERMINAL AND CONTROL METHOD THEREOF

CROSS-REFERENCE TO RELATED APPLICATION

This application is a continuation of U.S. application Ser. No. 14/181,326 filed on Feb. 14, 2104, which claims the benefit of earlier filing date and right of priority to Korean Application No. 10-2013-0141700, filed on Nov. 20, 2013, Korean Application No. 10-2013-0146681, filed on Nov. 28, 2013 and Korean Application No. 10-2013-0150977, filed on Dec. 5, 2013. The contents of all of these applications are hereby incorporated by reference as fully set forth herein in their entirety.

BACKGROUND OF THE INVENTION

1. Field of the Invention

The present disclosure relates to a mobile terminal, and particularly, to a mobile terminal capable of sensing taps applied onto a display unit in a deactivated state of the display unit.

2. Discussion of the Related Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

Recently, a new user interface, which can simply control functions of the mobile terminal even in a deactivated state of a display unit, is much required.

SUMMARY OF THE INVENTION

Therefore, an aspect of the detailed description is to provide a mobile terminal capable of sensing a tap applied onto a display unit in a deactivated display unit, and a method for controlling the same.

Another aspect of the detailed description is to provide a mobile terminal capable of converting a locked state into a released state using a motion pattern directly set by a user, and a method for controlling the same.

To achieve these and other advantages and in accordance with the purpose of this specification, as embodied and broadly described herein, there is a mobile terminal, comprising: a terminal body, a display unit disposed on a front surface of the terminal body, a sensing unit configured to sense a plurality of taps on the display unit in a deactivated state of the display unit and a controller configured to release a locked state for restricting reception of a user's control command, in response to reception of one of a plurality of release commands, configured to convert the deactivated state of the display unit into an activated state, and configured to display preset screen information on the display unit, wherein the plurality of release commands are defined by a user's motion pattern formed by sequentially connecting points of the sensed taps with one another.

In an embodiment of the present invention, the plurality of releases commands include a plurality of taps which form the motion pattern with a different size.

In an embodiment of the present invention, the plurality of release commands include a first release command and a second release command, and wherein the first release command corresponds to a plurality of taps which form a motion pattern of a first size, and the second release command corresponds to a plurality of taps which form a motion pattern of a second size different from the first size.

In an embodiment of the present invention, wherein a distance between an $n^{th}$ tap and an $n-1^{th}$ tap among the plurality of taps which form the motion pattern is variable according to the plurality of release commands.

In an embodiment of the present invention, wherein one of the plurality of release commands is a release command for entering a home screen page.

In an embodiment of the present invention, wherein the controller outputs different screen information according to one of the plurality of release commands.

In an embodiment of the present invention, wherein the plurality of release commands include a first release command and a second release command, wherein the first release command is defined as a motion pattern formed on the display unit with a size larger than a reference size, and the second release command is defined as a motion pattern formed on the display unit with a size smaller than the reference size, and wherein the controller displays a first screen in response to reception of the first release command, and displays a second screen different from the first screen in response to reception of the second release command.

In an embodiment of the present invention, wherein the second screen is a screen obtained by contracting the first screen with a predetermined ratio.

In an embodiment of the present invention, wherein a display position of the second screen is variable according to a region to which a motion pattern has been applied.

In an embodiment of the present invention, wherein the controller displays one or more graphic objects having different functions, around a position where a last tap has been sensed, in response to reception of one of the plurality of release commands.

In an embodiment of the present invention, wherein upon detection of a drag input which starts from the last tap toward one of the graphic objects, the controller performs a function corresponding to said one graphic object.

In an embodiment of the present invention, wherein the controller determines an execution of a specific function based on a graphic object corresponding to a sensed drag input direction when a drag input started from a touch corresponding to the last tap is sensed toward any one of the graphic objects, and displays graphic objects corresponding to specific operations, respectively, that can be executed using the specific function adjacent to a location at which the drag input is on hold when the drag input is on hold in a state that the execution of the specific function is determined, and performs the any one specific operation when a drag input toward any one of graphic objects corresponding to the specific operations, respectively, is extended from the hold location.

In an embodiment of the present invention, wherein at least one of the one or more graphic objects is formed to process a plurality of functions at the same time, and the controller executes the plurality of functions at the same time, and partitions the display unit into a plurality of regions, and displays screen information corresponding to the concurrently executed functions in the plurality of partitioned regions, respectively, when a drag input started from a touch corresponding to the last tap is sensed toward a graphic object formed to process the plurality of functions at the same time.

In an embodiment of the present invention, wherein the controller executes one or more applications according to the drag input.

In an embodiment of the present invention, wherein if the sensed taps do not form the motion pattern, the controller maintains the deactivated state of the display unit and the locked state of the mobile terminal.

In an embodiment of the present invention, wherein if the number of taps which do not form the motion pattern is more than a preset number, the controller converts a deactivated state of the display unit into an activated state such that a password for releasing the locked state is input from a user, and displays a lock screen related to input of the password on the display unit.

In an embodiment of the present invention, wherein the controller outputs, to the lock screen, guidance information indicating that taps which do not form the motion pattern have been applied to the display unit.

In an embodiment of the present invention, wherein if the sensed taps do not form the motion pattern, the controller maintains the locked state, and wherein the controller outputs notification information indicating that the sensed taps do not form the motion pattern, in one of visible, tactile and audible manners.

In an embodiment of the present invention, the mobile terminal further comprising a light emitting unit configured to output the notification information in a visible manner, wherein if the sensed taps do not form the motion pattern, the controller turns on the light emitting unit for a predetermined time.

To achieve these and other advantages and in accordance with the purpose of this specification, as embodied and broadly described herein, there is also provided a mobile terminal, the mobile terminal comprising: a terminal body, a display unit disposed at a front surface of the body, a sensing unit configured to sense a tap hitting the body while the display unit is in an inactive state and a controller configured to release a lock state in which the reception of control command by a user is limited, switch the display unit from an inactive state to an active state, and display predetermined screen information on the display unit when the pattern of the sensed tap corresponds to a predetermined pattern.

To achieve these and other advantages and in accordance with the purpose of this specification, as embodied and broadly described herein, there is also provided a method for controlling a mobile terminal, the method comprising: sensing a plurality of taps on a display unit in a deactivated state of the display unit, releasing a locked state for restricting reception of a user's control command, in response to reception of one of a plurality of release commands, converting the deactivated state of the display unit into an activated state and displaying preset screen information on the display unit, wherein the plurality of release commands are defined by a user's motion pattern formed by sequentially connecting points of the sensed taps with one another.

In an embodiment of the present invention, wherein the plurality of release commands include a first release command and a second release command, and wherein the first release command corresponds to a plurality of taps which form a motion pattern of a first size, and the second release command corresponds to a plurality of taps which form a motion pattern of a second size different from the first size.

In an embodiment of the present invention, wherein the plurality of release commands include a first release command and a second release command, wherein the first release command is defined as a motion pattern formed on the display unit with a size larger than a reference size, and the second release command is defined as a motion pattern formed on the display unit with a size smaller than the reference size, and wherein in the step of displaying preset screen information on the display unit, a first screen is displayed if the first release command has been received, and a second screen different from the first screen is displayed if the second release command has been received.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 10A and 10B are conceptual views for explaining a method to sense a user's motion pattern by the components of FIG. 9;

FIGS. 11, 12A, 12B and 12C are conceptual views for explaining a method to control a mobile terminal with respect to a terminal posture according to an embodiment of the present invention;

FIGS. 23, 24 and 25 are conceptual views for explaining a method to set a motion pattern for releasing a locked state, in a mobile terminal according to an embodiment of the present invention;

FIGS. 28A and 28B are conceptual views for explaining a method of releasing a lock state by a motion pattern formed by a touch orbit which consecutively moves from a first point to a second point in a mobile terminal according to an embodiment of the present disclosure;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

Figure 1:
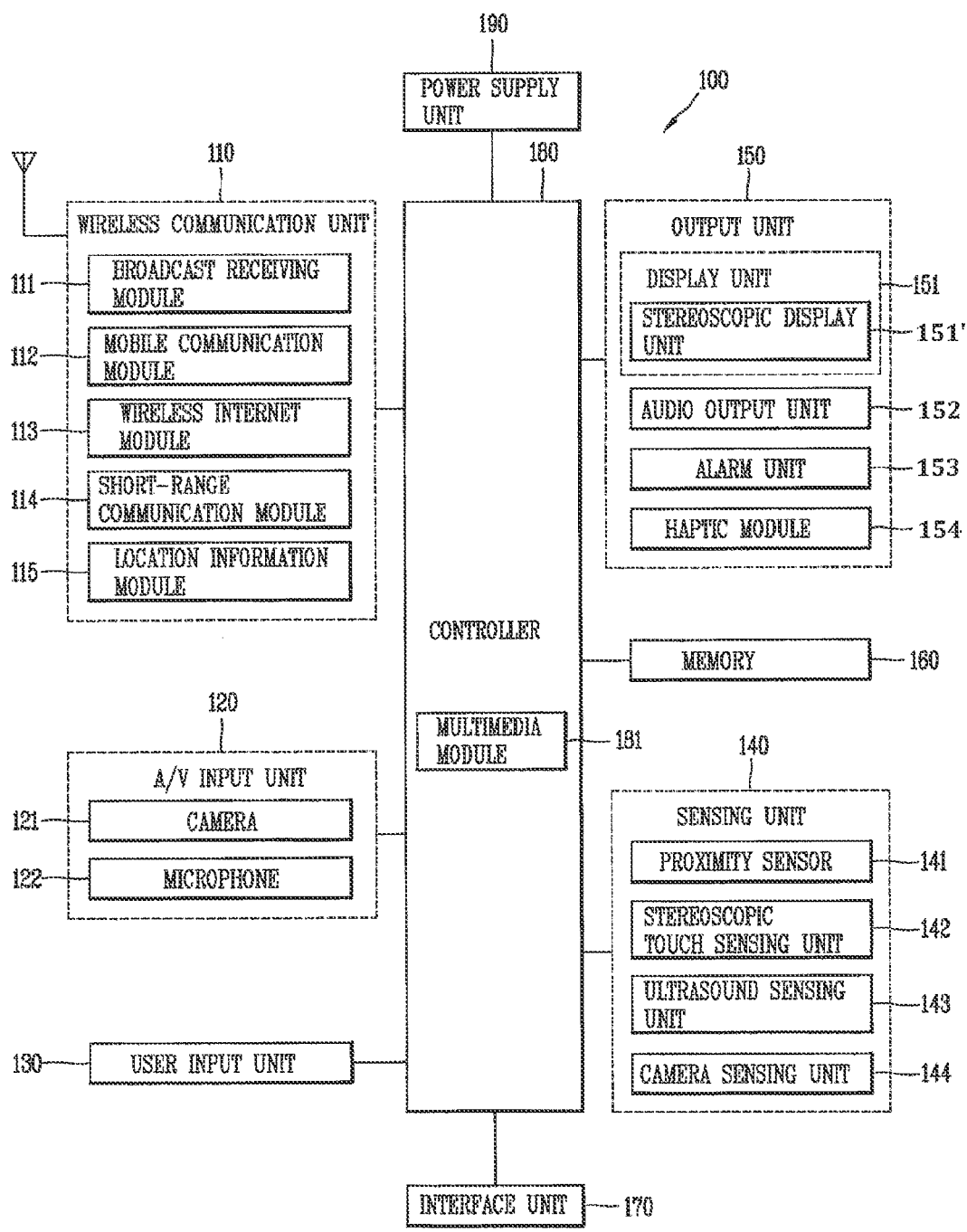
FIG. 1 is a block diagram of a mobile terminal according to an embodiment of the present invention.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output unit 152, an alarm unit 153, a haptic module 154, and the like. The display unit 151 may include a stereoscopic display unit 151'.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The touch screen functions as both an output component and an input component. For example, the touch screen may include a display unit (such as an LCD, OLED, LED, and the like) having a touch sensor (capacitive, resistive, temperature, and the like) overlaying at least a portion of the display unit. The front surface of the touch screen may be exposed at, substantially parallel to the front surface of the mobile terminal 100. A user of the mobile terminal 100 may interact with the touch screen by making contact with the front surface of the touch screen by a user's body part and/or an object controlled by the user.

The mobile terminal 100 may detect one or more taps at an outer surface of its housing followed by contact at its touch sensor. For some embodiments, the tap or taps must occur at a surface of the touch sensor, whereas the tap or taps may occur at another surface of the housing other than the touch sensor for other embodiments. The tap or taps and the subsequent contact must occur within a predetermined time period. For example, the predetermined time period may be a short period to time, such as one second or less.

Referring to FIG. 1, a proximity sensor 141 of the sensor unit 140 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The sensor unit 140 may also include a stereoscopic touch sensing unit 142, ultrasound sensing unit 143 and a camera sensing unit 144.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output unit 152 may output audio data received from the radio communication unit 110 or stored in the memory 160 in a call signal reception mode, a call mode, a record mode, a voice recognition mode, a broadcast reception mode, and the like. Also, the audio output unit 152 may provide audible outputs related to a particular function (e.g., a call signal reception sound, a message reception sound, etc.) performed in the mobile terminal 100. The audio output unit 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display unit 151 or the audio output unit 152. Therefore, the display unit 151 and the audio output unit 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And the controller 180 can control a locked screen displayed in the locked state, based on a touch input sensed by the display (hereinafter, will be referred to as 'touch screen' 151) in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
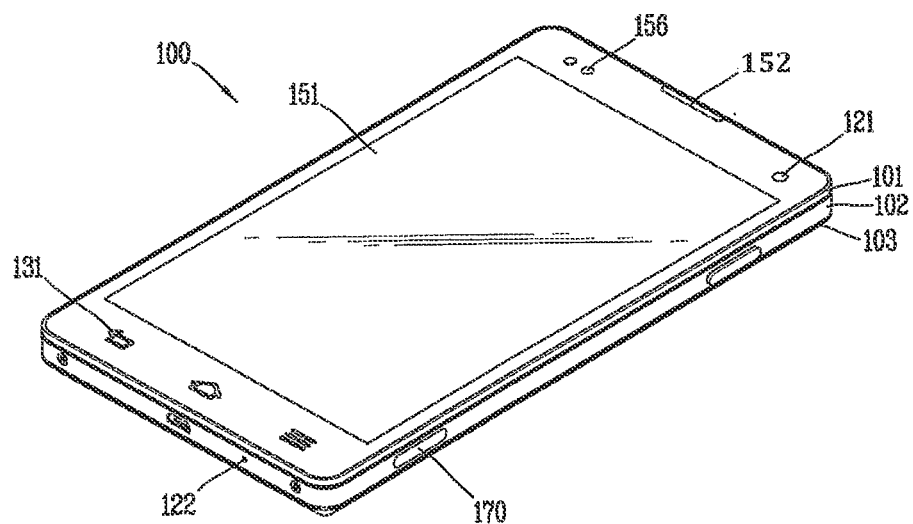
FIG. 2A is a front perspective view of a mobile terminal according to the present invention.
Figure 2B:
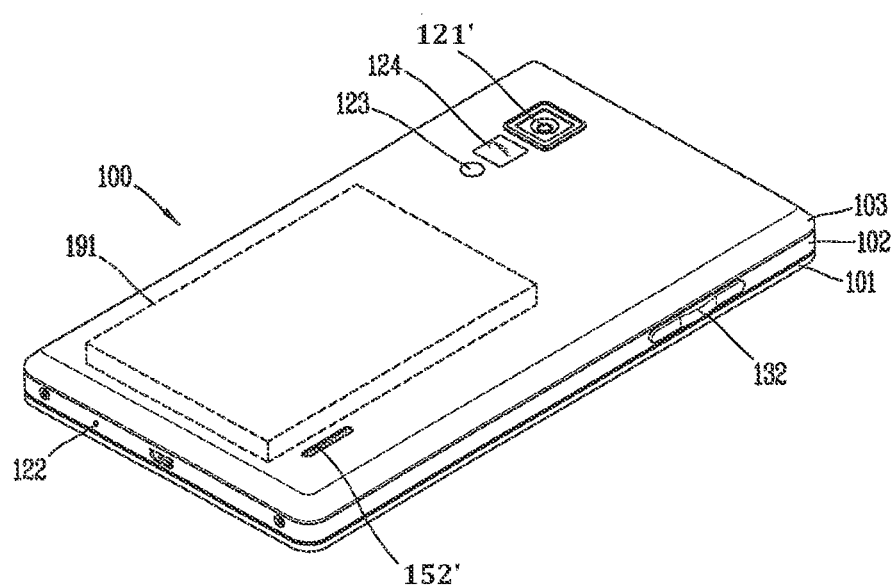
FIG. 2B is a rear perspective view of the mobile terminal of FIG. 2A.

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A terminal body 100 is provided with a front surface, a rear surface and side surfaces. The terminal body 100 is also provided with two ends in a lengthwise direction.

A case (casing, housing, cover, etc.) forming an outer appearance of the terminal body 100 may include a front case 101 and a rear case 102. A space formed by the front case 101 and the rear case 102 may accommodate various components therein. At least one intermediate case may further be disposed between the front case 101 and the rear case 102. The case may also include a rear case 103.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130, a microphone 122, an interface unit 170, a light emitting unit 156, etc.

The display unit 151 occupies most parts of a main surface of the front case 101. The audio output unit 152 and the camera 121 are arranged at a region adjacent to one end of the display unit 151, and the user input unit 130 and the microphone 122 are arranged at a region adjacent to another end of the display unit 151. The user input unit 130, the interface unit 170, etc. may be arranged on side surfaces of the front case 101 and the rear case 102. The microphone 122 is arranged at another end of the terminal body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

The light emitting unit 156 is arranged at an upper region of the front surface of the terminal body 100, and is provided with one or more light emitting diodes (LEDs). The light emitting unit 156 is configured to emit light in various manners under control of the controller 180. That is, a color of light, a period to flicker light on and off, a brightness of light, etc. may be changed.

Referring to FIG. 2B, an audio output unit 152' may be additionally arranged on a rear surface of the terminal body. The audio output unit 152' may cooperate with the audio output unit 152 (refer to FIG. 2A) so as to implement a stereo function. Also, the audio output unit may be configured to operate as a speakerphone.

A rear camera 121' may be additionally provided on the rear case 102. The rear camera 121' faces a direction which is opposite to a direction faced by the camera 121 (refer to FIG. 2A), and may have different pixels from the camera 121.

For example, the camera 121 may operate with relatively lower pixels (lower resolution). Thus, the camera 121 may be useful when a user can capture his face and send it to another party during a video call or the like. In this case, the camera 121 can reduce the size of transmission data. On the other hand, the camera 121' may operate with a relatively higher pixels (higher resolution) such that it can be useful for a user to obtain higher quality pictures for later use.

The cameras 121 and 121' may be installed at the terminal body 100 so as to rotate or pop-up. A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

A power supply unit 190 for supplying power to the mobile terminal 100 is mounted to the terminal body. The power supply unit 190 may be mounted in the terminal body or may be detachably mounted to the terminal body. The power supply unit 190 includes a battery 191.

A touch pad for sensing touch may be additionally mounted to the rear case 102. Like the display unit 151, the touch pad may be formed to be light-transmissive. If the display unit 151 is configured to output visual information from its two surfaces, the visual information is recognizable through the touch pad. Information output from two surfaces of the display unit 151 may be controlled by the touch pad. A display may be additionally mounted to the touch pad, and a touch screen may be arranged at the rear case 102.

The touch pad operates in association with the display unit 151 of the front case 101. The touch pad may be disposed on the rear surface of the display unit 151 in parallel. The touch pad may have a size equal to or smaller than that of the display unit 151.

In a mobile terminal according to an embodiment of the present disclosure including at least one of the foregoing constituent elements, the display unit has a sensing unit configured to sensing a tap hitting the body while the display unit is in an inactive state. Furthermore, when the pattern of a tap sensed by the sensing unit matches a predetermined pattern, the mobile terminal may release the lock state of the terminal, and activate the display unit, and display predetermined screen information on the display unit. The user may release the lock state of the mobile terminal with a simple gesture hitting an object. Accordingly, the user may skip the process of turning on the display unit and entering a password using a virtual keyboard.

Hereinafter, a mobile terminal and a control method thereof capable of providing a new user interface based on the pattern of a tap while the display unit is in an inactive state will be described in detail.

Figure 3:
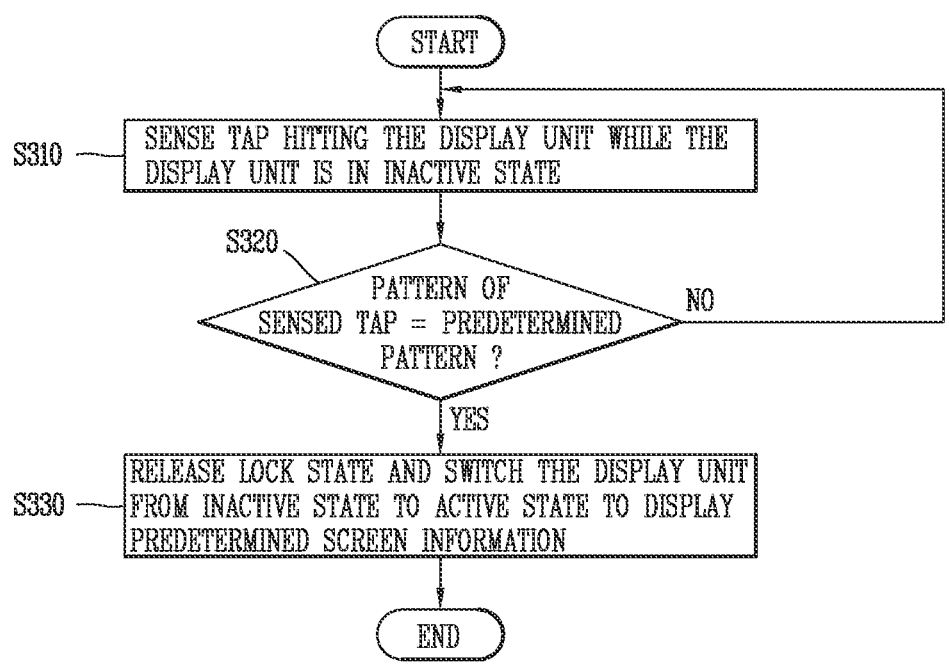
FIG. 3 is a flow chart for explaining a control method of a mobile terminal according to an embodiment of the present disclosure.

FIG. 3 is a flow chart for explaining a control method of a mobile terminal according to an embodiment of the present disclosure. The mobile terminal 100 (refer to FIG. 1) may include a sensing unit 140, a display unit 151, and a controller 180.

Referring to FIG. 3, in the mobile terminal 100 according to the present disclosure, the process of sensing a tap hitting the terminal body while the display unit 151 is in an inactive state (S310).

Here, "the display unit 151 being in an inactive state" denotes a state in which the illumination provided therein to illuminate the display unit 151 is off. In other words, no information or graphic image is displayed on the display unit 151 while the display unit 151 is in an inactive state.

On the other hand, the sensing unit 140 senses a tap applied to the body regardless of whether or not the display unit 151 is activated.

Here, tap or tap gesture may denote a gesture hitting the body 100 of the mobile terminal or an object. More specifically, tap may be understood as an operation of slightly hitting the mobile terminal body 100 or object with a tap object such as a finger and the like or an operation of allowing a tap object to be slightly brought into contact with the mobile terminal body 100 or object.

On the other hand, the tap object applying such a tap may be a thing capable of applying an external force to the mobile terminal body 100 or object, for example, finger (part with a fingerprint), stylus pen, pen, pointer, fist (finger joint) and the like. On the other hand, the tap object may not be necessarily limited to a thing capable of applying a touch input to a mobile terminal according to the present disclosure, and the type thereof does not matter if it is a thing capable of applying an external force to the mobile terminal body 100 or object.

On the other hand, an object applied with a tap may include at least one of the terminal body and a position out of the body. In other words, the input region of the mobile terminal may be extended to an outside of the terminal body. Accordingly, the position capable of sensing the tap at a position out of the terminal body becomes a virtual input region.

Furthermore, the virtual input region may vary in the area according to a location or object on which the terminal is placed or the strength of a tap. For example, when the terminal is placed on a table, the movement of the terminal may be generated if the user hits the table, thereby sensing the tap therethrough. As a result, the virtual input region is increased as increasing the strength of the hitting. For another example, when the user holds the terminal body, the virtual input region may disappear.

On the other hand, during the process of sensing a tap, it may be determined that "knockknock (tocktock or knock-on)" for the purpose of controlling the mobile terminal is sensed only when at least two or more taps are applied within a limited period of time. For example, when a tap is applied once to the 151 by a touch object capable of applying a touch to the display unit 151, the controller 180 may recognize the one tap as a touch input. In other words, since the reception of a control command by the user is limited in a lock state, the controller 180 may ignore the user input when the user input is recognized as a touch input other than a tap.

Accordingly, the sensing unit 140 may compare the pattern of the sensed tap with a predetermined pattern only when at least two or more (or plurality of) taps are consecutively applied within a limited period of time.

In other words, consecutively sensing at least two or more taps within a limited period of time may be referred to as "knockknock (or knock-on)". For example, when a second tap is sensed within a limited period of time from a time point at which a first tap is sensed, it may be determined that "knockknock" is sensed. Accordingly, hereinafter, sensing "knockknock" may denote that hitting an object on the terminal body or at a position out of the body is substantially sensed a plural number of times.

On the other hand, when the sensing unit 140 corresponds to a touch sensor, the sensing unit 140 may sense "knockknock" in a different manner according to whether or not the display unit 151 is activated. For example, when the display unit 151 is activated, it should immediately respond to a user input, and thus the touch sensor can execute an active mode for maintaining an active state. On the contrary, when the display unit 151 is in an inactive state, the touch sensor can execute a doze mode in which both the active state and inactive state are switched with a predetermined period of time to save the battery. In other words, when the display unit 151 is in an inactive state, the touch sensor may execute the doze mode, and activated every predetermined period of time.

On the other hand, though a speed for sensing "knockknock" applied to the display unit 151 is increased as decreasing the period of activating the touch sensor, power consumed by the touch sensor is increased based on that speed. On the contrary, though power consumed by the sensing unit 140 is decreased as increasing the period of activating the touch sensor, a speed for sensing a touch applied to the display unit 151 is decreased.

Accordingly, the predetermined period may be set to be fast while enhancing the efficiency of power consumption in such a manner that the sensing speed is unable to be recognized by the user in sensing a touch applied to the display unit 151. For example, the predetermined period may be set such that the touch sensor is activated 30 times per second (30 Hz). It may correspond to a minimum current level at which the sensing unit 140 is able to recognize a touch in an inactive state of the display unit 151.

On the other hand, the touch sensor may execute a doze mode while the display unit 151 is in an inactive state, but execute the active mode when a first tap is applied to the display unit 151. In other words, when determined that a tap is applied while the display unit 151 is in an inactive state, the touch sensor may execute an active mode to more accurately sense a tap to be applied since then. For example, when the active mode is executed, the touch sensor may be set to be activated 120 times per second (120 Hz).

On the other hand, when a second tap is not sensed within a reference period of time from a time point at which a first tap is applied, the controller 180 may switch the touch sensor from an active mode to a doze mode. It is to prevent a malfunction from being generated in the mobile terminal since a user's unintentional tap has been generated.

On the other hand, the sensing unit 140 may further include at least one of an acceleration sensor for sensing a tap using the movement of the body, a sound sensor for sensing a tap using a sound generated around the body, a proximity sensor for sensing a tap based on the existence or non-existence of an object, and a pressure sensor for sensing a tap using a pressure applied to the body.

Similarly to the touch sensor, the remaining sensors contained in the sensing unit 140 may be deactivated while the display unit 151 is in an inactive state or activated with a predetermined period. It is to decrease power consumption due to sensors.

In other words, when a first tap is sensed while the display unit 151 is in an inactive state, the controller 180 may activate one or more sensors contained in the sensing unit 140 to more accurately sense a second tap to be applied since then. The one or more sensors may include a touch sensor, a microphone sensor, a proximity sensor, a RGB sensor, a pressure sensor and the like, and may be used to discern the pattern of "knockknock" (a strength of the tap, a location of the tap, a time interval between a first tap and a second tap, an object of the tap, an intensity of the tap, an area of the tap, etc.).

For example, the touch sensor may be disposed at the body to sense a tap using a touch generated from the body. Furthermore, the touch sensor may produce a location to which a tap is applied, and discern the object (for example, finger, nail, palm, etc.) of a tap using an area touched with the tap.

For another example, the microphone sensor may sense a tap using a sound generated around the body. Furthermore, since the sound has an inherent frequency characteristic, the microphone sensor may discern the object (for example, finger, nail, palm, pen, etc.) of a tap, the pattern of a tap, and the like.

For still another example, even if "knockknock" is sensed by the acceleration sensor, the controller 180 may reject the knock-on when an object adjacent to a front surface of the body is detected by the proximity sensor. It is because the mobile terminal 100 put in a bag may cause a malfunction due to the shaking of the bag.

For still another example, the RGB sensor may sense a color for the object of a tap, and discern the type of the object using the sensed color. In other words, the present disclosure may discern between a finger and a touch pen using the RGB sensor.

For still another example, the pressure sensor may sense a tap using a pressure applied to the body, and produce the strength of a pressure generated by the tap.

For still another example, a piezo sensor (or shock sensor) using a property in which electricity is generated from the surface of a crystal when a pressure is applied in a particular direction may sense a tap. Since the piezo sensor can sense a motion corresponding to several thousands of hertz (kHz) while the acceleration sensor senses a motion corresponding to several hundreds of hertz (Hz), the movement (shock) of a terminal may be sensed in a more accurate manner.

In addition, the controller 180 may recognize the object and pattern of the foregoing tap using a piezo sensor. More specifically, the piezo sensor may recognize the object and pattern of a tap using an experimentally acquired physical pattern since the physical pattern generated therefrom is different according to an object generating a shock on the body or the pattern of a tap. The experimentally acquired physical pattern may be prepared during the factory shipment to be stored in the memory unit 160, and periodically updated or changed by the user.

On the other hand, a mobile terminal according to the present disclosure may use only either one of the acceleration sensor and touch sensor, sequentially use the acceleration sensor and touch sensor, or concurrently use the acceleration sensor and touch sensor to sense a tap to the mobile terminal body. Meanwhile, in order to sense a tap, a mode using only the acceleration sensor may be referred to as a first mode, a mode using the touch sensor as a second mode, and a mode using both the acceleration sensor and touch sensor (concurrently or sequentially) as a third mode or hybrid mode. Moreover, the controller 180 may comprehensively take sensing signals generated from the foregoing sensors into consideration to determine whether or not "knockknock" has been sensed. Accordingly, it may be possible to more accurately recognize the property of a tap such as a location at which a tap is sensed or the like.

Next, the process of determining whether or not the pattern of a sensed tap corresponds to a predetermined pattern in a mobile terminal according to the present disclosure is carried out (S320).

When "knockknock" hitting the body a plural number of times is sensed, the controller 180 may determine whether or not the pattern of the sensed knock-on matches a pattern stored (or predetermined) in the memory unit 160.

The predetermined pattern is formed by a plurality of taps. Here, the predetermined pattern may be set in various ways according to a number of times with which the taps are applied, an absolute/relative location at which the taps are applied, an input speed (or beat) of the taps, an order in which the taps are applied, a number of tap objects contained in one tap (for example, one-finger tap or two-finger tap), an area to which the tap is applied, an intensity of the tap, whether or not a contact with the body using the tap is maintained (tap and hold), and the like. Hereinafter, for the sake of explanation, embodiments in which the predetermined pattern is set by a first and a second tap will be described below, but may not be necessarily limited to this. In other words, the pattern may be set by two or more taps such as a third tap or the like.

According to an embodiment, the controller 180 may discern the pattern of a sensed tap based on an absolute location at which the tap is applied. For example, the predetermined pattern may be a pattern in which a second tap hitting the body or a second position out of the body is applied after a first period of time has been passed from a time point at which a first tap hitting the body or a first position out of the body once is applied. Here, the controller 180 may assume a virtual region in which a front surface of the terminal body is extended to an outside as a two-dimensional coordinate plane to set a pattern based on the absolute location of the first and the second position. In other words, when the first and the second tap are accurately applied to the first and the second position, respectively, the controller 180 may finally determine that the pattern of a sensed tap corresponds to a predetermined pattern.

According to an embodiment, the controller 180 may discern the pattern of a sensed tap based on the absolute location of the first and the second tap. When a second tap is applied to a location that satisfies a predetermined distance and angle from the location of an initially applied first tap on the basis of a virtual reference axis based on the direction of gravity, the controller 180 may determine that the pattern of a sensed tap corresponds to a predetermined pattern. For example, a location, apart from a first location at which the first tap is sensed by 5 cm, at which the first location is used as a starting point, and formed at 30 degrees on the basis of a virtual reference axis based on the direction of gravity may be set as a second location at which a second tap is to be sensed. As described above, when the predetermined pattern is based on an absolute location, a location at which a second tap is applied varies according to a location at which a first tap is applied.

According to an embodiment, the controller 180 may discern the pattern of a sensed tap based on a time interval between the first and the second tap. In other words, a different pattern may be set according to a speed (or beat) at which the tap is entered. For example, a pattern in which the tap is entered twice within a second and a pattern in which the tap is entered three times within a second correspond to different patterns, respectively.

Moreover, the controller 180 may discern the pattern of a sensed tap based on contacting to or releasing from a tap object such as a Morse code. For example, the operation of slightly hitting an object may correspond to a dot in the Morse code, and the operation in which a state in contact with the object is not released for a predetermined period of time (hereinafter, referred to as a "tap and hold") may correspond to a dash (line) in the Morse code. For example, "knockknock", "knock-knock" and "knockknock-" are cases where taps are applied twice, but correspond to different patterns.

Furthermore, the controller 180 may produce the number of tap objects contained in one tap. For example, when a tap is carried out with two fingers, two tap objects may be included in one tap. The controller 180 may discern the pattern of a tap based on the number of tap objects being produced.

In addition, the pattern of a sensed tap may be discerned according to an intensity of the tap (strong or weak), a type of the tap object (finger or touch pen), an area of the tap (thumb or index finger), an order of the tap, an area to which the tap is applied and the like.

Next, when the pattern of a sensed tap corresponds to a predetermined pattern, the controller 180 carries out the process of releasing a lock state, switching the display unit from an inactive state to an active state, and displaying predetermined screen information (S330).

Here, the predetermined pattern may be associated with at least one of a number of times, a location, a speed, a strength, a region to which the tap is applied, and a type and a number of the tap objects.

Here, a lock state denotes a state in which the reception of a control command by a user is limited, and refers to a state in which the lock is released only when a password set by a specific person is entered. In this lock state, when the display unit 151 is activated, a lock screen formed to enter a password may be displayed.

When a lock screen is displayed, the user may apply a touch on screen information for lock release displayed on the lock screen in a predetermined manner. For example, the touch in a predetermined manner may be a touch for drawing a path from a first position to a second position which is different from the first position in the area of the display unit 151. In other words, the touch in a predetermined manner may be a touch for drawing a pattern by means of a moving path of the touch. When the touch for lock release is completed, the controller 180 may switch the lock state to a release state, and display a home screen page on the display unit 151. In other words, as the lock state is switched to a release state, it may enter a mode in which the execution of at least part of a plurality of applications installed in the mobile terminal is enabled.

On the other hand, the pattern of a sensed tap may be compared with a predetermined pattern based on at least one of a number of times, a location, a speed, a strength, a region to which the tap is applied, and a type and a number of the tap objects. The controller 180 may calculate a matching rate based on the comparison result, and determine that the pattern of a sensed tap corresponds to a predetermined pattern when the matching rate is greater than a reference value.

On the other hand, when the pattern of a sensed tap corresponds to a predetermined pattern, the controller 180 switches a lock state to a release state, and displays a set screen other than a lock screen on the display unit 151. The predetermined screen may be a home screen page, for example. The home screen page may include at least one object, and the object may be an icon or widget of an application installed in the mobile terminal. Meanwhile, when switching to a release state, the most initially displayed screen may not be necessarily a home screen page. For example, screen information that has been most recently displayed on the display unit 151 may be displayed as predetermined screen information.

On the other hand, according to the present disclosure, when the mobile terminal is in a lock state, information on a plurality of tap patterns for switching a lock state to a release state may be stored in the memory unit 160. The tap patterns may be a plurality of predetermined pattern inputs. Control information for displaying different screen information on the display unit 151 may correspond to the plurality of predetermined patterns, respectively.

Here, control information for displaying different screen information corresponding to the plurality of predetermined patterns, respectively, may be stored in the memory unit 160. In other words, screen information displayed on the display unit 151 may vary according to the type of a predetermined pattern. The controller 180 may display first screen information on the display unit 151 when a first predetermined pattern is sensed, and display second screen information which is different from the first screen information on the display unit 151 when a second pattern which is different from the first pattern is sensed. For example, at least one of the plurality of predetermined patterns may be a pattern for entering a home screen page.

On the other hand, at least one of the plurality of predetermined patterns may be a pattern for displaying one or more graphic objects corresponding to different functions, respectively, adjacent to a location at which the last tap is sensed on the display unit. At this time, when a drag input started from a touch corresponding to the last tap is sensed toward any one of the graphic objects, the controller 180 may process a function corresponding to the any one graphic object. Furthermore, when the sensed plurality of taps correspond to a predetermined condition, the controller 180 may execute at least one application according to the drag input. For example, when a pattern for displaying a graphic object corresponding to a photo application is received, the controller 180 may release a lock state, activate at least one region of the display unit 151, and display the graphic object in the at least one region. Subsequently, when a drag input started from a touch corresponding to the last tap and moved to the graphic object is sensed, the controller 180 may execute the photo application.

On the other hand, though not shown in the drawing, it may occur a case where the pattern of a sensed tap does not match a predetermined pattern though "knockknock" is sensed while the display unit 151 is in an inactive state. In this case, the controller 180 does not release a lock state, and maintains the display unit 151 in an inactive state. In other words, the controller 180 ignores the sensed tap. However, the controller 180 guides that there is no executable function (or the pattern of a tap has been entered in an inaccurate manner) using the light-emitting unit to guide that the tap has been applied in an inaccurate manner for the user. For example, the light-emitting unit may blink a red illumination a plural number of times, thereby guiding that the pattern of a tap has been entered in an inaccurate manner.

On the other hand, "knockknock" that does not correspond to the predetermined pattern may be consecutively sensed. In other words, mismatched taps may be repeated a reference number of times within a reference period of time. In this case, the controller 180 may activate the display unit 151, and display a lock screen formed to receive a password while maintaining a lock state. Repeating failure cases corresponds to a case where the user has misunderstood a touch trajectory, and thus the controller 180 displays a lock screen capable of releasing the lock on the display unit 151. Then, the user may enter a password using a virtual keypad on the lock screen to switch a lock state to a release state.

On the other hand, the pattern of a tap for releasing a lock state and displaying a predetermined screen may be stored in the memory unit 160 during the factory shipment or added, deleted or edited by the user of the terminal. A method of allowing the user to add a touch trajectory will be described below with reference to FIGS. 15A and 15B.

According to the foregoing driving method, a lock state can be released based on the pattern of a tap while the display unit 151 is in an inactive state, thereby implementing a convenient user interface.

Furthermore, according to the related art, there is a drawback in which the display unit 151 should be activated using a button or the like and a password should be entered using a virtual keypad contained in the lock screen to release a lock state, but the foregoing embodiment solves the drawback.

In this manner, the user can control the mobile terminal with a new form even while the display unit is in an inactive state.

Figure 4A:
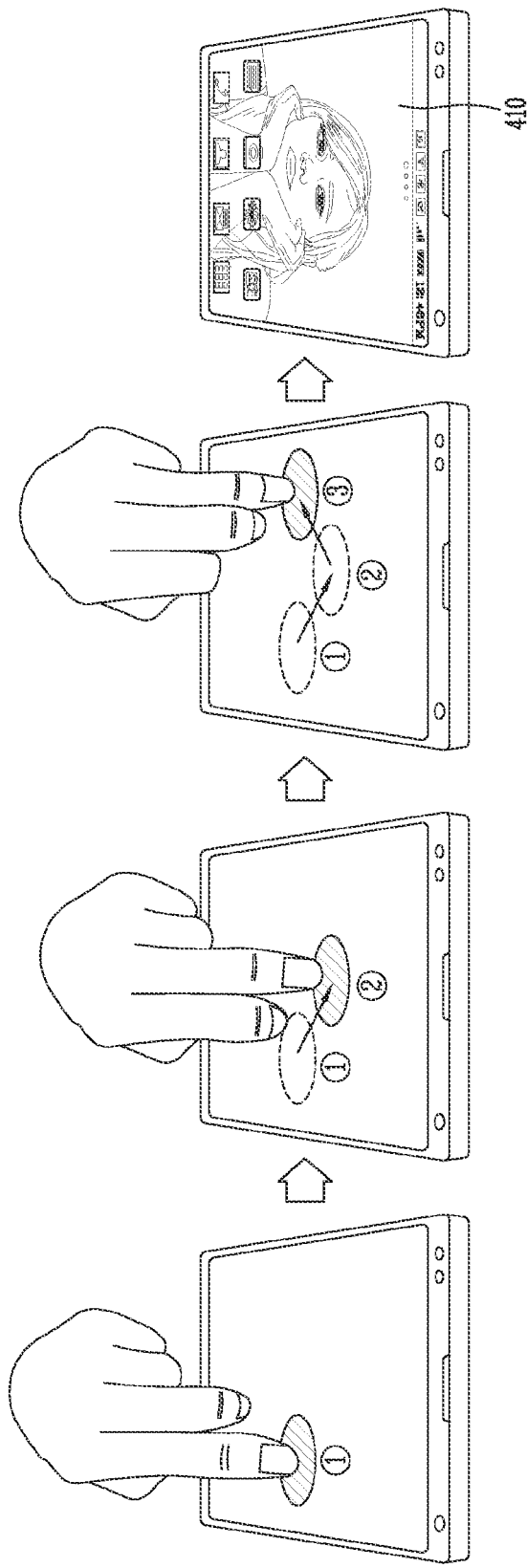
FIGS. 4A and 4B are conceptual views for explaining the foregoing control method in FIG. 3.
Figure 4B:
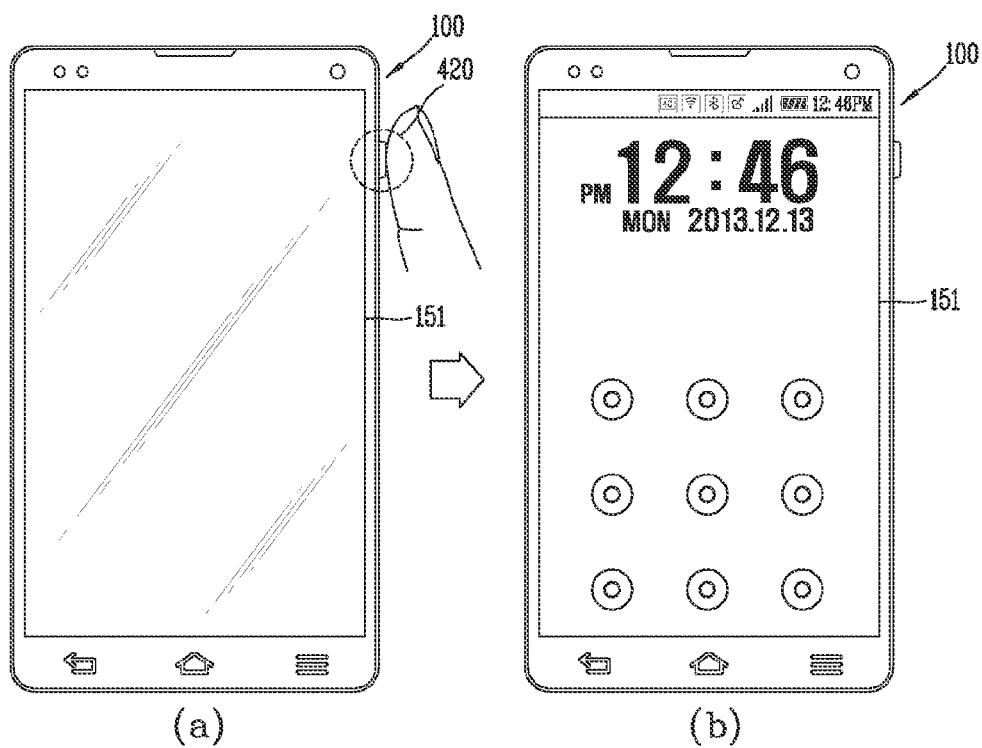
Figure 5:
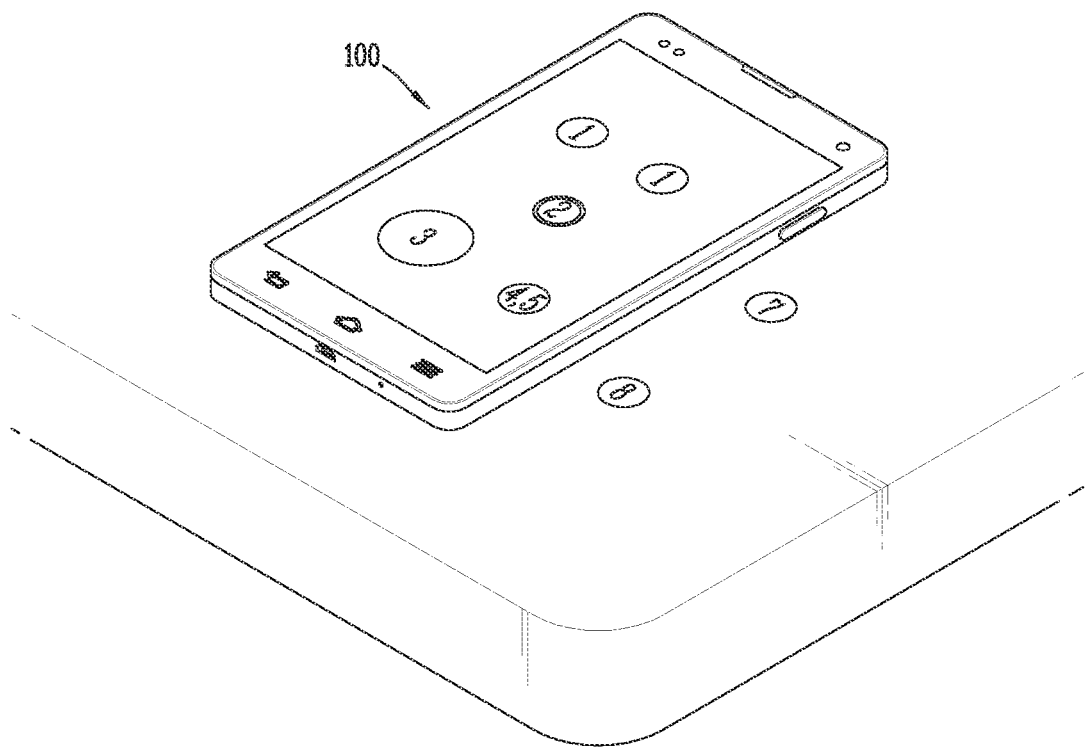
FIG. 5 is an exemplary view illustrating various tap patterns applicable to a mobile terminal according to an embodiment of the present disclosure.

Hereinafter, a method of controlling a mobile terminal according to the foregoing control method illustrated in FIG. 3 will be described in more detail with reference to the accompanying drawings. FIGS. 4A and 4B are conceptual views for explaining the foregoing control method in FIG. 3, and FIG. 5 is an exemplary view illustrating various tap patterns applicable to a mobile terminal according to an embodiment of the present disclosure.

A mobile terminal 100 according to an embodiment of the present disclosure may immediately execute a specific function based on the user's selection when a plurality of taps are applied by the user while the illumination of the display unit 151 is turned off but at least one of the touch sensor and acceleration sensor being turned on is maintained, such as a state in which the display unit 151 is deactivated, namely, a doze mode state. Furthermore, here, the plurality of taps may be sensed from at least one of the touch sensor and acceleration sensor.

As a result, even while the display unit 151 is in an inactive state, the controller 180 may recognize at least one of the acceleration sensor and touch sensor when a plurality of taps are applied to the body of the mobile terminal 100.

Here, the plurality of taps may include at least one tap directly applied to the body of the mobile terminal 100 or applied to an object located sufficiently close to the mobile terminal 100. In other words, all the plurality of taps may be directly applied to the body of the mobile terminal 100 or applied to an object adjacent to the mobile terminal 100. Otherwise, some of the plurality of taps may be applied to the body of the mobile terminal 100, and the remaining taps may be applied to an object adjacent to the mobile terminal 100.

The controller 180 may sense a tap directly applied to the body of the mobile terminal 100 using a touch sensor. Furthermore, the controller 180 may sense a vibration generated due to a tap applied to an object located sufficiently close to the mobile terminal 100 using an acceleration sensor. In other words, the controller 180 may sense a plurality of taps in a first mode using only the acceleration sensor, or a second mode using only the touch sensor or a hybrid mode using both the acceleration sensor and touch sensor based on the type of applying the plurality of taps.

On the other hand, when a plurality of taps are applied, it is of course possible to activate the display unit 151 based on the plurality of taps. In other words, when an initial tap is sensed while the display unit 151 is turned off, for example, in a doze mode, the controller 180 of the mobile terminal 100 according to an embodiment of the present disclosure may sense it, and sense whether or not the user applies an additional tap, thereby determining whether or not to activate the display unit.

Subsequently, when a plurality of taps ("knockknock") are applied while the display unit 151 is in an inactive state, the controller 180 may analyze the pattern of the sensed tap. For example, as illustrated in FIG. 4A, when a tap due to a first finger (①)→a second finger (②)→a third finger (③) is applied, the controller 180 may compare the pattern of the sensed tap with a predetermined pattern based on at least one of a number of times, a location, a speed, a strength, a region to which the tap is applied, and a type and a number of the tap objects. Furthermore, when the pattern of the sensed tap matches a predetermined pattern, the controller 180 may release a lock state, and display predetermined screen information 410 on the display unit 151.

Furthermore, in a mobile terminal according to the present disclosure, as illustrated in FIG. 4B, when a tap is applied to a region 420 corresponding to a location disposed with a power button while the display unit 151 is in an inactive state, the controller 180 may display a lock screen on the display unit 151. On the other hand, here, the power button is provided to activate the display unit 151 according to the power button being pressed (or selected) regardless of the status of the mobile terminal. At this time, the controller 180 may display different screen information according to the lock/release state. Meanwhile, the power button may be implemented using a hardware key or virtual key.

In other words, the controller 180 may release a lock state as well as display a lock screen while maintaining the lock state based on the pattern of a tap.

Hereinafter, for the sake of convenience of explanation, as illustrated in FIG. 5, the characteristic of a tap is expressed with a circular shape in a simplified manner. A numeral in the circular shape denotes an order in which the tap is applied, and a location illustrated with the circular shape corresponds to a location at which the tap is applied. For example, referring to FIG. 5, a total seven taps are applied to the mobile terminal, and "①" is a multi tap in which a first tap is applied by two tap objects, denoting a tap sensed in an upper region of the display unit. "②" displayed with a thick circumference of the circular shape denotes a tap in which a second tap hitting the body maintains a contact for a predetermined period of time without releasing the contact with the body (tap and hold). "③" displayed to be larger than other circular shapes denotes a tap in which the strength of a third tap is stronger than that of the other taps. In other words, the size of the circular shape is illustrated in proportion to the strength of a tap. "④", "⑤" denote that a fourth and a fifth tap are sequentially applied to the same location. "⑥", "⑦" denote that a sixth and a seventh tap are sequentially applied to different positions out of the body.

On the other hand, in a mobile terminal according to an embodiment of the present disclosure, the controller 180 may display guide information (or guidance information) associated with the pattern of a sensed tap on the display unit 151 upon sensing "knockknock". The guide information may be information for guiding that the tap has been accurately entered or information for guiding a reference time for which the tap should be applied or a location and order in which the tap is applied. The guide information may be displayed through at least one of visual, auditory and tactile schemes. For example, the controller 180 may display a circular shaped image as illustrated in FIG. 5 on the display unit 151 upon sensing a tap. Furthermore, the controller 180 may output a voice message such as "A first tap has been sensed. Please make a second tap." using a speaker.

Figure 6:
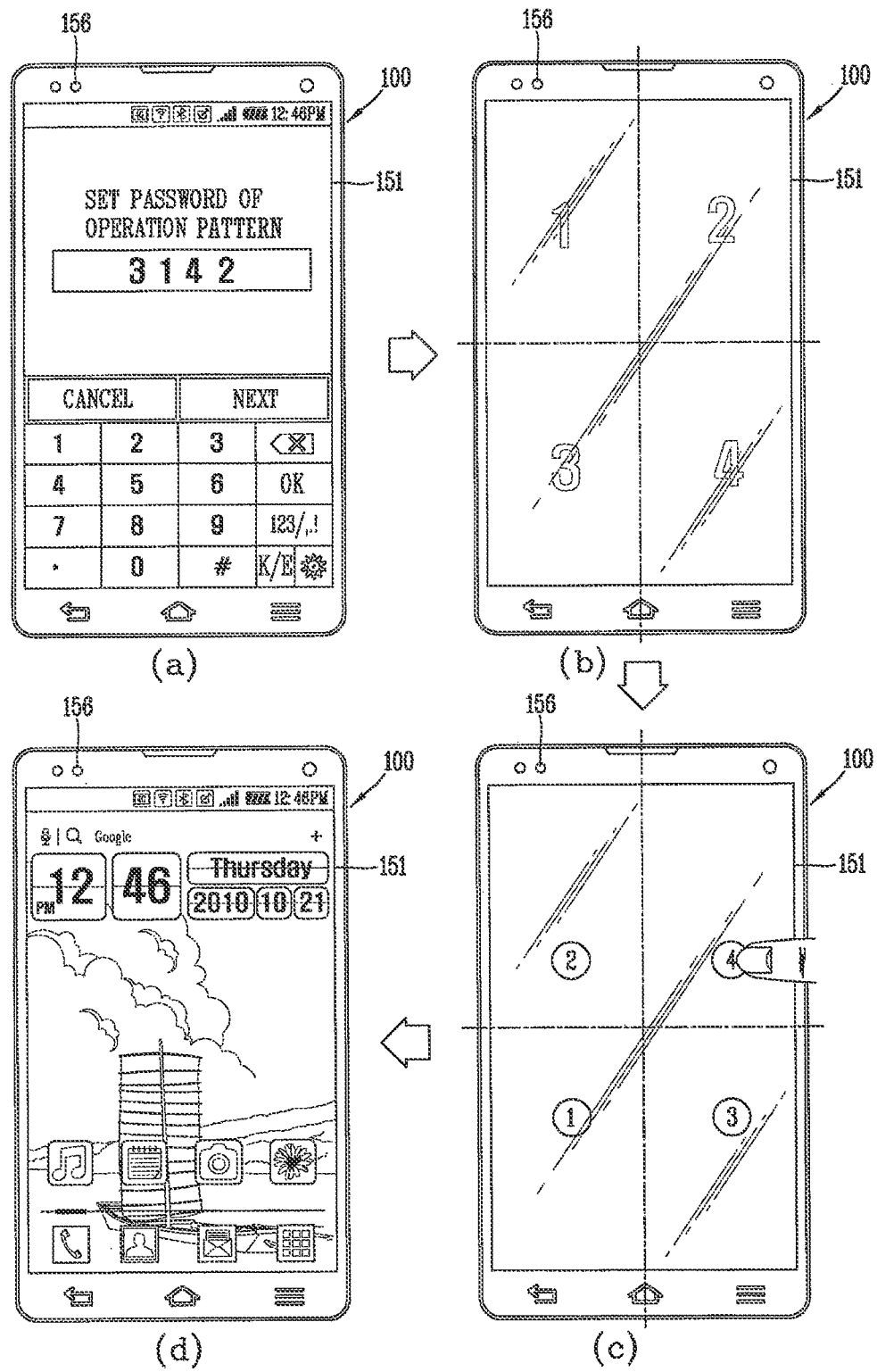
FIG. 6 is a conceptual view illustrating an operation performed by a mobile terminal of the present invention.
Figure 7:
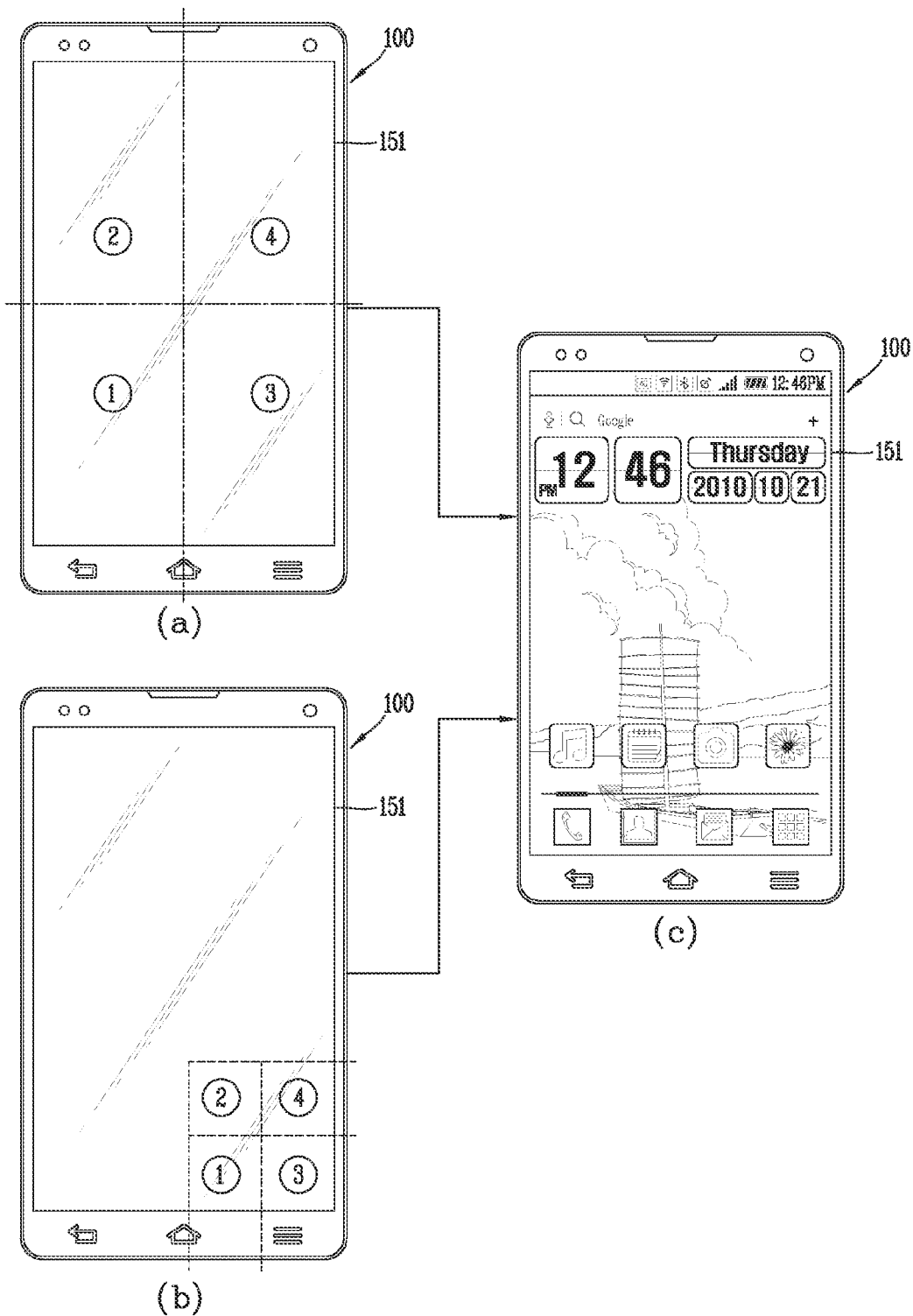
FIG. 7 is a conceptual view illustrating a method for releasing a locked state using a motion pattern of various sizes, in the control method of FIG. 6.

FIG. 6 is a conceptual view illustrating an operation performed by a mobile terminal of the present invention, and FIG. 7 is a conceptual view illustrating a method for releasing a locked state using a motion pattern of various sizes, in the control method of FIG. 6.

Firstly, a method for releasing a locked state by a user's motion pattern in a mobile terminal according to an embodiment of the present invention will be explained with reference to FIG. 6. The mobile terminal 100 (refer to FIG. 1) includes the sensing unit 140, the display unit 151 and the controller 180.

The locked state means a state where reception of a control command input from a user is restricted. The locked state can be released only when a password set by a specific user is input. In such locked state, a lock screen for inputting a password can be displayed when the display unit 151 is activated.

In a case where the lock screen is displayed, a user may apply a preset touch onto screen information output to the lock screen for release of a locked state. For instance, the preset touch may be a touch for drawing a path from a first point on the display unit 151, to a second point different from the first point. That is, the preset touch may be a touch for drawing a pattern by a moving path thereof. Upon completion of a touch for releasing a locked state, the controller 180 may convert the locked state into a released state, and may output a home screen page to the display unit 151. That is, as the locked state is converted into the released state, the mobile terminal may enter a mode where at least some of a plurality of applications installed at the mobile terminal can be executed.

In the mobile terminal according to the present invention, a locked state is released by a release command formed by a plurality of taps applied to the mobile terminal in a deactivated state of the display unit 151. More specifically, the release command is defined by a motion pattern formed by sequentially connecting points of the plurality of taps with one another. Here, the points of the plurality of taps mean coordinate values to which the plurality of taps have been applied.

In conclusion, a locked state of the mobile terminal can be directly released by a plurality of taps applied to the mobile terminal in a deactivated state, and the mobile terminal can display preset screen information. That is, a locked state of the mobile terminal can be released without a user's inputting a password to the display unit where a lock screen has been displayed. Hereinafter, an operation performed by the mobile terminal of the present invention will be explained in more detail with reference to FIG. 6.

In order to convert a locked state into a released state, a user's password for releasing a locked state should be input. Such password may be preset when the mobile terminal is presented on the market, or may be preset or edited by a user. Referring to FIG. 6(a), a password input window (or a pin code input window) for inputting a user's password may be displayed on the display unit 151 of the mobile terminal. For instance, the controller 180 may display the password input window on the display unit 151, in case of executing a password setting function and/or in case of converting a released state into a locked state.

The password input window may include at least one virtual keypad. More specifically, the virtual keypad may be a numeric keypad. The controller 180 may set a password for releasing a locked state, based on a user's input to the virtual keypad. For instance, as shown in FIG. 6(*a*), a password for releasing a locked state may be set as "3142".

The controller 180 sets (or registers) a motion pattern for converting a locked state into a released state, based on the set password. The motion pattern is formed by a plurality of taps applied to the mobile terminal. More specifically, the motion pattern is formed by sequentially connecting points of the taps with one another. For instance, a motion pattern, where points of four taps form vertexes of a capital letter "N" sequentially, may be set.

The controller 180 may divide an entire region of the display unit 151 into a plurality of regions, and may set a user's motion pattern using the plurality of regions. In a case where a preset password is "3142", the controller 180 divides the display unit 151 based on a largest number among the input numbers, e.g., "4". For instance, the controller 180 may divide the display unit 151 into four regions as shown in FIG. 6(*b*). The four regions may be sequentially provided with identification numbers from a left upper side (e.g., 1~4 regions). The controller 180 may set sequential application of first to fourth taps onto the third region, first region, the fourth region and the second region, as a motion pattern. Hereinafter, the motion pattern set in the aforementioned manner is called a preset motion pattern.

The present invention is not limited to the above configuration where a password is set as four numbers, and an entire region of the display unit 151 is divided into 4 regions. That is, the controller 180 may divide the display unit 151 into a plurality of regions in various manners. For instance, the controller 180 may divide the display unit 151 into an upper region and a lower region, or an upper region, a middle region and a lower region, based on a preset password. Then the controller 180 may set various motion patterns.

Once the password and the motion pattern have been set, the controller 180 may execute a locked state, and deactivate or activate the display unit 151.

For reference, a deactivated state of the display unit 151 means a state where a light emitting unit provided in the mobile terminal so as to illuminate the display unit 151 is turned off. For instance, as shown in FIG. 6(*b*), neither information nor a graphic image is displayed on the display unit 151 in a deactivated state of the display unit 151.

On the contrary, an activated state of the display unit 151 means a state where the light emitting unit provided in the mobile terminal so as to illuminate the display unit 151 is turned on. In an activated state of the display unit 151, different screen information is displayed on the display unit 151 under control of the controller 180. Although not shown, if the display unit 151 is activated in a locked state, the controller 180 displays a lock screen related to input of a password, so that a password for releasing a locked state can be input from a user.

In a deactivated state of the display unit 151, a plurality of taps applied onto the display unit 151 may be sensed. In this case, the controller 180 analyzes a motion pattern formed by sequentially connecting points of the sensed taps with one another. If the analyzed motion pattern is consistent with a preset motion pattern for releasing a locked state, the controller 180 executes a locked-state releasing function. Such locked-state releasing function means a function to release a locked state, to convert a deactivated state of the display unit into an activated state, and to display preset screen information on the activated display unit 151.

As shown in FIG. 6(*c*), in a case where first to fourth taps (①,②,③,④) are sequentially sensed on the third region, the first region, the fourth region and the second region, respectively, the controller 180 may determine that a release command has been received, because the sensed taps form a preset motion pattern (e.g., 'N') defined as the release command. In this case, the controller 180 may execute a locked-state releasing function. That is, the controller 180 may activate the display unit 151, and may display a home screen page. The home screen page may include at least one object, and such object may be an icon or a widget of an application installed at the mobile terminal. When a locked state of the mobile terminal is converted into a released state, such home screen page is not necessarily output to the display unit 151 firstly. For instance, screen information, which has been output to the display unit 151 the most recently before the locked state is implemented, may be displayed as preset screen information.

When the display unit 151 is turned off, user cannot recognize whether the mobile terminal is power off or just only the display is off, so the controller can output feedback information using at least one of the light emitting unit 156 and the audio output module 153. For example, the controller 180 may control the light emitting unit 156 to flicker plural times in a green color in response to the sensed motion pattern, and may control the audio output module 153 to output sound feedback. In contrast, if an erroneous motion pattern is sensed, the controller 180 may control the light emitting unit 156 to flicker plural times in a red color in response to the sensed erroneous motion pattern. The light emitting unit's color is different from each other whether the sensed motion pattern is correct or not.

Under such configuration, a locked state of the mobile terminal can be released based on a user's motion pattern to tap the display unit 151 in a deactivated state of the display unit 151. Accordingly, a simple user interface can be implemented.

Further, such configuration of the present invention can solve the conventional disadvantages that a user should activate the display unit 151 using buttons, etc. in order to release a locked state, and then should input a password to the display unit 151 using a virtual keypad included in a lock screen.

A user can control the mobile terminal in a novel manner even in a deactivated state of the display unit.

In the mobile terminal according to an embodiment of the present invention, the controller 180 can release a locked state in response to reception of one of a plurality of release commands defined as a motion pattern formed by a plurality of taps. In this case, the release command indicates a command for releasing a locked state of the display unit, and converting a deactivated state of the display unit into an activated state.

Each of the plurality of release commands include a plurality of taps which form a motion pattern with a different size. That is, each of the plurality of release commands forms the same motion pattern, but includes taps which implement a pattern of a different size by being connected to one another. The plurality of release commands include a first release command and a second release command. The first release command may correspond to a plurality of taps which form a motion pattern of a first size, whereas the second release command may correspond to a plurality of taps which form the same motion pattern of a second size different from the first size.

Referring to FIGS. 7(a) and 7(b), a motion pattern preset by a password "3142" may be formed by a plurality of taps, and thereby a plurality of release commands may be defined. More specifically, a plurality of release commands may be formed by the same number of taps (e.g., 4 taps). A virtual pattern (e.g., ①→②→③→④) formed as points of the taps are sequentially connected to one another has the same shape as a preset motion pattern. However, the virtual pattern may be different from the preset motion pattern in a size or a touch position. That is, when a virtual pattern is the same as a preset motion pattern, it means that the two patterns are identical in shape.

A distance between an $n^{th}$ tap and an $n-1^{th}$ tap among the plurality of taps which form the motion pattern may be variable according to the plurality of release commands. For instance, a distance between the first tap (①) and the second tap (②) in a first release command shown in FIG. 7(a) is different from a distance between the first tap (①) and the second tap (②) in a second release command shown in FIG. 7(b). However, each of the first release command and the second release command corresponds to a release command for releasing a locked state. As shown in FIG. 7(c), one of the plurality of release commands may correspond to a release command for entering a home screen page.

For convenience, a tap characteristic is expressed as a circle as shown in FIG. 7. The number inside the circle indicates the order of tap application, and the position of the circle indicates a position where a tap has been applied. In a case where a single circle includes different numbers, it means that taps corresponding to different numbers have been sequentially applied to the same position.

In a deactivated state of the display unit 151, information on a plurality of regions cannot be output. For convenience, virtual lines for dividing regions from one another, and numbers corresponding to a plurality of regions may be displayed.

According to the aforementioned driving method, a user may input a motion pattern for releasing a locked state on different positions and/or in different sizes, in a deactivated state of the display unit 151. For instance, a user may apply a release command using his thumb, with his right hand grasping the mobile terminal. In this case, a tap may be applied to a region where the user's right thumb reaches (e.g., a right lower region of the display unit 151). If a motion pattern which has the same shape as a preset motion pattern is formed by the same number of taps as the preset motion pattern, the controller 180 may release a locked state. That is, the mobile terminal of the present invention can provide a user with a more intuitive and simpler user interface.

Hereinafter, a method to recognize a user's motion pattern in a mobile terminal according to an embodiment of the present invention will be explained in more detail with reference to FIGS. 8, 9 and 10.

Figure 8:
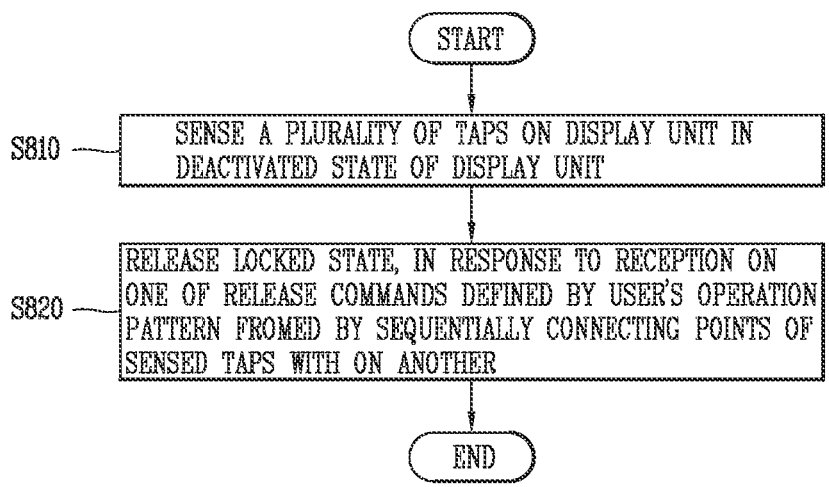
FIG. 8 is a flowchart for explaining a method to control a mobile terminal according to an embodiment of the present invention.

FIG. 8 is a flowchart for explaining a method to control a mobile terminal according to an embodiment of the present invention.

Referring to FIG. 8, a plurality of taps for knocking on the display unit 151 are sensed in a deactivated state of the display unit 151 (S810).

Such deactivated state of the display unit 151 means that a light emitting unit provided in the mobile terminal so as to illuminate the display unit 151 is turned off.

That is, neither information nor a graphic image is displayed on the display unit 151 in a deactivated state of the display unit 151.

The sensing unit 140 senses a tap applied to the terminal body regardless of whether the display unit 151 is in an activated state or a deactivated state.

A tap or a tap gesture means a user's gesture to knock on the terminal body 100 or an object. More specifically, a tap may be an operation to knock on the terminal body 100 or an object using a tap applying object such as a finger, or an operation to bring the tap applying object in slight contact with the terminal body 100 or the object.

Such tap applying object may be a thing which can apply an external force to the terminal body 100 or an object. For instance, the tap applying object may be a finger having a fingerprint, a stylus pen, a pen, a pointer, a fist (finger joint), etc. The tap applying object is not limited to an object which can apply a touch input to the mobile terminal, but may have various types only if it can apply an external force to the terminal body 100 or an object.

The object may include at least one of the terminal body and a region rather than the terminal body. That is, an input region of the mobile terminal may extend to outside of the terminal body. Accordingly, a region rather than the terminal body where a tap can be sensed may be a virtual input region.

Such virtual input region may have a different area according to a place where the mobile terminal is positioned, an object, or a tap intensity. For instance, in a case where the mobile terminal is placed on a table, etc., if a user taps on the table, the mobile terminal is moved and thereby the tap may be sensed. If the intensity of the tap increases, the virtual input region increases in size. As another example, in a case where a user holds the terminal body, the virtual input region may disappear.

In a tap sensing step, if two or more taps are applied within a limited time, the controller 180 may determine that a tap ("knock") on the display unit 151 for controlling the mobile terminal has been sensed. For instance, if a single tap is applied onto the display unit 151 by a touch applying object which can apply a touch input to the display unit 151, the controller 180 may recognize the single tap as a touch input. More specifically, reception of a control command input by a user is restricted in a locked state. Accordingly, if a user's input is recognized as a touch input not a tap, the controller 180 may ignore the user's input.

The controller 180 may determine whether a motion pattern which defines a release command has been applied or not, only in a case where the sensing unit 140 senses at least two taps which have been consecutively applied to the display unit 151 within a limited time.

For sensing of a tap applied to the terminal body, one of the acceleration sensor and the touch sensor may be used, or the acceleration sensor and the touch sensor may be sequentially used. Alternatively, the acceleration sensor and the touch sensor may be simultaneously used.

A mode, where only the acceleration sensor is used to sense a tap, may be called a first mode. A mode, where only the touch sensor is used to sense a tap, may be called a second mode. A mode, where both of the acceleration sensor and the touch sensor are used (sequentially or simultaneously) to sense a tap, may be called a third mode or a hybrid mode. Furthermore, the controller 180 may determine whether 'knock-on' has been sensed or not, by considering sensing signals generated from the aforementioned sensors. This can allow a tap characteristic such as a position where a tap has been sensed, to be checked more precisely.

Next, performed is a step (S820) of releasing a locked state in response to one of a plurality of release commands defined by a user's motion pattern formed by sequentially connecting points of sensed taps with one another.

Upon detection of knock-on applied onto the terminal body plural times, the controller 180 analyzes a user's motion pattern formed by sequentially connecting points of sensed taps with one another. The user's motion pattern may be variously formed according to the number of sensed taps, an absolute/relative position to which taps have been applied, an input speed of taps, an application order of taps, the number of tap applying objects for a single tap (e.g., a single tap using one finger, or a single tap using two fingers), a tap area, a tap intensity, whether a contact state between a tap applying object and the terminal body is maintained (tap and hold), etc. For convenience, preferred embodiments where first to fourth taps are applied to the display unit 151 using a single tap applying object will be explained hereinafter. However, the present invention is not limited to this.

In the preferred embodiments, the controller 180 may calculate a coordinate value to which a tap has been applied. The coordinate value may be expressed as (x, y) based on a horizontal axis (x-axis) and a vertical axis (y-axis) of the display unit 151. The controller 180 may analyze a user's motion pattern formed by sequentially connecting points of taps with one another based on the calculated coordinate values. Then the controller 180 may distinguish a motion pattern for releasing a locked state, from an erroneous motion pattern.

The controller 180 may analyze a motion pattern based on a relative position between tap points. In this case, an $n^{th}$ tap should be applied to a position which satisfies preset conditions, from a point where an $n-1^{th}$ tap has been applied. For instance, if a second tap does not satisfy the preset conditions based on a position of a first tap, the controller 180 ignores the first tap. On the contrary, if the second tap satisfies the preset conditions based on the position of the first tap, the controller 180 determines whether a third tap satisfies the preset conditions based on a position of the second tap. If all the taps which form the motion pattern satisfy the preset conditions, the controller 180 may determine that a preset motion pattern has been sensed. Such preset conditions may be related to an angle formed by a virtual axis obtained based on a distance between two tap points, and a moving direction of a tap, and formed by a straight line which connects two points with each other.

Next, the controller 180 releases a locked state in response to reception of one of a plurality of release commands, converts a deactivated state of the display unit into an activated state, and displays preset screen information. That is, the controller 180 performs a locked-state releasing function.

The controller 180 analyzes a motion pattern based on sensed taps, and determines whether the analyzed motion pattern matches a preset motion pattern defined as a release command. The controller 180 may digitize a matching rate. If a digitized matching rate is larger than a reference value, the controller 180 determines that a release command has been received.

A plurality of release commands are defined by a single motion pattern. The controller releases a locked state in response to reception of one of the plurality of release commands. The controller 180 displays preset screen information not a lock screen, on the display unit 151. The preset screen information may be a home screen page. The home screen page may include at least one object, and such object may be an icon or a widget of an application installed at the mobile terminal. When a locked state of the mobile terminal is converted into a released state, such home screen page is not necessarily output to the display unit 151 firstly. For instance, screen information, which has been output to the display unit 151 the most recently before the locked state is implemented, may be displayed as preset screen information.

The memory 160 may store therein information on a motion pattern which defines a plurality of release commands. The information on a motion pattern may include the number of taps which form a motion pattern, the order that the taps are applied, a distance between two consecutive taps, a moving direction of a tap. The controller 180 may determine whether sensed taps form the motion pattern, based the such information.

Each of the plurality of release commands may correspond to control information for displaying different screen information on the display unit 151. That is, when a locked state is released, screen information displayed on the display unit 151 may be variable according to a release command. Upon detection of a preset motion pattern of a first size, the controller 180 may display first screen information on the display unit 151. On the contrary, upon detection of a motion pattern of a second size different from the first size, the controller 180 may display second screen information different from the first screen information, on the display unit 151.

The plurality of release commands may include a first release command and a second release command. The first release command may be defined as a motion pattern formed on the display unit with a size larger than a reference size, and the second release command may be defined as a motion pattern formed on the display unit with a size smaller than the reference size.

Upon detection of taps which form a motion pattern on the display unit with a size larger than a reference size, or upon reception of the first release command, the controller 180 displays a first screen on an entire region of the display unit 151. On the contrary, upon detection of taps which form a motion pattern on the display unit with a size smaller than the reference size, or upon reception of the second release command, the controller 180 displays a second screen different from the first screen on a partial region of the display unit 151. Alternatively, the controller 180 displays the second screen on an entire region of the display unit 151, together with the first screen.

The second screen is a screen obtained by contracting the first screen by a reference ratio, and a position of the second screen on the display unit 151 is variable according to a region to which a motion pattern has been applied. As an example, if a motion pattern is formed on a left lower region of the display unit 151, the controller 180 displays the second screen on the left lower region of the display unit 151. As another example, if a motion pattern is formed on a right lower region of the display unit 151, the controller 180 displays the second screen on the right lower region of the display unit 151.

The reason is in order to provide a mobile terminal capable of enhancing a user's convenience by displaying a supplementary screen obtained by contracting an entire screen. For instance, a user may apply a tap onto the display unit 151 using his thumb while holding the mobile terminal with his one hand. That is, a user who controls the mobile terminal using his thumb has a limitation in applying a tap or a touch onto all regions of the display unit 151, due to a structure of the human body. More specifically, if a user holds the mobile terminal using his left hand, a region to which the user can apply a tap or a touch corresponds to a left lower region of the display unit 151. On the contrary, if a user holds the mobile terminal using his right hand, a region to which the user can apply a tap or a touch corresponds to a right lower region of the display unit 151. As the size of the display unit 151 becomes larger, a user has a more difficulty in applying a tap or a touch onto all regions of the display unit 151. Accordingly, the user should control the mobile terminal with holding the mobile terminal using his one hand, and with touching a touch screen using his another hand. That is, if the mobile terminal has a large screen, a user should control the mobile terminal using his two hands.

In order to solve such problem, upon detection of taps which form a motion pattern on the display unit 151 with a size smaller than a reference size, the controller 180 displays a supplementary screen obtained by contracting an entire screen. A position of the second screen on the display unit 151 is variable according to a region to which a motion pattern has been applied.

If a preset motion pattern has been applied to the display unit 151 and the last tap among taps which form the motion pattern is in a contacted state to the terminal body, the controller 180 displays one or more graphic objects corresponding to different functions, around a region where the last tap has been sensed. Upon detection of a drag input which starts from the last tap toward one of the graphic objects, the controller 180 performs a function corresponding to the graphic object. That is, the controller may execute at least one application according to the drag input. For instance, if a motion pattern which defines a release command has been applied to the display unit 151 and the last tap among taps which form the motion pattern is in a contacted state to the terminal body, the controller 180 may release a locked state, may activate one or more regions on the display unit 151, and may display the graphic object on said one or more regions. Upon detection of a drag input which starts from the last tap toward the graphic object, the controller 180 may execute a photo application.

Even if a plurality of taps on the display unit 151 have been sensed in a deactivated state of the display unit 151, a motion pattern formed by the sensed taps may not match a preset motion pattern for releasing a locked state. That is, taps unrelated to a locked-state releasing function (i.e., an erroneous motion pattern) may be sensed. In this case, the controller 180 does not release a locked state, but maintains a deactivated state of the display unit 151. That is, the controller 180 ignores a sensed tap. The controller 180 informs a user that taps have been erroneously applied (i.e., there is no function to be performed), using a light emitting unit. For instance, the light emitting unit may inform a user that taps have been erroneously applied, by flicking red light plural times.

Erroneous motion patterns may be consecutively sensed. That is, taps unrelated to a locked-state releasing function may be repeatedly sensed a predetermined number of times within a predetermined time. In this case, the controller 180 maintains a locked state, activates the display unit 151, and displays a lock screen for inputting a password. Repeated inputs of incorrect motion patterns mean that a user does not know a password. Accordingly, the controller 180 displays, on the display unit 151, a lock screen for releasing a locked state. A user may input a password using a virtual keypad of the lock screen, not using a tap. Then the user may convert a locked state into a released state.

The controller 180 executes a low power mode (or a dose mode) in a deactivated state of the display unit 151. Hereinafter, a method for sensing a tap on the display unit 151 in a low power mode of a mobile terminal according to an embodiment of the present invention will be explained in more detail with reference to FIG. 9.

Figure 9:
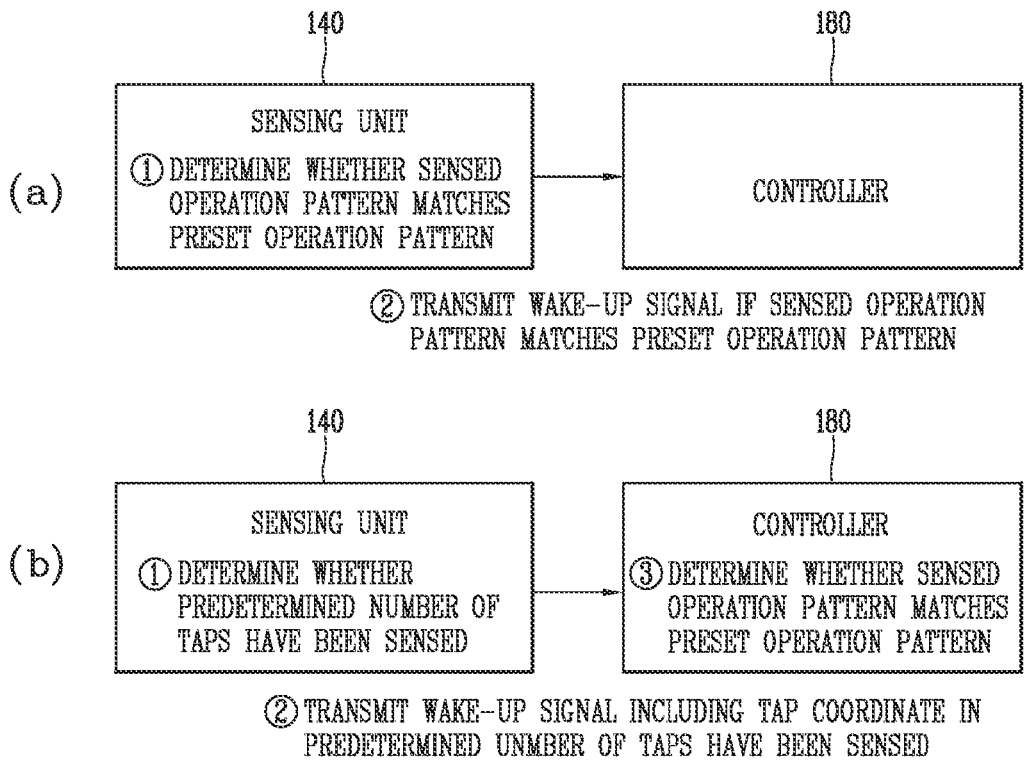
FIG. 9 is a conceptual view for explaining components configured to sense a user's motion pattern in a mobile terminal according to an embodiment of the present invention.

FIG. 9 is a conceptual view for explaining components configured to sense a user's motion pattern in a mobile terminal according to an embodiment of the present invention. The components configured to sense a user's motion pattern include the controller 180 and the sensing unit 140.

The controller 180 of the mobile terminal 100 executes a low power mode when the display unit 151 is deactivated. In the low power mode, the controller 180 performs only arithmetic operations absolutely necessary to operate the mobile terminal. However, the sensing unit 140 may sense a tap on the display unit 151 even in a deactivated state of the display unit 151.

The sensing unit 140 may be additionally provided with a registry and an execution processor. As shown in FIG. 9(*a*), the sensing unit 140 may determine whether sensed taps form a preset motion pattern. For instance, if a password for releasing a locked state is set, the controller 180 stores, in the registry, information on a motion pattern set by the password. The execution processor of the sensing unit 140 determines whether the sensed taps form a preset motion pattern in a deactivated state of the display unit 151, based on the information stored in the memory. If it is determined that a preset motion pattern has been sensed, the sensing unit 140 transmits, to the controller 180, a wake-up signal for waking controller 180 up. The controller 180 executes a locked-state releasing function in response to the wake-up signal. In this case, whether a motion pattern has been sensed or not is determined by the sensing unit 140 which uses a relatively low power. As a result, power consumption due to arithmetic operations by the controller 180 can be reduced.

As shown in FIG. 9(*b*), the sensing unit 140 may determine whether a predetermined number of taps which form a motion pattern have been sensed. Upon detection of a predetermined number of taps, the sensing unit 140 transmits, to the controller 180, a wake-up signal including coordinate values of the taps. For instance, upon detection of 4 taps, the sensing unit 140 may transmit, to the controller 180, a wake-up signal including coordinates information on each of the 4 taps. The controller 180 having received the wake-up signal determines whether the sensed taps form a preset motion pattern. That is, the controller 180 determines whether a sensed motion pattern matches a preset motion pattern. In this case, the sensing unit 140 having a relatively low price is used. As a result, manufacturing cost of the mobile terminal can be reduced.

Although not shown, the sensing unit 140 may sense a first tap and transmit a wake-up signal to the controller 180, in a deactivated state of the display unit 151. That is, whenever a tap is sensed, the sensing unit 140 transmits a coordinate value of the sensed tap to the controller 180. Then the controller 180 determines whether real time-sensed taps form a preset motion pattern.

In the mobile terminal according to the present invention, whether a motion pattern has been sensed or not is determined by a different subject. For convenience, it is assumed that whether a motion pattern has been sensed or not is determined by the controller 180.

In case of analyzing a motion pattern formed by sequentially connecting points of sensed taps with one another, the controller 180 uses only taps applied within a predetermined time. For instance, if a second tap is sensed after a predetermined time (e.g., 1 second) lapses from a time point when a first tap has been sensed, the controller 180 ignores the first tap. That is, the controller 180 uses the second tap as an initial tap included in the motion pattern.

If taps more than taps which form a preset motion pattern are consecutively applied, the controller 180 ignores the applied taps. For instance, under an assumption that a preset motion pattern is formed by 4 taps, 10 taps may be consecutively applied. Even if four taps included in the 10 taps form the preset motion pattern, the controller 180 ignores the 10 taps. This is in order to prevent a malfunction of the mobile terminal resulting from the occurrence of a user's unintentional tap.

Figure 10A:
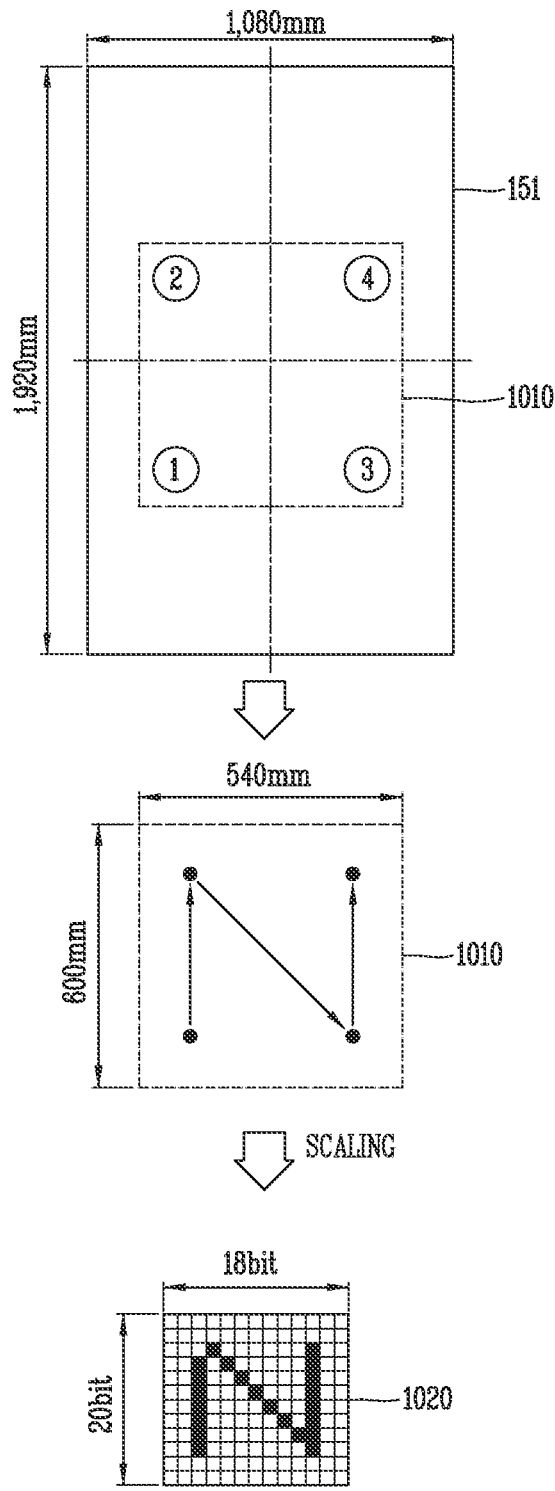

Hereinafter, a method to sense a motion pattern in a mobile terminal according to the present invention will be explained with reference to FIGS. 10A and 10B. FIGS. 10A and 10B are conceptual views for explaining a method to sense a user's motion pattern by the components of FIG. 9.

Referring to FIG. 10A, the sensing unit 140 senses a plurality of taps on the display unit 151, in a deactivated state of the display unit 151. The controller 180 may calculate a region 1010 to which the plurality of taps have been applied, and may perform a scaling with respect to the extracted region, into a bitmap 1020 of a preset size. The bitmap 1020 indicates an image obtained by converting a tap-applied position and a non-applied position into 1 and 0. For instance, a region obtained by sequentially connecting points of taps sensed on the bitmap 1020 is expressed as '1', and other regions are expressed as '0'. As a result, a motion pattern formed by connecting points of taps with one another may have a prescribed size (e.g., 'N').

The controller 180 compares the bitmap 1020 with a reference bitmap corresponding to a preset motion pattern. Then the controller 180 determines whether sensed taps form the preset motion pattern according to a comparison result, or based on a matching rate.

Further, the controller 180 may calculate direction vectors formed by an $n-1^{th}$ tap and an $n^{th}$ tap, and may determine whether sensed taps form a preset motion pattern based on the calculated direction vectors. For instance, in a case where first to fourth taps have been applied as shown in FIG. 10B, coordinate values (P1, P2, P3, P4) may be calculated. The controller 180 may calculate a direction vector toward a point of a second tap from a point of a first tap, by comparing with a preset vector value ('0' in FIG. 10B). The controller 180 may calculate direction vectors from the firstly-sensed tap to the lastly-sensed tap, and may determine whether sensed taps form a preset motion pattern by comparing the calculated direction vectors 1030 with vector values corresponding to a preset motion pattern.

Figure 12A:
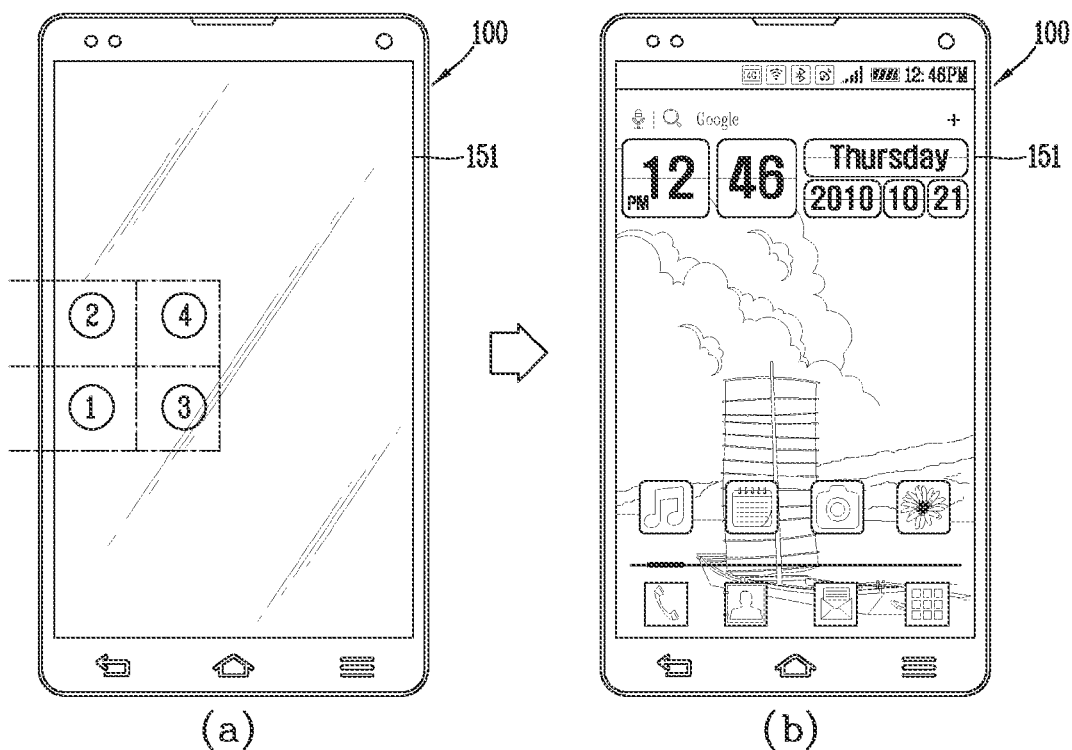
Figure 12B:
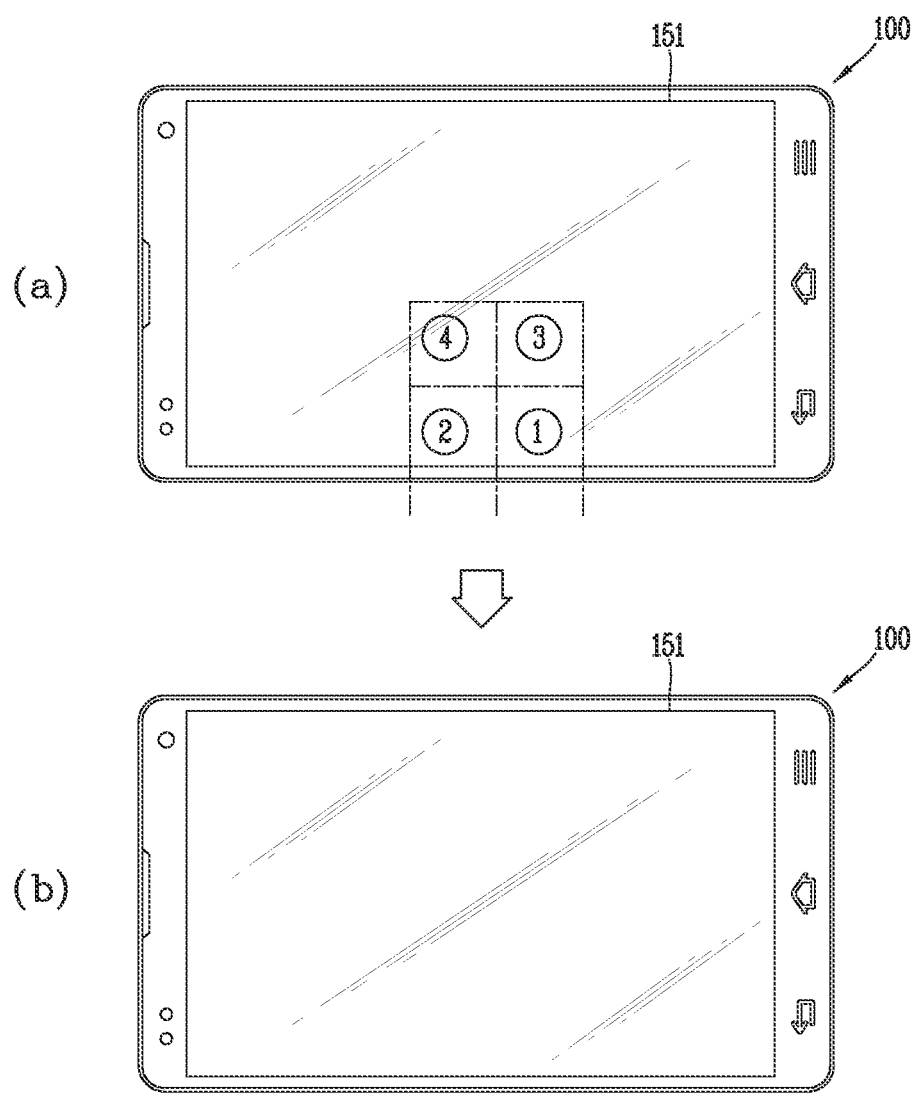

FIGS. 11, 12A and 12B are conceptual views for explaining a method to control a mobile terminal with respect to a terminal posture according to an embodiment of the present invention.

In a case where a plurality of taps have been sensed in a deactivated state of the display unit 151, the controller 180 may sense a posture of the terminal body when the taps have been applied, and may determine whether to release a locked state or not based on the sensed posture of the terminal body. That is, if taps are applied to preset positions in a preset order, the controller 180 may recognize a motion pattern formed by the taps as an erroneous motion pattern, according to the sensed posture of the terminal body.

A released state may mean a state that a locked state has been released. The mobile terminal which is in a released state may recognize a control command input from a user. In the released state, a specific function may be executed in response to the user's control command. For instance, if a locked state of the mobile terminal is converted into a released state, the controller 180 may execute one of a plurality of applications installed at the mobile terminal, in response to a user's control command.

As aforementioned, in a case where a plurality of taps have been sensed in a deactivated state of the display unit 151, the sensing unit may sense a posture of the terminal body. The sensing unit may sense a posture of the terminal body using various sensors provided at the mobile terminal. Such sensors for sensing a posture of the terminal body may include a gravity sensor, a geomagnetic sensor, an inertia sensor, a gyro sensor, etc.

The posture of the terminal body sensed by the sensing unit may include a rotation angle of the terminal body, a rotation direction of the terminal body, a rotation speed of the terminal body, a rotation acceleration of the terminal body, etc.

More specifically, as shown in FIG. 11, the posture of the terminal body may be a relative position of a first direction of the terminal body, e.g., a vertical direction of the terminal body, with respect to a virtual reference axis (A-A'). The relative position of the first direction of the terminal body may be variable according to an angle between the terminal body and the virtual reference axis (A-A'). For instance, as shown in FIGS. 11(*a*) and 11(*b*), the relative position of the first direction of the terminal body may be implemented as a position parallel to the virtual reference axis (A-A'). This may mean that an angle between the terminal body and the virtual reference axis is 0° or 180°.

As shown in FIGS. 11(*c*) and 11(*d*), the relative position of the first direction of the terminal body may be implemented as a position perpendicular to the virtual reference axis (A-A'). This may mean that an angle between the terminal body and the virtual reference axis is 90° or 270°.

Hereinafter, preferred embodiments will be explained with reference to the four postures of the terminal body shown in FIGS. 11(*a*)~11(*d*). However, the present invention is not limited to this. That is, the angle between the terminal body and the virtual reference axis may have various values.

In the present invention, the posture of the terminal body may be determined based on the virtual reference axis (A-A'), or based on a relative position with respect to a user. For instance, the mobile terminal of the present invention may further include a camera unit 121 configured to receive a user's facial image. The controller 180 may determine a relative position of the terminal body with respect to the user's facial image. The controller 180 may recognize the pupils from the user's facial image, and may determine a relative position of the terminal body with respect to the user's facial image. The controller 180 may control the mobile terminal in a different manner according to the determined relative position of the terminal body.

In the present invention, the posture of the terminal body is sensed based on the virtual reference axis. However, the posture of the terminal body may be sensed based on a user's position.

The controller 180 determines whether a plurality of taps on the display unit 151 form a preset motion pattern, based on the posture of the terminal body. That is, the controller 180 may perform a different operation according to whether the posture of the terminal body is a first posture or a second posture, even if taps have been sequentially sensed on the same position. The different operation may indicate an operation to release a locked state, or an operation to ignore sensed taps. For instance, as shown in FIGS. 12A and 12B, an operation to release a locked state may be performed or may not be performed according to whether the posture of the terminal body is a first posture or a second posture, even if taps have been applied to preset points in a preset order.

In conclusion, a preset motion pattern is set based on a gravity direction. If a motion pattern, formed by sequentially connecting points (positions) of taps with one another based on the gravity direction, matches the preset motion pattern, an operation to release a locked state is performed regardless of the posture of the terminal body. For instance, as shown in FIGS. 12A and 12C, if a motion pattern applied to the mobile terminal matches a preset motion pattern based on the gravity direction, even if the posture of the mobile terminal is different, an operation to release a locked state is performed.

Figure 13A:
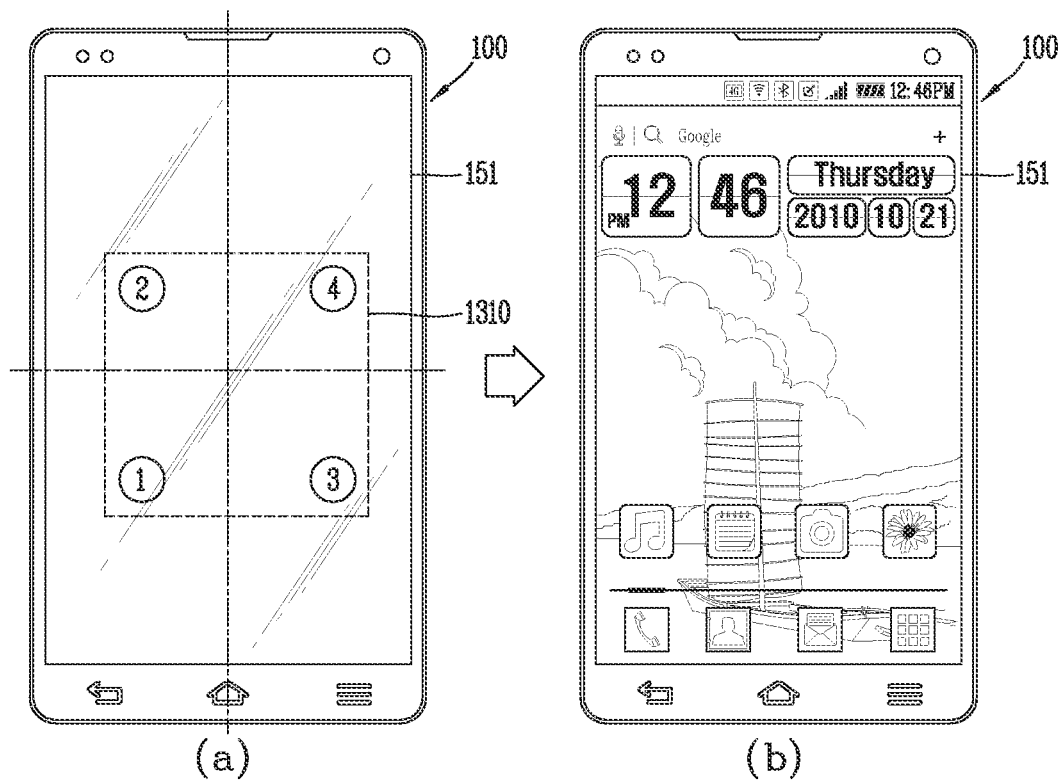
FIGS. 13A to 13C are conceptual views for explaining a method to display different screens according to a release command in a mobile terminal according to an embodiment of the present invention.
Figure 13B:
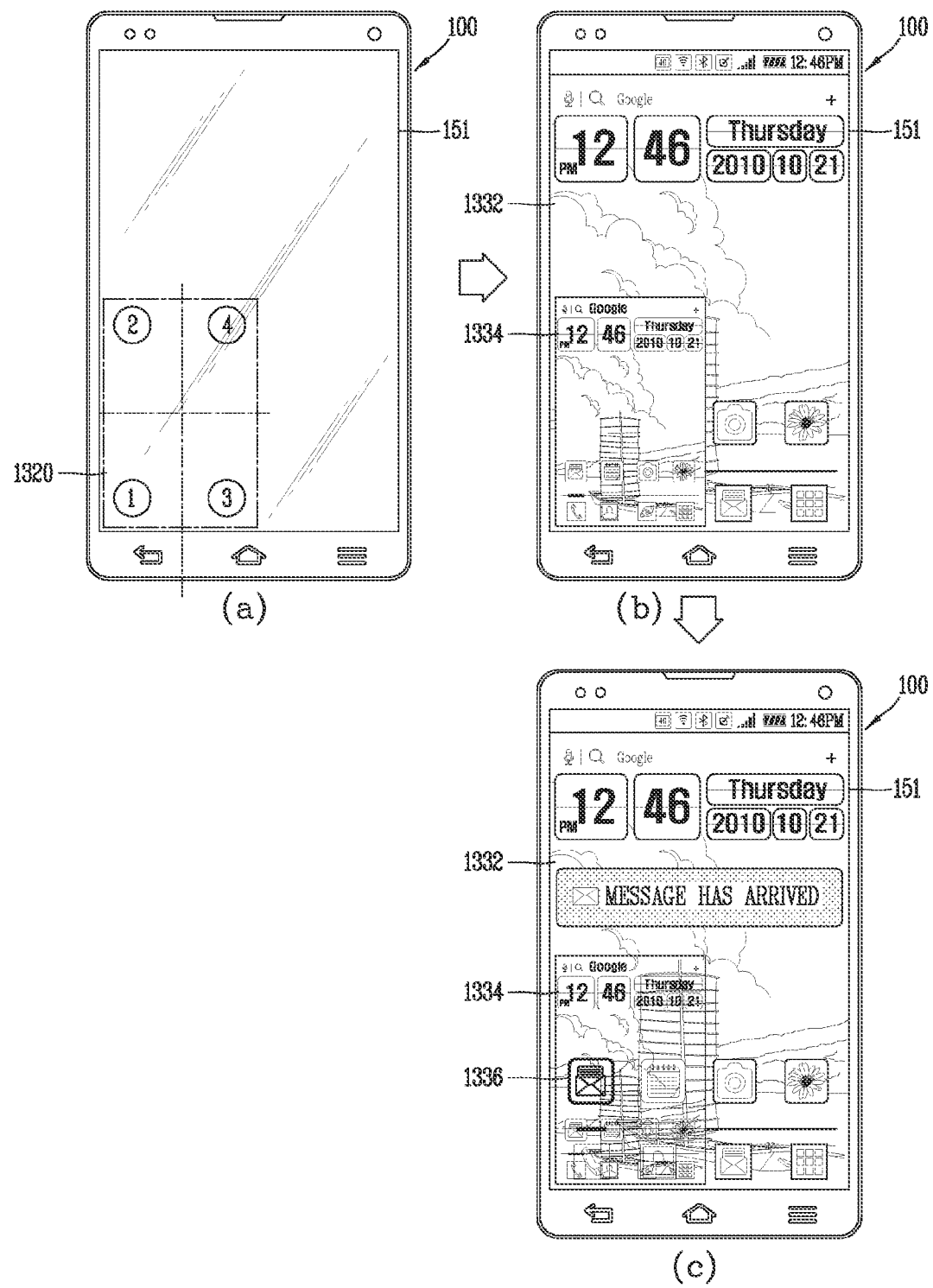
Figure 13C:
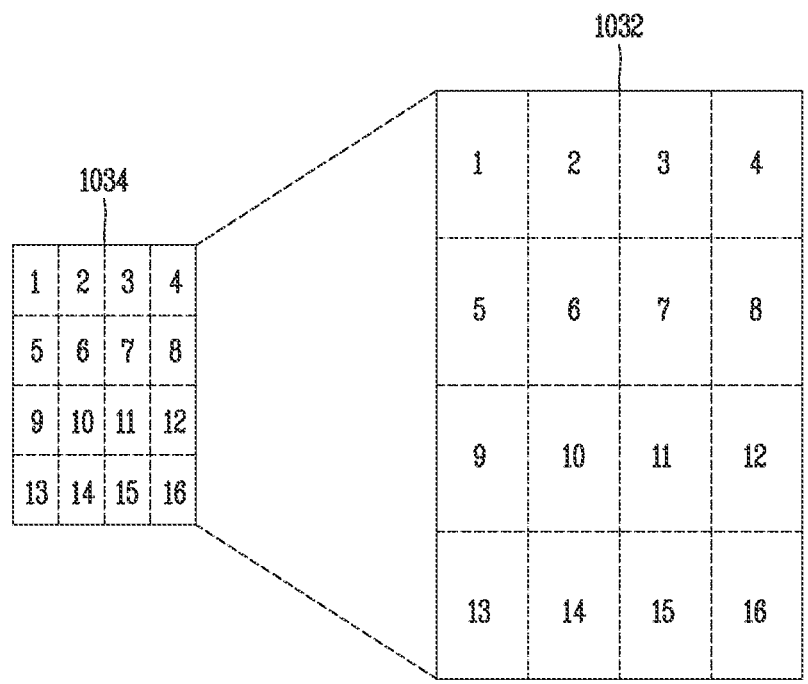

FIGS. 13A to 13C are conceptual views for explaining a method to display different screens according to a release command in a mobile terminal according to an embodiment of the present invention.

In the mobile terminal according to an embodiment of the present invention, a user's motion pattern may be input to a region having a size larger than a reference size, or a region having a size smaller than the reference size. The reference size may be variously modified in preferred embodiments.

As shown in FIG. 13A, a motion pattern is applied to a region 1310 having a size equal to or larger than the reference size, the controller 180 displays preset screen information on an entire region of the display unit 151, as an entire screen.

As shown in FIG. 13B(a), a motion pattern is applied to a region 1320 having a size smaller than the reference size, the controller 180 displays a supplementary screen 1334 obtained by contracting the preset screen information with a predetermined ratio, on a partial region of the display unit 151. The region 1320 having a size smaller than the reference size may be divided into a plurality of regions by virtual lines.

The supplementary screen 1334 may be displayed on a region of the entire screen 1332 displayed on an entire region of the display unit 151. In this case, the region of the entire screen 1332 is blocked by the supplementary screen 1334. Alternatively, the supplementary screen 1334 may overlay the entire screen 1332. In this case, the supplementary screen 1334 may be displayed in a semi-transparent state.

The controller 180 determines a position of the supplementary screen according to a region to which a motion pattern has been applied. The controller 180 displays the supplementary screen around the region to which a motion pattern has been applied.

A size of the supplementary screen corresponds to a size of a region on the display unit 151 to which a motion pattern has been applied. That is, the size of the supplementary screen may be variable according to the size of a region on the display unit 151 to which a motion pattern has been applied. The region, to which a motion pattern has been applied, is formed within a distance where a user's thumb can move. Accordingly, the supplementary screen for providing a convenient user's input should be also displayed within a distance where a user's thumb can move. Although not shown, the supplementary screen may be displayed in a preset size, and may have its size controllable by a user's input.

In a state where the supplementary screen has been displayed together with the entire screen, a user's input for controlling an operation of the mobile terminal is performed on the supplementary screen. The controller may derive a coordinate value on the entire screen, which corresponds to a coordinate value on the supplementary screen selected by a user's input. Accordingly, even if a user's input is performed on the supplementary screen, the same effect as a user's input on the entire screen may be generated. A correlation between coordinate values on the entire screen and coordinate values on the supplementary screen may be stored in the memory.

FIG. 13C is an exemplary view illustrating a correlation between coordinate values on the entire screen and coordinate values on the supplementary screen. Referring to FIG. 13, a relatively small screen (left side) is defined as the supplementary screen 1034, and a relatively large screen (right side) is defined as the entire screen 1332. For convenience, it is assumed that each of the supplementary screen 1334 and the entire screen 1332 is divided into 16 regions. It is also assumed that the 16 regions of the supplementary screen 1334 are defined as $1^{st}$~$16^{th}$ region of the supplementary screen 1334, and the 16 regions of the entire screen 1332 are defined as $1^{st}$~$16^{th}$ region of the entire screen 1332. If the $5^{th}$ region of the supplementary screen 1334 is touched by a pointer, the controller may recognize that the $5^{th}$ region of the entire screen 1332 has been touched. If the pointer has moved to the $5^{th}$ region, the $6^{th}$ region, and the $10^{th}$ region of the supplementary screen 1334, sequentially, the controller may recognize that the pointer has moved to the $5^{th}$ region, the $6^{th}$ region, and the $10^{th}$ region of the entire screen 1332, sequentially.

FIG. 13C is merely an example for explaining that coordinate values of the supplementary screen 1334 correspond to coordinate values of the entire screen 1332. Accordingly, the present invention is not limited to FIG. 13C. As shown in FIG. 13C, each of the supplementary screen 1334 and the entire screen 1332 may be divided into 'n' regions, and the respective regions of the supplementary screen 1334 may be made to match the respective regions of the entire screen 1332. However, the supplementary screen 1334 and the entire screen 1332 may be correlated with each other in various manners, e.g., a point-to-point scheme using coordinate values of selected points.

If a coordinate value on the entire screen which corresponds to a coordinate value on the supplementary screen selected by a user's input is blocked by the supplementary screen, the controller may control the display unit 151 so that an opaque state of the supplementary screen can be converted into a semi-transparent state or a transparent state.

If a region of the entire screen blocked by the supplementary screen is selected in a semi-transparent state of the supplementary screen, the controller may control the display unit 151 so that the supplementary screen is displayed in a transparent state, or so that transparency of the supplementary screen can be increased.

Referring to FIG. 13C, it is assumed that the supplementary screen 1334 is displayed on the $9^{th}$ region of the entire screen 1332 in an overlaying manner. If a pointer has moved to the $6^{th}$ region, the $5^{th}$ region, and the $9^{th}$ region of the supplementary screen 1334, sequentially, the controller may recognize that the pointer has moved to the $6^{th}$ region, the $5^{th}$ region, and the $9^{th}$ region of the entire screen 1332, sequentially. In this case, the controller may control a current state of the supplementary screen 1334 to be converted into a semi-transparent state or a transparent state, as soon as the pointer has moved to the $9^{th}$ region of the supplementary screen 1334. Under such configuration, a user can recognize that a user's input is being applied even to a region of the entire screen 1332 blocked by the supplementary screen 1334.

If an event occurs from the mobile terminal while the supplementary screen is being displayed, the controller 180 may control a notification message so as to be displayed on the display unit 151. If an entire region or a partial region of the notification message is blocked by the supplementary screen, the controller 180 may control the display unit 151 so that an opaque state of the supplementary screen 1334 can be converted into a semi-transparent state or a transparent state.

If a notification message blocked by the supplementary screen is displayed on the display unit 151 in a semi-transparent state of the supplementary screen, the controller 180 may control the display unit 151 so that the supplementary screen is displayed in a transparent state, or so that transparency of the supplementary screen can be increased.

As shown in FIG. 13B(c), if an event occurs from the mobile terminal in a state where the supplementary screen 1334 has been displayed on the entire screen 1332 in an overlaying manner, the controller 180 may control a notification message such as "A message has arrived." so as to be output to the display unit 151. If an entire region or a partial region of the notification message is blocked by the supplementary screen 1334, the controller 180 may control the display unit 151 so that an opaque state (current state) of the supplementary screen 1334 can be converted into a semi-transparent state or a transparent state. As the current state of the supplementary screen 1334 is converted into a semi-transparent state or a transparent state, a user can easily check contents of the notification message.

If an icon 1336 related to the notification message is blocked by the supplementary screen 1334, the controller 180 may control transparency of the supplementary screen 1334, and may highlight the icon for distinction from other icons. This can allow a user to execute a related application using the icon related to the notification message.

The controller 180 may control the supplementary screen so as not to be displayed on the display unit 151, based on a user's input. If necessary, a user may control the supplementary screen so as to be displayed on the display unit 151.

Figure 14:
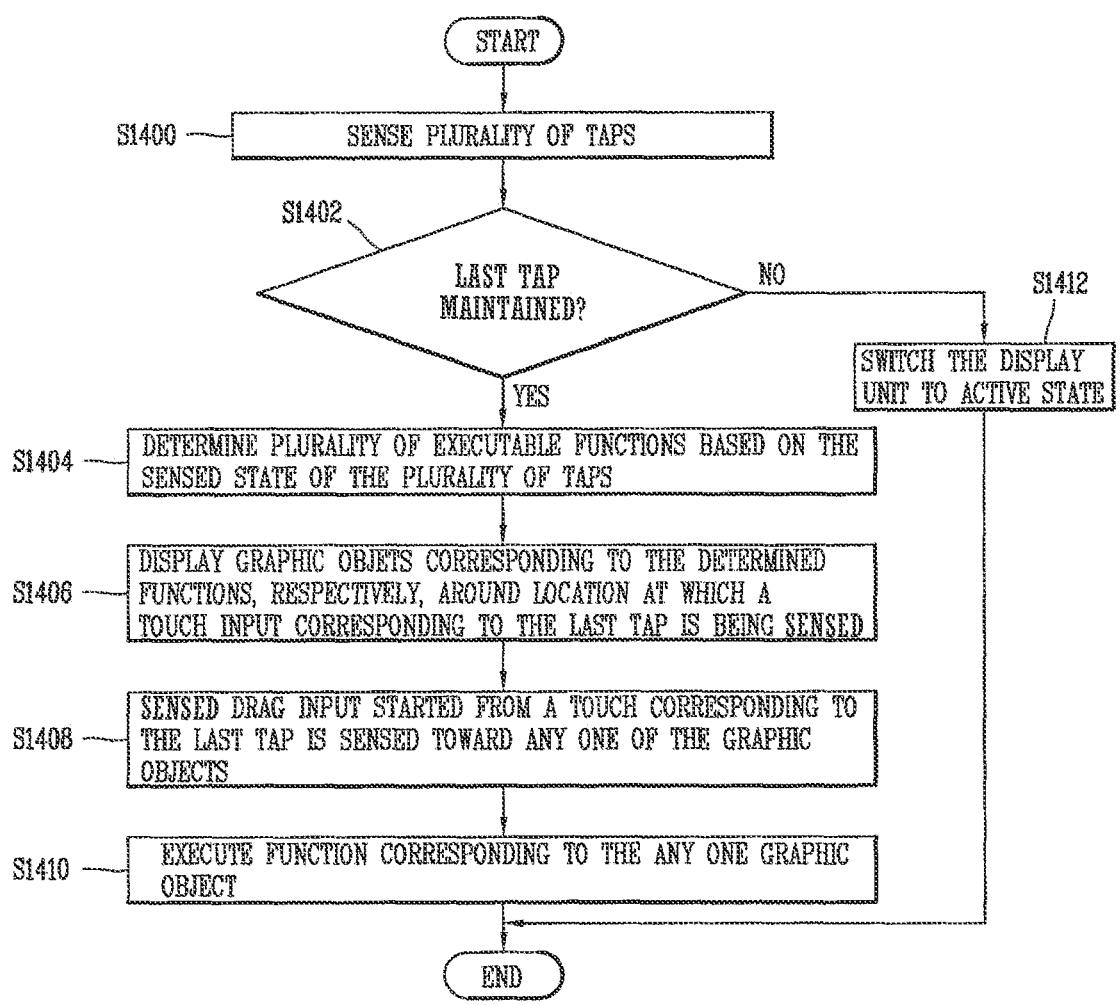
FIG. 14 is a flow chart for explaining a control method of a mobile terminal according to an embodiment of the present disclosure.
Figure 15A:
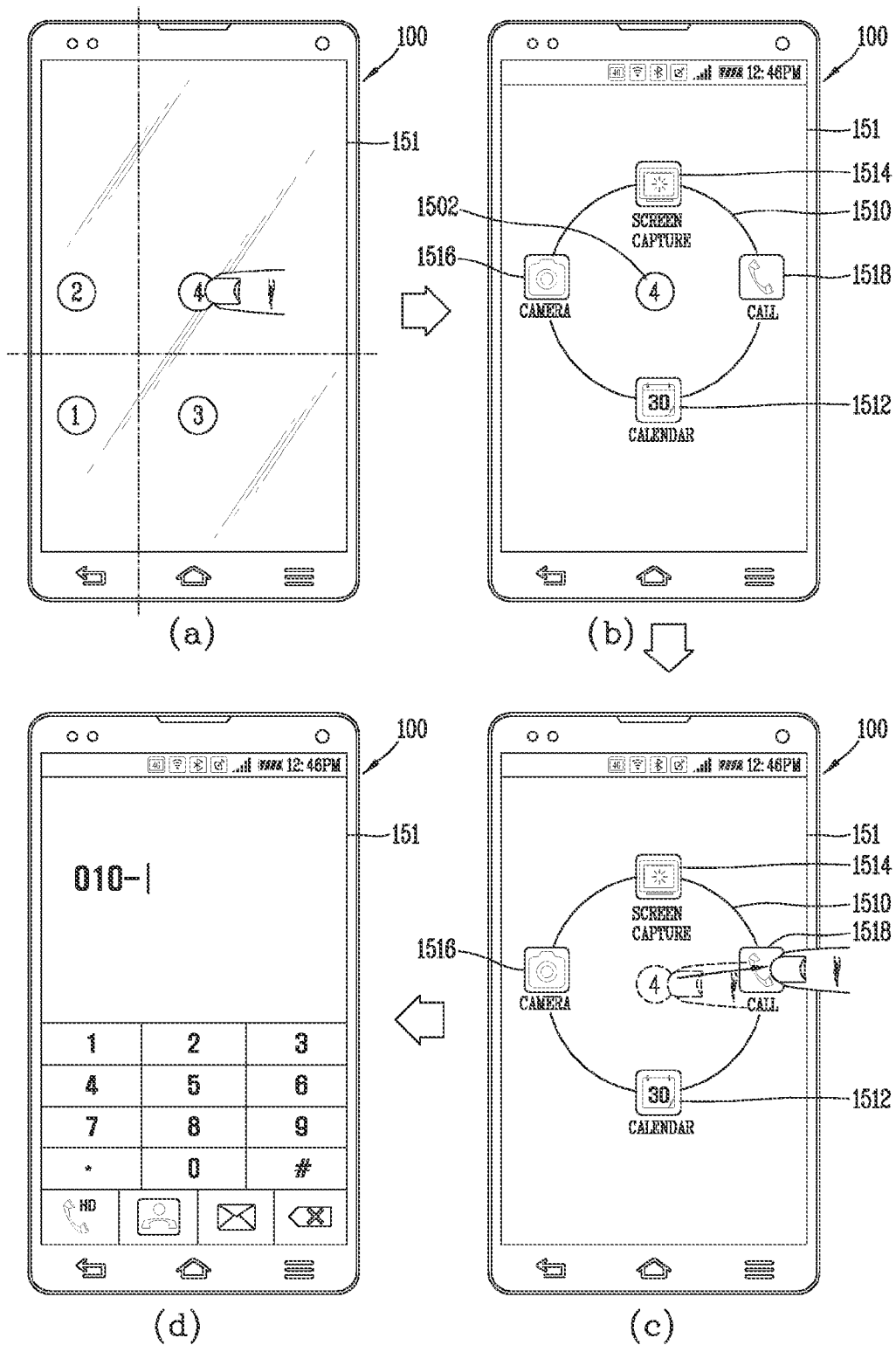
FIGS. 15A and 15B are conceptual views for explaining a method to control a mobile terminal in a case where a last tap has not been released, but is in a contacted state with a display unit, according to an embodiment of the present invention.

FIG. 14 is a flow chart for explaining a control method of a mobile terminal according to an embodiment of the present disclosure, and FIG. 15A is a view illustrating an example in which a specific function is executed according to the method illustrated in FIG. 14.

When a plurality of taps are applied by a user while maintaining a state that the illumination of the display unit 151 is turned off but at least one of the touch sensor and acceleration sensor is turned on, such as while the display unit 151 is in an inactive state, namely, in a doze mode state, the mobile terminal 100 according to an embodiment of the present disclosure may immediately execute a specific function based on the user's selection. Furthermore, here, the plurality of taps may be sensed from at least one of the touch sensor and acceleration sensor.

As a result, when a plurality of taps are applied to the body of the mobile terminal 100 even while the display unit 151 is in an inactive state, the controller 180 may sense it through at least one of the acceleration sensor and touch sensor.

Here, the plurality of taps may include at least one taps directly applying to the body of the mobile terminal 100 or applying an object sufficiently close to the mobile terminal 100. In other words, all the plurality of taps may be directly applied to the body of the mobile terminal 100 or applied to an object adjacent to the mobile terminal 100. Otherwise, some of the plurality of taps may be applied to the body of the mobile terminal 100, and some of the remaining taps may be applied around the mobile terminal 100.

In this case, the controller 180 may sense a tap directly applied to the body of the mobile terminal 100 using a touch sensor, and a vibration generated due to a tap applied to an object located sufficiently close to the mobile terminal 100 using an acceleration sensor. In other words, the controller 180 may sense a plurality of taps in a first mode using only the acceleration sensor, or a second mode using only the touch sensor or a hybrid mode using both the acceleration sensor and touch sensor based on the type of applying the plurality of taps.

On the other hand, when a plurality of taps are applied, it is of course possible to activate the status of the display unit 151 based on the plurality of taps. In other words, when an initial tap is sensed while the display unit 151 is turned off, for example, in a doze mode, the controller 180 of the mobile terminal 100 according to an embodiment of the present disclosure may sense it, and sense whether or not the user applies an additional tap. Furthermore, upon applying an additional tap, namely, a second tap, the controller 180 may allow the user to immediately execute at least one function based on a plurality of taps applied from the user.

On the other hand, upon sensing a plurality of taps in step S1400, the controller 180 senses whether or not a touch input state corresponding to the last tap among the plurality of sensed taps is maintained (S1402).

Furthermore, when a touch input state corresponding to the last tap among the plurality of sensed taps is not maintained, the controller 180 may determine the plurality of taps sensed during the step S1400 as an input for switching the mobile terminal 100 to a wake-up state. Accordingly, when a touch input state corresponding to the last tap among the plurality of sensed taps is not maintained as a result of the determination of the step S1402, the controller 180 activates the display unit 151, and switches the mobile terminal 100 to a wake-up state (S1412).

On the other hand, when a touch input state corresponding to the last tap among the plurality of sensed taps is maintained in the step S1402, the controller 180 may determine at least one function that can be contained in a "direct execution menu" based on the state in which the plurality of taps are sensed.

Here, the "direct execution menu" refers to a menu including at least one function that can be immediately executed in the mobile terminal 100 based on the user's additional selection when a plurality of taps are sensed from the user.

Here, functions that are immediately executable in the mobile terminal 100 may denote all types of functions that can be executed or driven in the mobile terminal 100 as described above. For example, the executable function may be an application installed in the mobile terminal 100. Otherwise, the executable function may be a function required for the system operation of the mobile terminal 100 such as a function for changing the setting information of the mobile terminal 100, a function for displaying a notification panel to display unacknowledged events, and the like.

Furthermore, the controller 180 may differently determine functions that can be contained in the direct execution menu according to the number of taps constituting the plurality of taps. For example, the controller 180 may determine that different functions are contained in the direct execution menu in case where two or three taps are sensed.

Furthermore, the controller 180 may determine that different functions are contained in the "direct execution menu" according to the number of touch inputs constituting the plurality of taps. For example, when the number of touch inputs constituting the plurality of tap is two or more, the controller 180 may allow a plurality of functions to be executed at the same time in the mobile terminal 100.

In this manner, different functions may be contained in the "direct execution menu" according to the state in which the plurality of taps are sensed. Furthermore, different functions determined according to the state in which the plurality of taps are sensed may be of course determined in an arbitrary manner according to the user's selection.

In other words, the user may set functions corresponding to the state in which the plurality of taps are sensed, respectively, in advance, and in this case, upon sensing a plurality of taps, the controller 180 may determine functions corresponding to the sensed state as functions contained in the "direct execution menu".

On the other hand, when a plurality of executable functions are determined based on the state in which the plurality of taps are sensed in step S1404, the controller 180 may display a "direct execution menu 1510" including graphic objects corresponding to the determined functions, respectively, on the display unit 151.

For example, when two taps are sensed, it is assumed that a screen capture function (SCREEN CAPTURE), a call function (CALL), an calendar function (CALENDAR), and a camera function (CAMERA) are set from the user to correspond to the two taps as functions that can be contained in the direct execution menu. In this case, as illustrated in FIG. 15A, a direct execution menu including graphic objects 1512, 1514, 1516, 1518 corresponding to functions, respectively, set to correspond to the two taps may be displayed on the display unit 151.

Here, the controller 180 may display the "direct execution menu 1510" adjacent to a location at which a touch input corresponding to the last tap 1502 is sensed as illustrated in FIG. 15A(b).

In this state, the controller 180 may select any one of graphic objects 1512, 1514, 1516, 1518 contained in the direct execution menu 1510 with the intervention of the user. More preferably, the controller 180 may select the any one graphic object with the intervention of the user using the user's drag input started from a touch corresponding to the last tap 1502.

In other words, when a drag input is extended from a touch corresponding to the last tap 1502, the controller 180 may sense it (S1408). Furthermore, the controller 180 may select any one of graphic objects displayed around a location at which a touch input corresponding to the last tap 1502 is sensed based on the drag input.

For example, as illustrated in FIG. 15A(c), when a drag input started from a touch corresponding to the last tap 802 is sensed toward a direction in which a graphic object 1518 corresponding to the call function (CALL) is located, the controller 180 may determine that a function corresponding to the graphic object 1518, namely, a call function (CALL), is selected from the user.

In this manner, when determined that a function corresponding to any one of graphic objects contained in the direct execution menu, the controller 180 executes the selected function (S1410). FIG. 15A(d) illustrates an example in which a call function (CALL) is executed when the call function (CALL) is selected as illustrated in FIG. 15A(c).

Accordingly, when the user applies a plurality of taps, a mobile terminal according to an embodiment of the present disclosure may display graphic objects corresponding to at least one predetermined executable function adjacent to a location at which a touch input corresponding to the last tap among the plurality of taps is sensed based on the state in which the plurality of taps are sensed.

Furthermore, the controller 180 may allow the user to select any one of the executable functions using a drag input while maintaining the touch input. Accordingly, a mobile terminal according to an embodiment of the present disclosure may immediately execute a function desired to be executed by the user subsequent to switching the status of the mobile terminal to a wake-up state using a plurality of taps.

On the other hand, though it is illustrated in FIG. 15 that a specific function is executed based on a drag input started from a touch corresponding to the last tap 1502 as an example, it is of course possible to immediately execute a "specific operation using a specific function" based on the state in which the drag input is sensed.

Figure 15B:
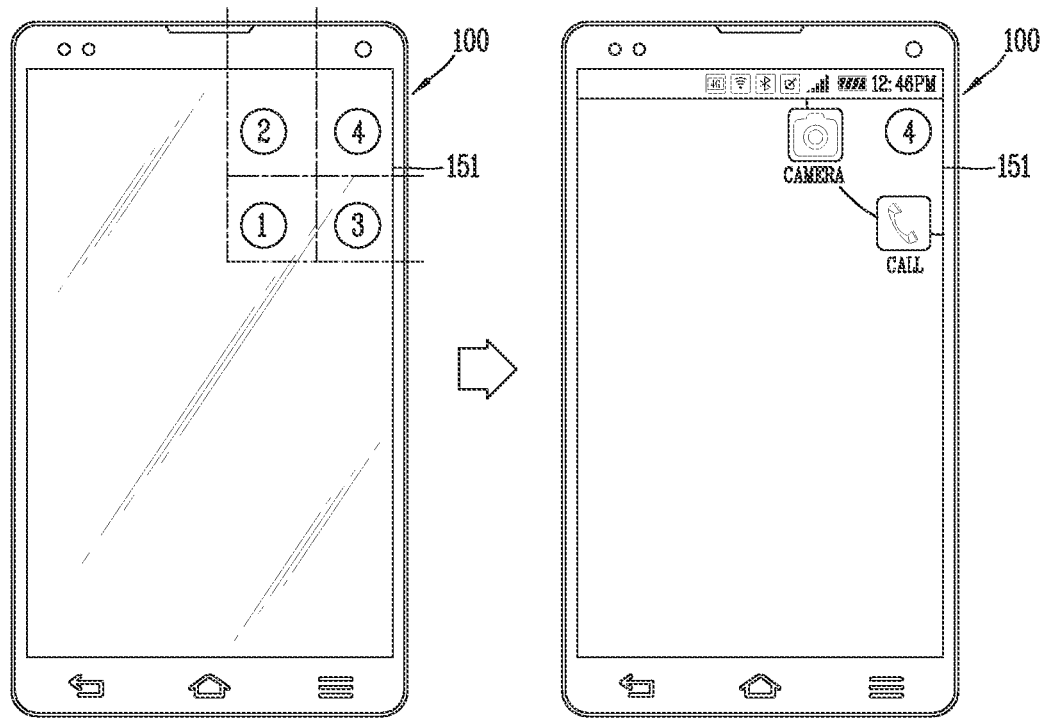

FIGS. 15A and 15B are conceptual views for explaining a method to control a mobile terminal according to an embodiment of the present invention, in a case where a last tap has not been released, but is in a contacted state with the display unit.

If a motion pattern formed by sequentially connecting points of sensed taps with one another matches a preset motion pattern, the controller 180 executes a locked-state releasing function. In a case where the last tap among taps which form a motion pattern maintains a contacted state with the terminal body ('holding state'), the controller 180 displays one or more graphic objects on a position where the last tap has been sensed. For instance, as shown in FIG. 15A, if the last tap (e.g., ④) among taps (①,②,③,④) which form a motion pattern is in a holding state, the controller 180 releases a locked state, and activates one or more regions of the display unit 151. Said one or more regions are variable according to a position where the last tap has been sensed, and include the position where the last tap has been sensed. The controller 180 displays one or more graphic objects on said one or more regions, based on the position where the last tap has been sensed.

The graphic objects may be displayed around a position where the last tap among a plurality of taps included in a second pattern has been sensed. Also, the graphic objects may be graphic objects having different functions.

The graphic objects may mean a menu including one or more functions which are executable in the mobile terminal 100. That is, the different functions may mean all types of functions which can be performed or driven in the mobile terminal 100. For instance, the executable function may be an application installed at the mobile terminal 100. Alternatively, the executable function may be a function necessary to operate the mobile terminal 100, e.g., a function to change setting information of the mobile terminal 100, a function to output a notification panel for displaying an unchecked event, etc. For instance, as shown in FIG. 15A, the controller 180 may display graphic objects corresponding to a screen capture function, a call function, a calendar output function and a camera function, respectively, on the display unit 151, in response to the second pattern.

Although not shown, if an event has occurred from the mobile terminal, the graphic objects displayed on the display unit 151 may be variable according to the event. For instance, if a message reception event has occurred from the mobile terminal, a graphic object corresponding to a screen capture function may be changed to a graphic object corresponding to a message check function. An event occurring from the mobile terminal may include a message reception event, a call reception event, an alarm generation event, etc.

Various graphic objects may be displayed on the display unit according to various types of events.

The controller 180 may receive input of one of graphic objects from a user. More specifically, the controller 180 may receive input of one of the graphic objects from a user, based on a drag input which starts from the last tap. For instance, as shown in FIG. 15A, if a drag input which starts from the last tap (e.g., ④) is performed toward a graphic object corresponding to a call function, the controller 180 may determine that the call function has been selected by a user.

Upon selection of one of the graphic objects, the controller 180 executes a function corresponding to the selected graphic object, and executes an application corresponding to the function. If the call function of FIG. 15A is selected, an execution screen corresponding to the call function may be displayed on an entire region of the display unit 151.

A position(s) of one or more graphic objects, and a type of the graphic object may be variable according to a holding position of the last tap. For instance, as shown in FIG. 15A, if a hold position of the last tap is a central region of the display unit 151, the controller 180 may display 4 graphic objects around the hold position of the last tap. As another example, as shown in FIG. 15B, if a hold position of the last tap is a corner region of the display unit 151, the controller 180 may display 2 graphic objects around the hold position of the last tap. The reason why 2 graphic objects are displayed is because the corner region does not have a size large enough to display all the graphic objects.

Figure 16:
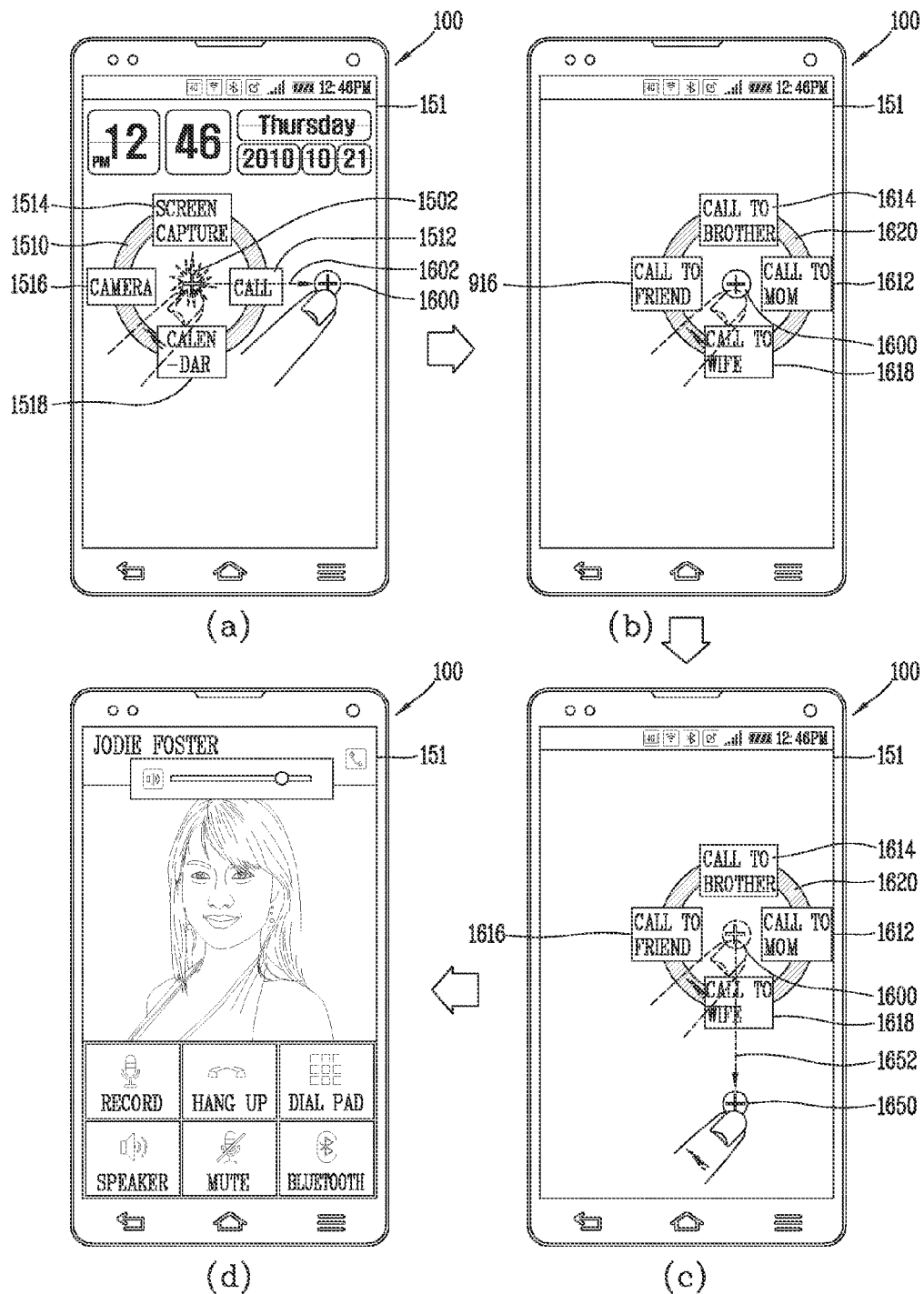
FIG. 16 is a view illustrating an example in which a specific operation is executed based on an applied tap and a user's drag input in a mobile terminal according to an embodiment of the present disclosure.

FIG. 16 is a view illustrating an example in which a specific operation is executed based on an applied tap and a user's drag input in a mobile terminal according to an embodiment of the present disclosure.

Referring to FIG. 16, when it is dragged to one position 1600 from a touch corresponding to the last tap 1502 as illustrated in FIG. 16(a), the controller 180 may determine that the drag input is to select a call function (CALL).

Furthermore, when a specific function, namely, a call function (CALL) is selected from the user, the controller 180 may sense whether or not the user's drag input is on hold at one position 1600. For example, when the user's drag input is on hold for more than a predetermined period of time at the one position 1600, the controller 180 may determine that the user's drag input is in a hold state.

As a result of the determination, when the user's drag input is not in a hold state, namely, when the user holds a drag input and separates a touch object such as a finger or the like from the display unit 151 by more than a predetermined distance, the controller 180 may execute a currently selected function. Accordingly, the controller 180 may execute a currently selected function, namely, a call function (CALL), and as a result, display a screen for receiving a phone number on the display unit 151 as illustrated in FIG. 15A(d).

However, when determined that the user's drag input is on hold at the one position 1600, the controller 180 may display a direct execution menu 1620 including graphic objects 1612, 1614, 1616, 1618 corresponding to specific operations, respectively, that are executable using a currently selected function, adjacent to the one position 1600 at which the drag input is on hold. For example, as illustrated in FIGS. 16(a) and 16(b), when the currently selected function is a call function (CALL), the direct execution menu may include graphic objects corresponding to operations associated with the call function (CALL).

Hereinafter, for the sake of convenience of explanation, a direct execution menu displayed to select a specific function is referred to as a first direct execution menu, and a direct execution menu for selecting any one of executable specific operations using the selected function subsequent to the selection of a specific function is referred to as a second direct execution menu.

On the other hand, the "specific operations" may be operations associated with a currently selected function. In other words, when the currently selected function is a call function (CALL), the "specific operations" may be phone call operations mapped to specific phone numbers to try a call to a specific counterpart (mom 1612, brother 1614, friend 1616, wife 1618) as illustrated in FIG. 16(b).

Furthermore, the "specific operations" may be differently determined according to a currently selected function. For example, when the currently selected function is a camera function (CAMERA), the "specific operations" may be a function for driving the camera 121 of the mobile terminal 100, for example, a picture or video capture function. Otherwise, it may be a picture view function capable of viewing pictures captured through the camera 121 or the like.

Accordingly, if the direction in which the user's drag is sensed is a direction in which a graphic object 1616 corresponding to the camera function (CAMERA) is located, the controller 180 may display graphic objects corresponding to picture capture, video capture and picture view adjacent to the hold state when the user's drag input is on hold.

The user may of course set such specific operations in advance to correspond to a specific function. For example, the user may set incoming operations configured to transmit a call signal to a specific counterpart, namely, mom 1612, brother 1614, friend 1616, and wife 1618 in advance to correspond to a call function (CALL).

In this case, when a call function (CALL) 1512 is selected by the user's drag input in the first direct execution menu 1510, the controller 180 checks that the user's drag input is on hold. Then, when the user's drag input is on hold, the controller 180 may display a second direct execution menu 1620 including graphic objects corresponding to incoming operations, respectively, configured to transmit a call to mom 1612, brother 1614, friend 1616, wife 1618 as illustrated in FIG. 16(b).

When the second direct execution menu 1620 is displayed on the display unit 151, the controller 180 may sense whether or not there is a drag input started from a location 1600 at which the current drag input is on hold. For example, when the user's drag input is extended from the hold location 1600 to another position 1650 on the display unit 151 as illustrated in FIG. 16(c), the controller 180 may determine that the user selects an "incoming operation for transmitting a call signal to wife 1618 among graphic objects contained in the second direct execution menu 1620 based on the direction in which the drag input is extended. Accordingly, the controller 180 may immediately perform an incoming operation for transmitting a call signal to a specific counterpart using a previously mapped phone number as illustrated in FIG. 16(d).

Accordingly, a mobile terminal according to an embodiment of the present disclosure may allow a user to select any one of the executable functions using a drag input extended from a touch input corresponding to the last tap among a plurality of taps as well as immediately execute even a specific operation using the selected function with one-touch.

On the other hand, the user may set specific operations using a specific function in advance, and set the number of specific taps corresponding to the set specific operations in advance, thereby, of course, executing a "specific operation using a specific function" immediately subsequent to the plurality of taps.

Figure 17:
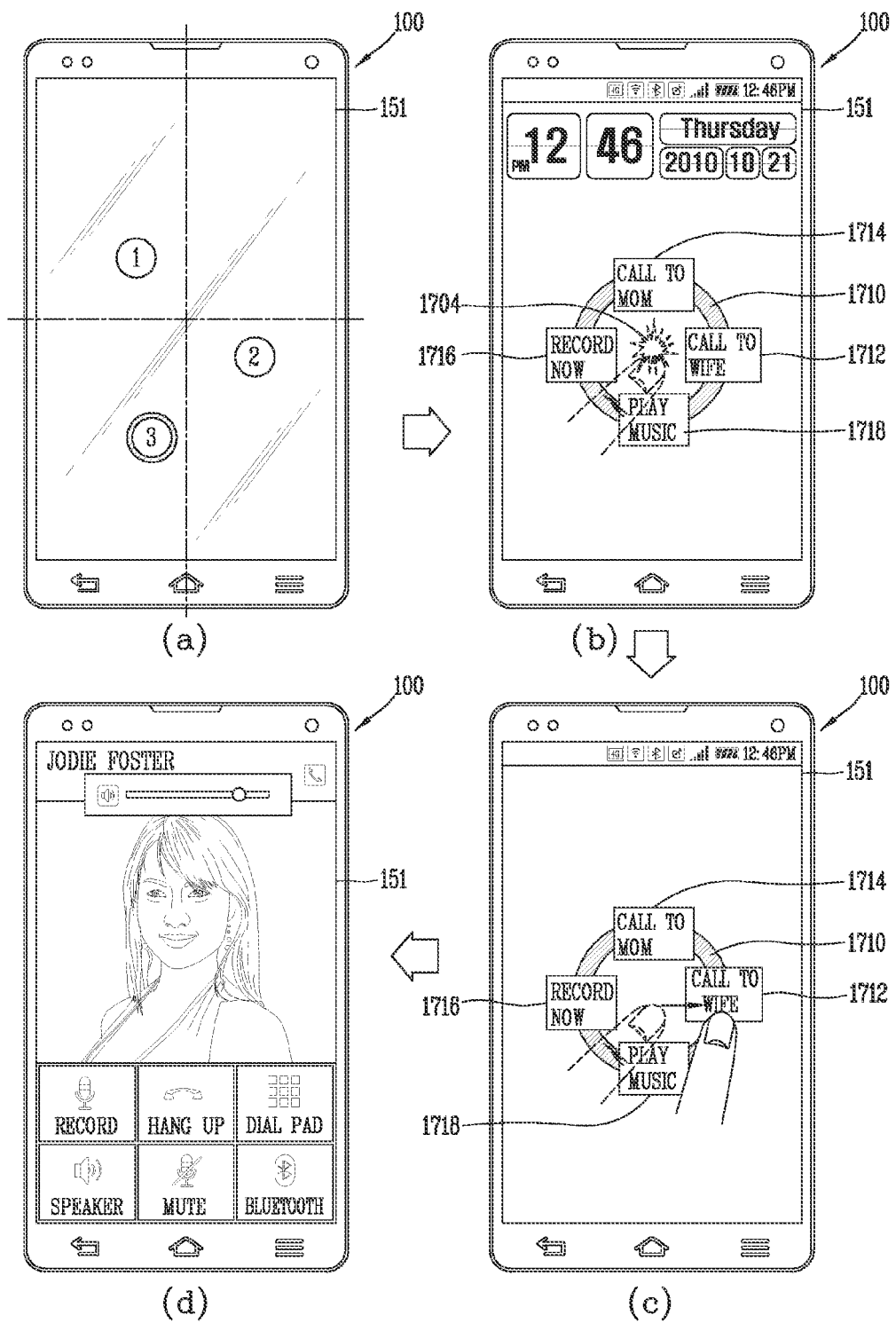
FIG. 17 is a view illustrating an example in which a specific function is executed based on the number of applied taps and a drag input in a mobile terminal according to an embodiment of the present disclosure.

FIG. 17 is a view illustrating an example in which a specific function is executed based on the number of applied taps and a drag input in a mobile terminal according to an embodiment of the present disclosure.

For example, the user may set functions to be contained in a direct execution menu in a different manner according to the number of tabs. As an example, when the first motion pattern is sensed, the controller may display graphic objects 1512, 1514, 1516, 1518 corresponding to a call function, a screen capture function, a camera function and notification panel display function, respectively, to be contained in a direct execution menu as illustrated in FIG. 15A(b). However, when the sensed motion pattern is changed, the user may set graphic objects corresponding to different functions to be contained in a direct execution menu.

For example, the controller 180 may set sequential application of first to third taps onto the first region, the fourth region and the third region, as a second motion pattern. When the second motion pattern is sensed, the controller 180 may further set a video function, an Internet function, a social network service (SNS) function, and a music play function, respectively, to be contained in a direct execution menu.

In this state, in case where the user applies a plurality of taps to the display unit 151, when the first motion pattern is sensed among the plurality of taps, the controller 180 may detect a call function, a screen capture function, a camera function, and a calendar function corresponding to the first motion pattern as illustrated in FIG. 15A. Furthermore, the controller 180 may allow a direct execution menu including graphic objects 1512, 1514, 1516, 1518 corresponding to the functions, respectively, to be displayed adjacent to a location at which a touch input corresponding to the last tap between the two taps is sensed.

However, when the second motion pattern is sensed among the plurality of taps, the controller 180 may display a direct execution menu including graphic objects corresponding to a video function, an Internet function, a social network service (SNS) function, and a music play function, respectively, adjacent to a location at which a touch input corresponding to the last tap among the three taps is sensed.

On the other hand, on the contrary, when effective taps are sensed three times, the user may set graphic objects corresponding to specific operations, respectively, using a specific function to be contained in a direct execution menu.

FIG. 17 illustrates an example in this case.

First, as illustrated in FIG. 17(a), when three effective taps are applied to the display unit 151 while the display unit 151 is turned off, for example, in a doze mode state, the controller 180 may activate the display unit 151 upon sensing the third effective tap. Furthermore, upon sensing the third effective tap, the controller 180 may detect "specific operations using a specific function" set to correspond to a case where three taps are sensed.

Furthermore, the controller 180 may display a direct execution menu including graphic objects corresponding to the "specific operations using a specific function" adjacent to a location at which a touch input corresponding to the last tap is sensed.

FIG. 17(b) illustrates such an example. For example, when the "specific operations using a specific function" are "call to wife", "call to mom", "recording now" and "play music", respectively, the controller 180 may display a direct execution menu 1710 including graphic objects 1712, 1714, 1716, 1718 corresponding to the specific operations, respectively, adjacent to a location at which a touch input corresponding to the last tap 1704 is sensed.

In this state, the controller 180 may sense whether or not there is a drag input started from a touch corresponding to the last tap 1704. Furthermore, when there is a drag input extended from a touch corresponding to the last tap 1704, the controller 180 may determine that any one of graphic objects 1712, 1714, 1716, 1718 contained in the direct execution menu 1710 is selected from the user based on the direction of the drag input.

For example, as illustrated in FIG. 17(c), when a drag input corresponding to the last tap 1704 is sensed toward the graphic object 1712 corresponding to the "call to wife" operation, the controller 180 may determine that the user has selected the "call to wife" operation". Accordingly, the controller 180 may immediately perform an incoming operation for transmitting a call signal to a specific counterpart, namely, "wife" using a previously mapped phone number as illustrated in FIG. 17(d).

On the other hand, according to the present disclosure, it has been disclosed that the plurality of taps may include at least one touch input, respectively. In this case, the controller 180 of the mobile terminal 100 according to an embodiment of the present disclosure may display a direct execution menu including graphic objects corresponding to different functions, respectively, on the display unit 151 based on the number of touch inputs constituting the plurality of taps.

Furthermore, here, graphic objects contained in the direct execution menu may correspond to a plurality of functions, respectively. In addition, if a graphic object corresponding to a plurality of functions is selected based on the user's drag input, then the controller 180 may of course execute the plurality of functions at the same time.

Figure 18:
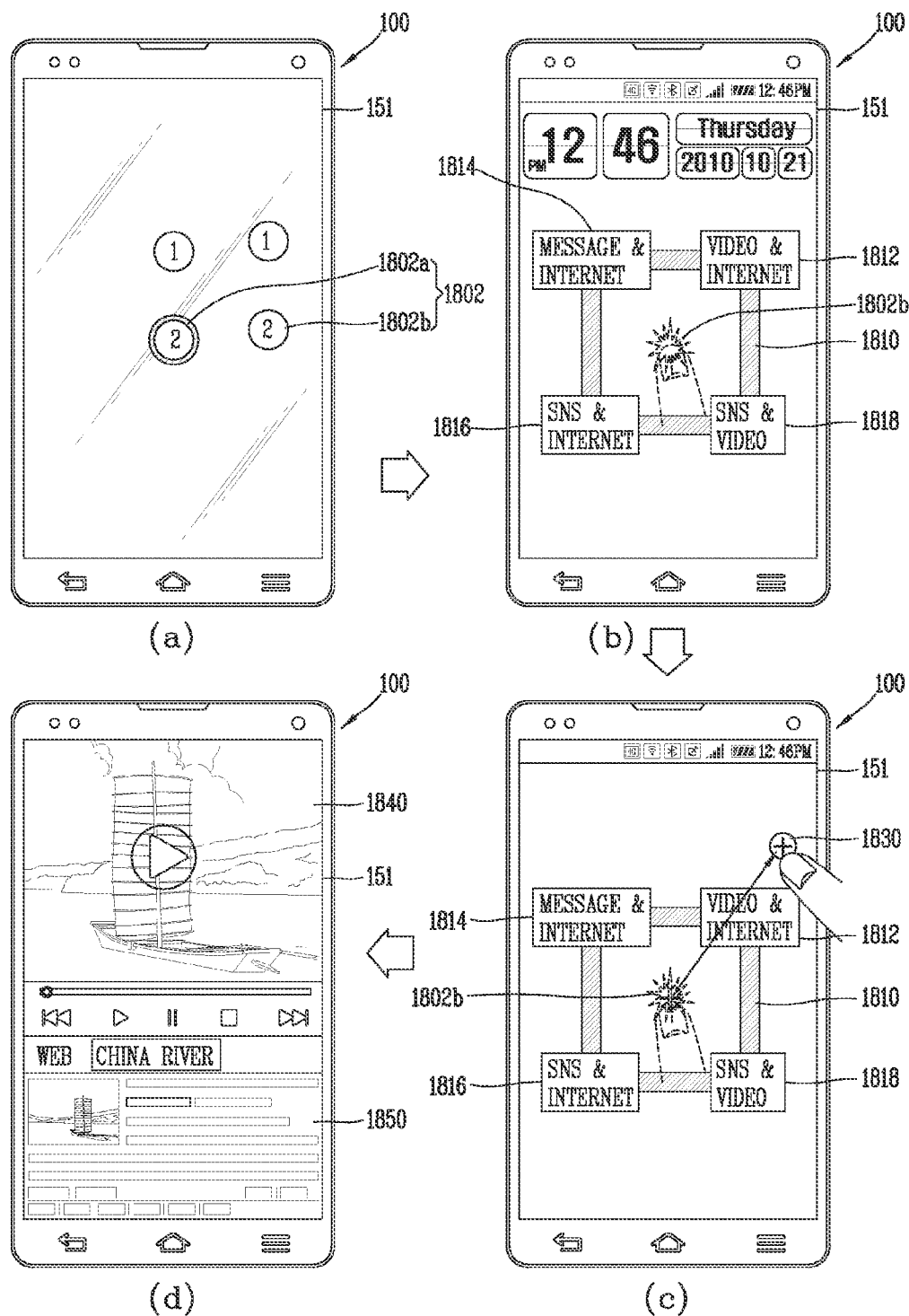
FIG. 18 is a view illustrating an example in which a plurality of functions selected based on the number of applied taps and a drag input are executed at the same time in a mobile terminal according to an embodiment of the present disclosure.

FIG. 18 is a view illustrating an example in which a plurality of functions selected based on the number of applied taps and a drag input are executed at the same time in a mobile terminal according to an embodiment of the present disclosure.

First, as illustrated in FIG. 18(a), when two taps are entered by two tap objects, respectively, while the display unit 151 is turned off, namely, in a doze mode state, the controller 180 may activate the display unit 151 and display graphic objects corresponding to a plurality of taps, respectively, adjacent to a location at which at least one of touches corresponding to the last tap 1802 (hereinafter, referred to as a "last touch" 1802b) is maintained with no release.

FIG. 18(b) illustrates such an example.

Referring to FIG. 18(b), graphic objects 1812, 1814, 1816, 1818 may be a video function and Internet search function (VIDEO & INTERNET), a message transmission/reception function and Internet search function (MESSAGE & INTERNET), an SNS and Internet search function (SNS & INTERNET), and an SNS and video function (SNS & VIDEO). Here, the plurality of functions may be determined according to the user's selection.

In other words, the user may mate a plurality of functions executable in the mobile terminal 100 with one another to set them to a plurality of concurrently executable functions. For example, the user may mate a camera function (CAMERA) with an Internet search function (INTERNET) as concurrently executable functions, and in this case, the controller 180 may allow one graphic object (for example, "CAMERA & INTERNET") corresponding to the two functions to be contained in the direct execution menu 1810.

On the other hand, when the direct execution menu 1810 including graphic objects 1812, 1814, 1816, 1818 corresponding to a plurality of functions, respectively, is displayed adjacent to a location at which a touch input corresponding to the last touch 1802b among touches corresponding to the last tap 1802 is sensed, the controller 180 may sense whether or not there is a drag input started from the last touch 1802b.

For example, as illustrated in FIG. 18(c), when the user's drag input is extended from a position 1802b at which the last touch is entered to one position 1830 on the display unit 151, the controller 180 may determine that the user has selected a graphic object 1812 corresponding to a "video function and Internet search function (VIDEO & INTERNET)". Accordingly, the controller 180 may execute a plurality of currently selected functions, namely, a video function and an Internet function at the same time.

In this case, the controller 180 may partition the display unit 151 into a plurality of regions based on the number of concurrently executed functions at present. Furthermore, the controller 180 may display a screen associated with the concurrently executed functions in different regions on the display unit 151. FIG. 18(d) illustrates such an example.

Referring to FIG. 18(d), it is seen that the controller 180 displays a screen associated with a video function in a first region 1840, and displays a screen associated with an Internet search function in a second region 1850 on the display unit 151. It is because the number of concurrently executed functions determined based on the user's drag input is two as illustrated in FIG. 18(c).

If the number of concurrently executed functions is three, then the controller 180 may of course display screens corresponding to three functions, respectively, determined to be concurrently executed at present in different regions on the display unit 151.

Otherwise, the controller 180 may of course select functions that require an output on the display unit 151 (for example, a video function, an Internet search function, etc.) and functions that do not require an output thereon (for example, a memory backup, a disk cleanup, etc.) among the functions determined to be concurrently carried out at present to determine the number of functions for displaying a screen on the display unit 151, thereby partitioning the display unit 151 into a least one region.

In addition, even when determined to be concurrently carried out, it should be of course understood that the user can set a specific function not to be displayed in an arbitrary manner. In this case, even though there are functions set to be concurrently carried out, only at least one function set to display a screen by a user may be determined to be displayed on the display unit 151, and the display unit 151 may be partitioned into at least one region according to the at least one function set to display a screen by the user.

On the other hand, it is assumed in FIG. 18 an example in which when two taps are applied to the display unit 151 by two tap objects, the controller 180 of the mobile terminal 100 according to an embodiment of the present disclosure executes two functions corresponding to the user's selection at the same time.

However, on the contrary, the number of touches constituting the first and the second tap, and the number of function to be concurrently carried out may be also modified according to the embodiment or the user's setting. For example, assuming that a first tap is configured with one touch input, and a second tap with two touch inputs, when the first and the second tap are entered, the user may of course set to execute three functions at the same time.

In this case, when the first and the second tap recognized to be effective are sensed through three touch inputs applied to the display unit 151 with the intervention of the user, the controller 180 may display graphic objects corresponding to three different functions, respectively, adjacent to a location at which the last tap of the second tap is sensed.

On the other hand, another method which is different from the foregoing method of FIG. 18 may be of course used to select a plurality of concurrently executable functions. In other words, the controller 180 may, of course, sequentially select a plurality of functions to be concurrently carried out, one by one, with the intervention of the user.

Figure 19:
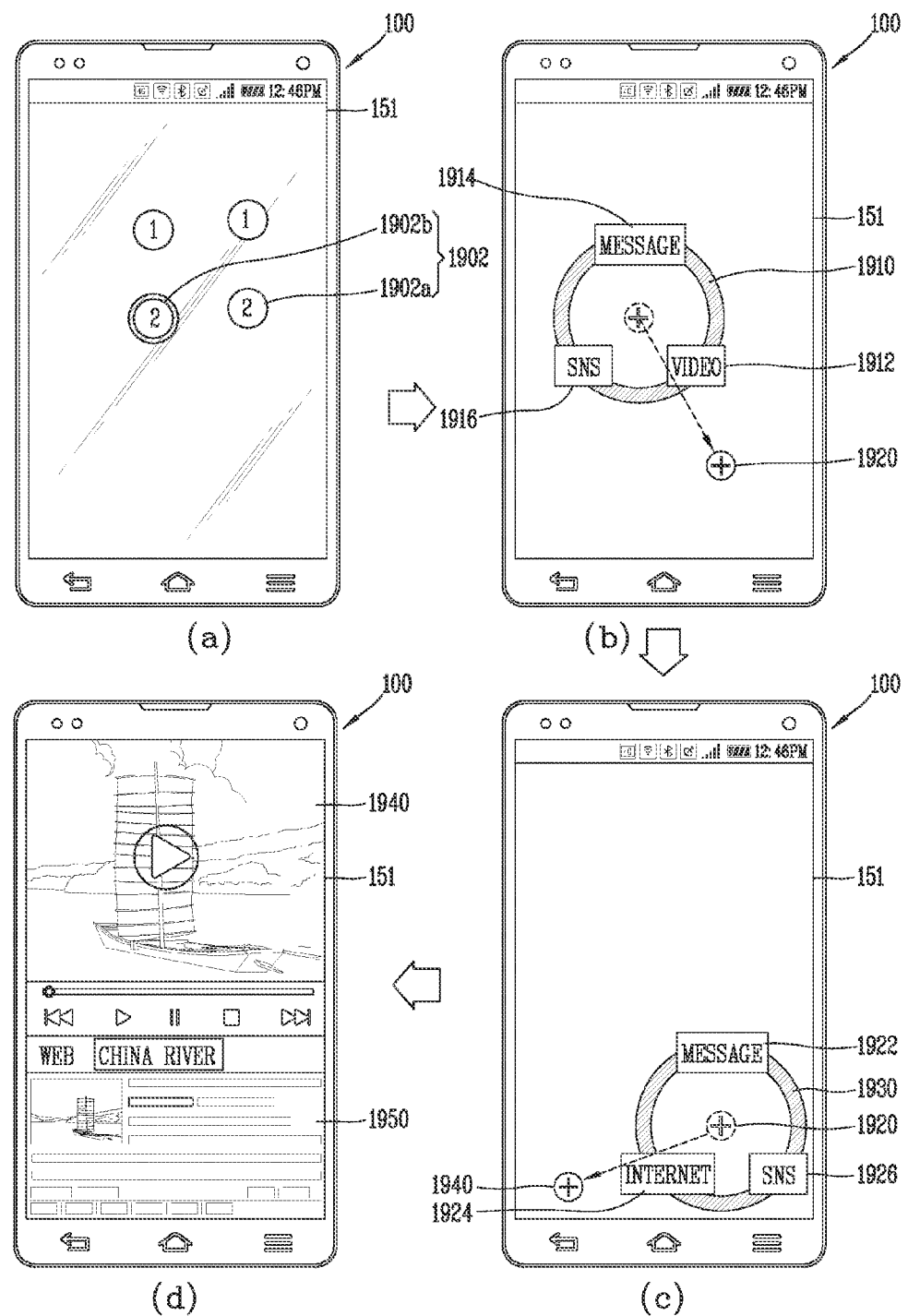
FIG. 19 is a view illustrating an example in which a plurality of functions executed at the same time based on the number of applied taps and a drag input are sequentially determined in a mobile terminal according to an embodiment of the present disclosure.

FIG. 19 is a view illustrating an example in which a plurality of functions executed at the same time based on the number of applied taps and a drag input are sequentially determined in a mobile terminal according to an embodiment of the present disclosure.

As illustrated in FIG. 19(a), when two taps by means of two tap objects are applied to the display unit 151 while the display unit 151 is turned off, namely, in a doze mode state, the controller 180 may sense it to activate the display unit 151.

Furthermore, when the last touch 1102b input constituting the last tap 1102 between the two taps is maintained for more than a predetermined period of time, as illustrated in FIG. 19(b), the controller 180 may display a direct execution menu 1910 including graphic objects 1912, 1914, 1916 corresponding to a plurality of different functions, respectively, adjacent to a location at which the last touch 1102b input is sensed. For the sake of convenience of explanation, the direct execution menu 1910 may be referred to as a "third direct execution menu".

Furthermore, the controller 180 may sense a drag input started from the least touch 1102b. For example, as illustrated in FIG. 19(b), when the drag input is extended to one position 1920 on the display unit 151, the controller 180 may determine that a graphic object 1912 corresponding to the video function among graphic objects 1912, 1914, 1916 contained in the third direct execution menu 1910 has been selected by the user.

On the other hand, when determined that a specific function is selected, the controller 180 may sense whether or not the user's drag input is on hold at one position 1920 on the display unit 151. For example, when the user's drag input is on hold for more than a predetermined period of time at the one position 1920, the user may determine that the user's drag input is in a hold state.

Furthermore, as a result of the determination, when the user's drag input is not in a hold state, the controller 180 may execute a currently selected function. In this case, the controller 180 may execute a currently selected video function (VIDEO), thereby displaying video images on the display unit 151.

However, when determined that the user's drag input is on hold at the one position 1920, the controller 180 may display another direct execution menu 1930 including graphic objects 1912, 1914, 1916 corresponding to functions, respectively, which are different from the currently selected function for execution as illustrated in FIG. 19(c) adjacent to the one position 1920. Hereinafter, for the sake of convenience of explanation, the another direct execution menu 1904 is referred to as a "fourth direct execution menu".

On the other hand, when the fourth direct execution menu 1930 is displayed, the controller 180 may sense whether or not there is a drag input started from a location 1920 at which a current drag input is on hold. For example, as illustrated in FIG. 19(c), when the user's drag input is extended from a currently held position 1920 to another position 1940 on the display unit, the controller 180 may determine that the user has selected a graphic object 1924 corresponding to an "Internet search function" among graphic objects contained in the fourth direct execution menu 1930.

When a plurality of functions are selected as described above, the controller 180 may execute a plurality of currently selected functions at the same time. For example, as illustrated in FIGS. 19(*a*) through 19(*c*), when the "video function" and "Internet function" are selected, the controller 180 may execute the "video function" and "Internet function" at the same time. Then, the controller 180 may partition the display unit 151 into a plurality of regions based on the number of functions selected to be concurrently carried out at present, and display a screen associated with the functions selected to be concurrently carried out at present in different regions on the display unit 151. FIG. 19(*d*) illustrates such an example.

On the other hand, in the foregoing FIG. 19, functions that can be contained in the third direct execution menu 1910 and fourth direct execution menu 1930 may be of course specified in advance by the user. Here, the user may allow a specific operation using a specific function as well as an executable function in the mobile terminal 100 to be contained in the third direct execution menu 1910 and menu region 1940.

Furthermore, in the foregoing FIG. 19, only two functions have been described as an example of concurrently executable functions, but on the contrary, it is of course possible to execute a larger number of functions at the same time. For example, the controller 180 may of course further detect whether or not the user's drag input is on hold at one position 1940 on the display unit, and display still another direct execution menu including other functions adjacent to the one position 1940 according to a hold or non-hold state as illustrated in FIG. 19(*c*). Furthermore, when another function is selected through the extended user's drag input, the controller 180 may determine that three functions including a video function, an Internet search function and the selected another function have been selected, and execute them at the same time.

Furthermore, in this case, the controller 180 may of course partition the display unit 151 into three or more regions, and display a screen associated with the execution of the selected each function in different regions.

Furthermore, the number of concurrently executable functions may be of course determined according to the number of touches constituting the plurality of taps. For example, when the number of tap objects constituting a first and a second tap is set to three, and the first and the second tap made of different tap inputs, respectively, are sensed, the user may set to execute the maximum three functions at the same time. In this case, when a first and a second tap made of three tap objects are sensed, the controller 180 may execute the maximum three functions at the same time based on the setting.

On the other hand, a mobile terminal according to an embodiment of the present disclosure may of course execute a specific function without displaying the direct execution menu on the display unit 151.

Figure 20:
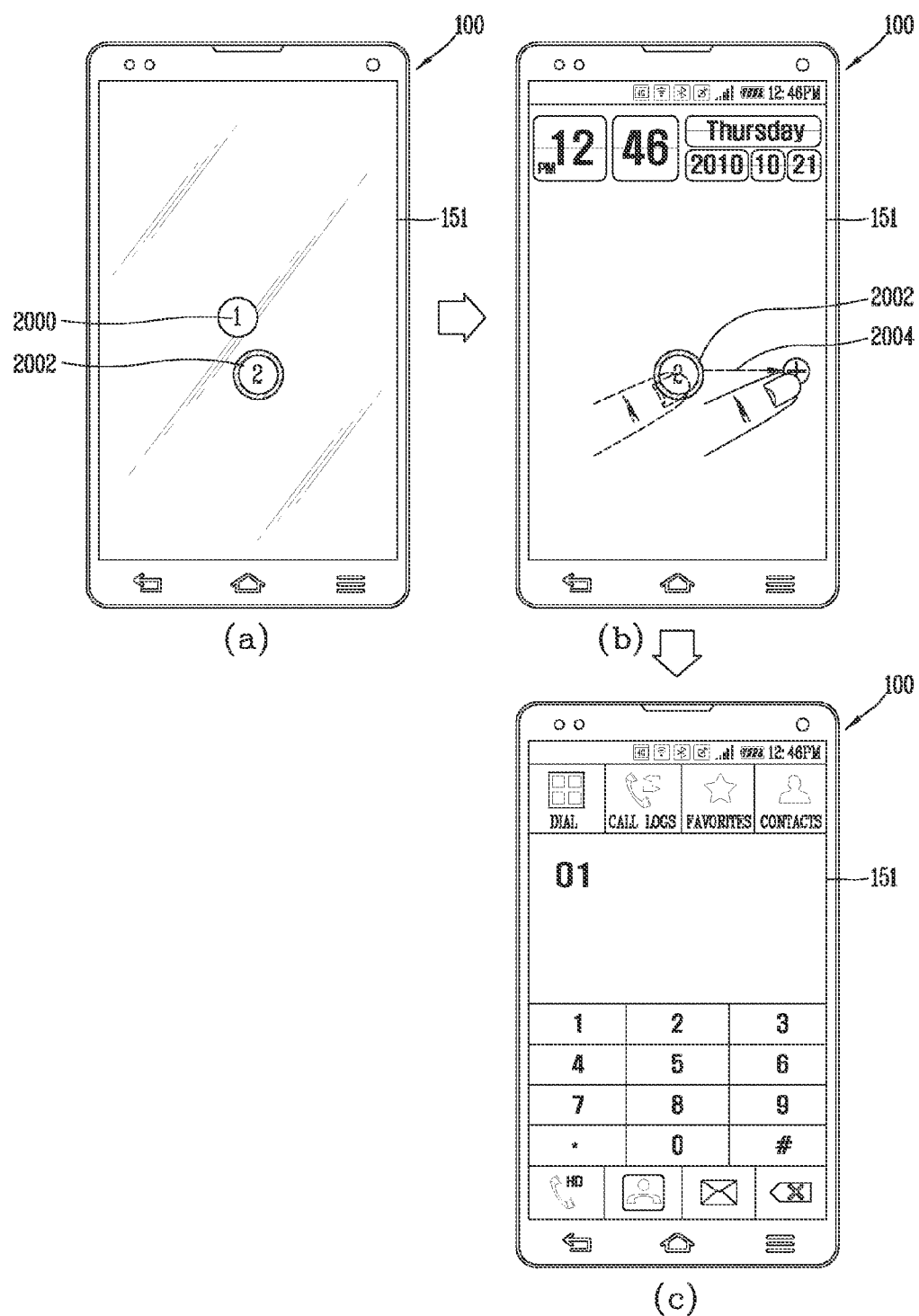
FIG. 20 is a view illustrating an example in which a specific functions is executed based on an applied tap and a user's drag input in a mobile terminal according to an embodiment of the present disclosure.

FIG. 20 is a view illustrating an example in which a specific functions is executed based on an applied tap and a user's drag input in a mobile terminal according to an embodiment of the present disclosure.

For example, as illustrated in FIG. 20(*a*), when the user enters a plurality of taps 2000, 2002 while the display unit 151 is in an inactive state, the controller 180 may recognize the plurality of taps 2000, 2002 as a prior input for executing a specific function.

In this case, the controller 180 may sense whether or not there is a drag input started from a location at which a touch input corresponding to the last tap 2002 between the plurality of taps 2000, 2002 is sensed. Furthermore, as illustrated in FIG. 20(*b*), when a drag input 2004 toward a specific direction is sensed, the controller 180 may immediately execute a specific function corresponding to the specific direction.

FIG. 20(*c*) illustrates such an example.

For example, when the function of the mobile terminal 100 corresponding to the direction of the drag input 2004 is a "call function", the controller 180 may execute the "call function" to display a screen for receiving a phone number on the display unit 151 as illustrated in FIG. 20(*c*). However, on the contrary, as described above, a specific operation, for example, an incoming operation for transmitting a call signal to a specific counterpart may be of course immediately carried out according to the user's setting.

On the other hand, in the above, a case where a plurality of taps are entered on the display unit 151 has been described assuming that a lock screen is not set to the mobile terminal 100, but the present disclosure may be of course applicable to a case where a lock screen is set.

There may occur a case where a plurality of taps on the display unit 151 have been sensed in a deactivated state of the display unit 151, but a motion pattern formed by the taps does not match a preset motion pattern. Such case will be explained in more detail with reference to FIG. 21.

Figure 21:
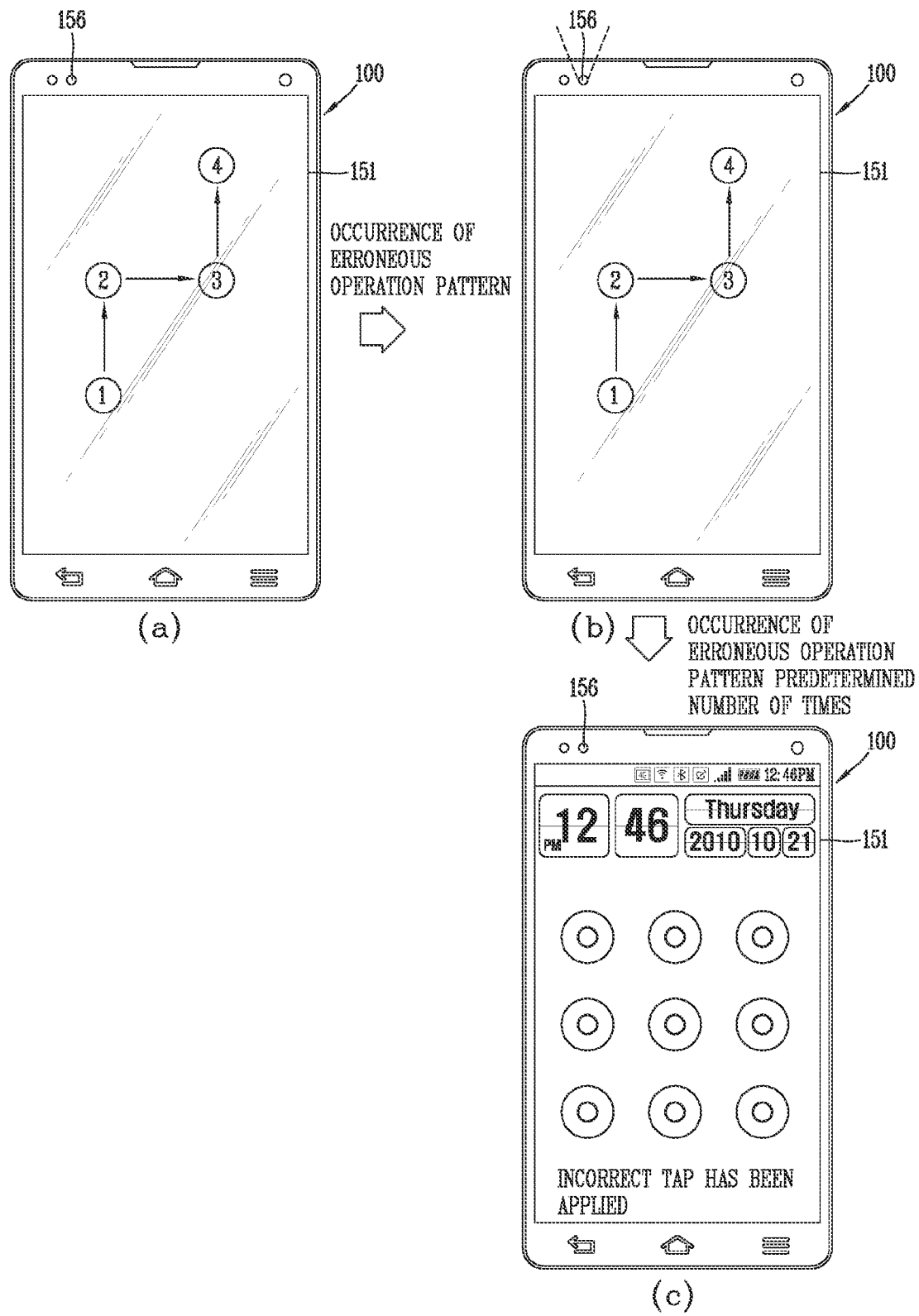
FIG. 21 is a conceptual view for explaining a method to control a mobile terminal according to an embodiment of the present invention, in a case where an erroneous motion pattern has been applied to the mobile terminal.

FIG. 21 is a conceptual view for explaining a method to control a mobile terminal according to an embodiment of the present invention, in a case where an erroneous motion pattern has been applied to the mobile terminal.

In a mobile terminal according to an embodiment of the present invention, there may occur a case where a plurality of taps on the display unit 151 have been sensed in a deactivated state of the display unit 151, but a motion pattern formed by sequentially connecting the taps with one another does not match a preset motion pattern. Hereinafter, such case will be defined as input of an erroneous motion pattern. That is, an erroneous (incorrect) motion pattern may be sensed.

If a motion pattern formed by taps sensed by the sensing unit 140 does not match a preset motion pattern (or if an erroneous motion pattern is sensed), the controller 180 maintains a locked state, and outputs notification information indicating that the sensed taps do not form the preset motion pattern, in one of visible, tactile and audible manners. For instance, the controller 180 informs that the sensed taps do not form the preset motion pattern, using the light emitting unit 156.

For instance, as shown in FIG. 21(*b*), the controller 180 may maintain a deactivated state of the display unit 151 in response to an erroneous motion pattern, and may control the light emitting unit 156 to flicker plural times in a red color. The light emitting unit 156 is arranged at an upper end of a front surface of the terminal body 100, and is provided with one or more light emitting diodes (LEDs). The light emitting unit 156 is configured to emit light in various manners under control of the controller 180. For instance, the controller 180 may change a color of light, a period to flicker light on and off, a brightness of light, etc.

If an erroneous motion pattern occurs predetermined number of times as shown in FIG. 21(*b*), the controller 180 activates the display unit 151, and displays a lock screen for inputting a password. Repeated occurrence of an erroneous motion pattern means that a user does not know a preset motion pattern. Accordingly, the controller 180 displays a lock screen for releasing a locked state, on the display unit 151.

In this case, notification information, which indicates that a motion pattern formed by taps applied onto the display unit does not match a preset motion pattern, (e.g., "An incorrect tap has been applied.") may be displayed on the lock screen.

Hereinafter, a method to display a guide screen for easy inputting a control command by a user, and a method to set a motion pattern for releasing a locked state will be explained in more detail.

FIGS. 22A to 22E are conceptual views for explaining a method to display a guide screen such that a motion pattern is input from a user, in a mobile terminal according to an embodiment of the present invention.

A motion pattern for releasing a locked state is formed by a plurality of taps. As the plurality of taps are applied to the display unit 151 in a deactivated state of the display unit 151, an erroneous motion pattern may be formed. To prevent this, the controller 180 may display a guide screen on the display unit 151 so that taps can be correctly applied onto the display unit 151. In a case where one or more taps on the display unit 151 have been sensed in a deactivated state of the display unit 151, the guide screen may be displayed on the display unit 151. In order to prevent undesired display of the guide screen in a locked state, said one or more taps may be replaced by taps sensed on a predetermined region within a predetermined time, predetermined number of times.

The controller 180 may activate the display unit for a predetermined time in response to said one or more taps, and may display the guide screen on the display unit 151. That is, the controller 180 may control the guide screen to be displayed on the display unit 151 for a short time, and then to disappear from the display unit 151. This is in order to inform a user that the mobile terminal is in an 'ON' state.

Upon detection of the 'knock-on', the controller 180 divides an entire region of the display unit 151 into a plurality of regions, for input of a motion pattern. A method for dividing the entire region of the display unit 151 into a plurality of regions has been aforementioned with reference to FIG. 3, and thus its detailed explanations will be omitted. The controller may display a guide screen using the plurality of regions.

Figure 22A:
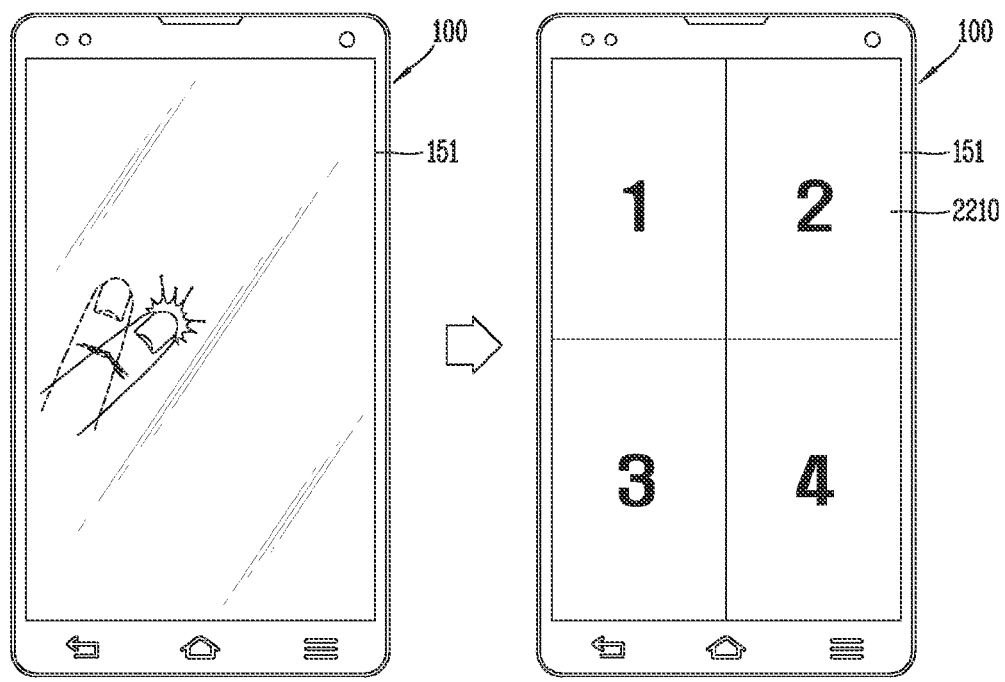
FIGS. 22A to 22E are conceptual views for explaining a method to display a guide screen such that a motion pattern is input from a user, in a mobile terminal according to an embodiment of the present invention.

As shown in FIG. 22A, in a case where a tap (knock) on the display unit is sensed in a deactivated state of the display unit 151, the controller 180 may display a guide screen 2210 on the display unit 151. If a set password is "3142", the display unit 151 is divided into 4 regions, and the guide screen 2210 for indicating the 4 regions may be displayed. A user may release a locked state of the mobile terminal by applying taps to a third region, a first region, a fourth region and a second region, sequentially.

Figure 22B:
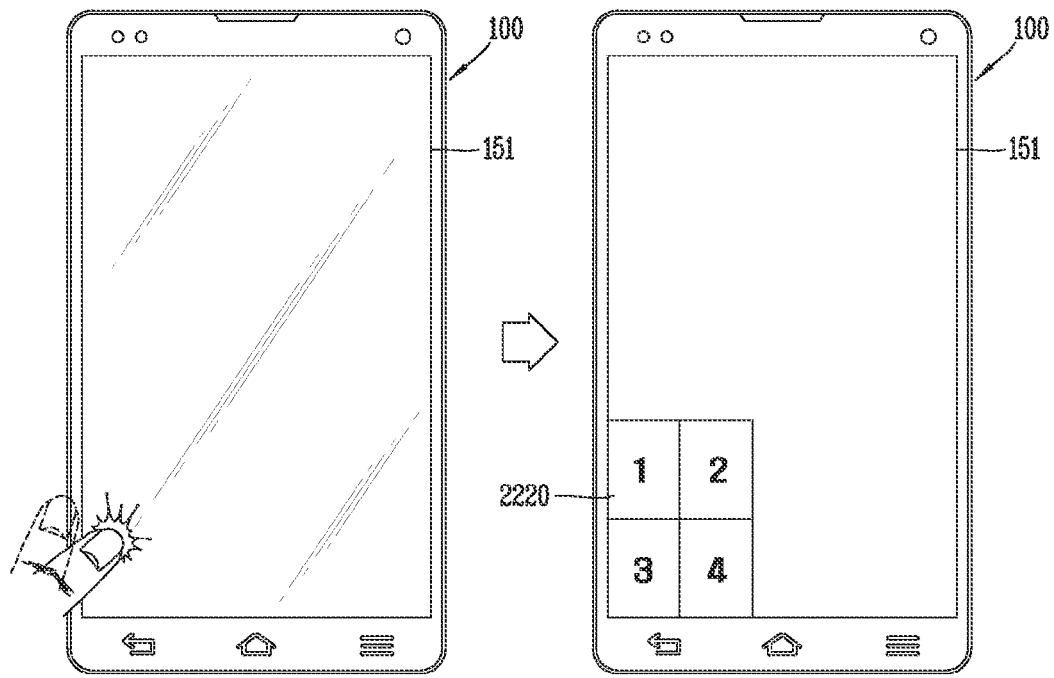

As shown in FIG. 22B, in a case where said one or more taps have been applied to a corner region of the display unit 151, the guide screen 2220 may be displayed on one or more regions including the corner region. The controller 180 may divide a partial region of the display unit 151 into a plurality of regions, and may display information about the plurality of regions on the guide screen 1320. The reason is in order to allow a motion pattern to be input to an area smaller than a reference area.

A size of the guide screen may be variable according to intensity of said one or more taps. For instance, if a tap of a first intensity is applied to the display unit 151, a guide screen of a first size corresponding to the first intensity may be displayed. On the other hand, if a tap of a second intensity is applied to the display unit 151, a guide screen of a second size corresponding to the second intensity may be displayed.

Figure 22C:
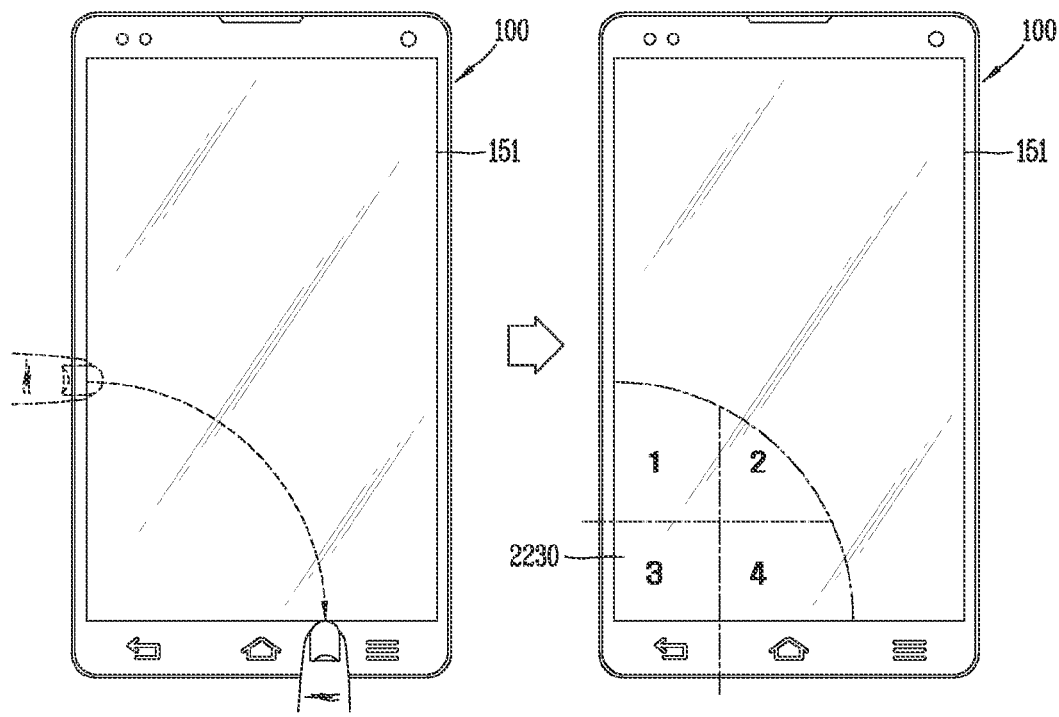

As shown in FIG. 22C, a touch input, which starts from a first point on the display unit 151 toward a second point, may be applied in a deactivated state of the display unit 151. The controller 180 may divide an entire region of the display unit 151 into a first region and a second region, based on a touch area on the display unit 151. Then the controller 180 displays a guide screen 2230 on one of the first region and the second region. The controller 180 selects a display region of the guide screen, based on corner regions, a touch area, a first touch point on a touch area, and a touch-released point. That is, a size and a position of the guide screen may be variously changed according to a touch area.

If a first touch and a second touch crossing each other are sensed within a predetermined time in a deactivated state of the display unit 151, the controller 180 may divide an entire region 2240 of the display unit 151 into a plurality of regions, based on the first touch and the second touch. The controller 180 may analyze a motion pattern formed by taps, based on a tap applied to one of the plurality of regions.

Figure 22D:
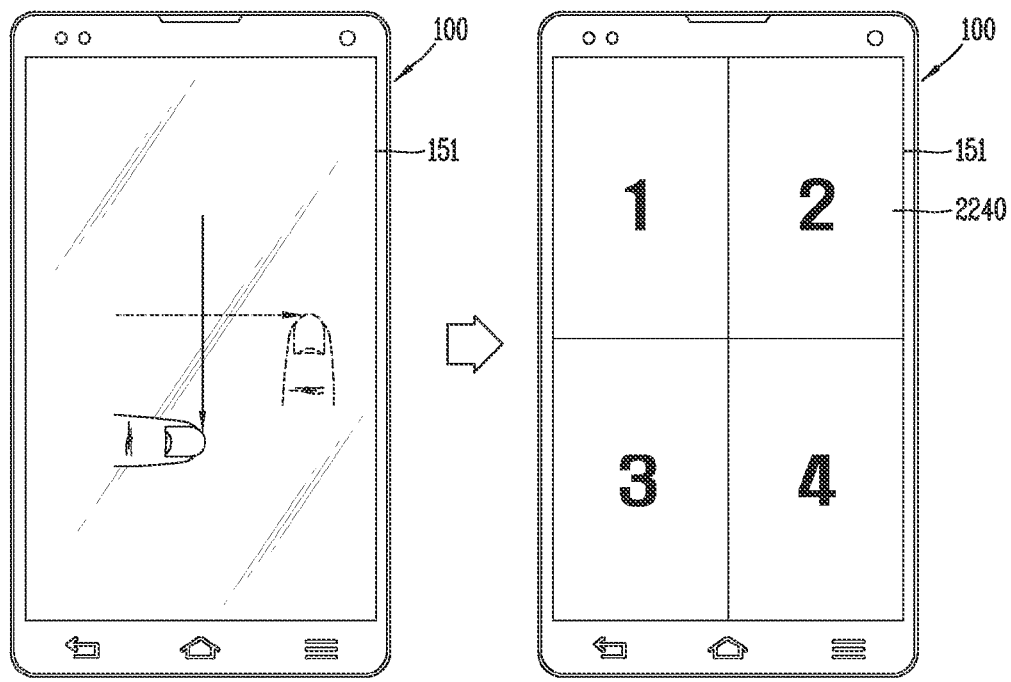
Figure 22E:
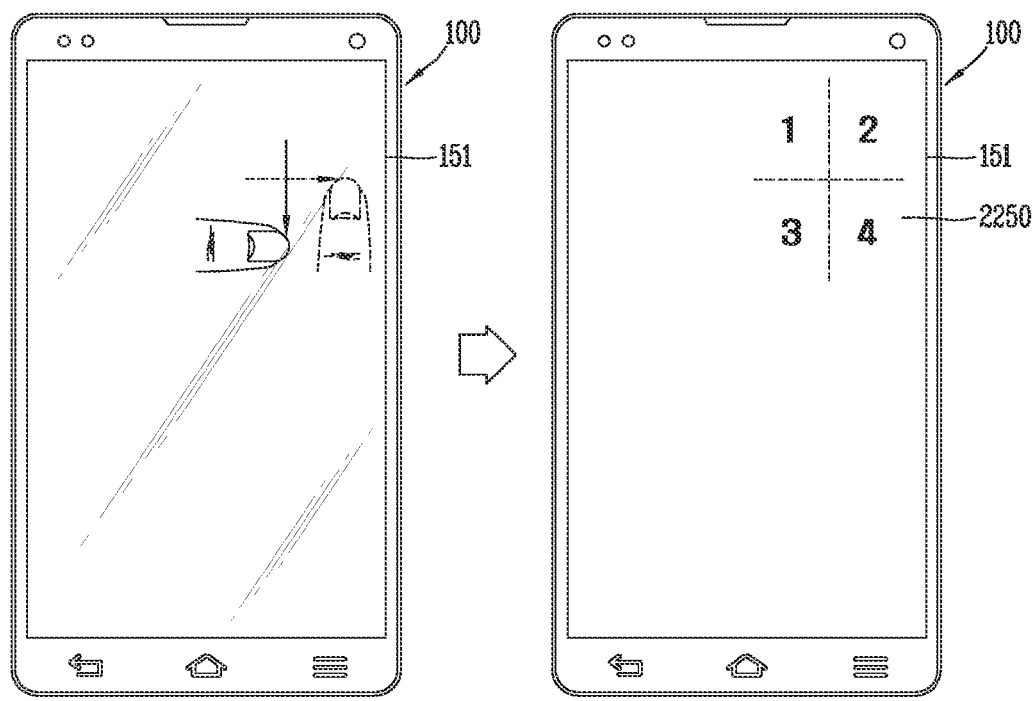

A size and a position of the plurality of regions divided by the first touch and the second touch may be variable according to the first touch and the second touch. As shown in FIG. 22D, if the first touch and the second touch cross each other at a central region of the display unit 151, the controller 180 may divide the entire region 2240 of the display unit 151 into 4 regions. As shown in FIG. 22E, if the first touch and the second touch cross each other at a corner region of the display unit 151, the controller 180 may divide a region 2250 of the display unit 151 into 4 regions based on a crossing point between the first drag and the second drag.

The controller 180 may real-time display said one or more touch orbits in response to at least one of the first touch and the second touch, on the display unit 151. Alternatively, when both of the first touch and the second touch have been input, the controller 180 may activate the display unit 151, and may display information on the divided regions. As shown in FIG. 22C, the controller 180 may maintain a deactivated state of the display unit 151, and may not display information on the divided regions.

In the mobile terminal according to an embodiment of the present invention, a user may register a motion pattern for releasing a locked state.

Figure 23:
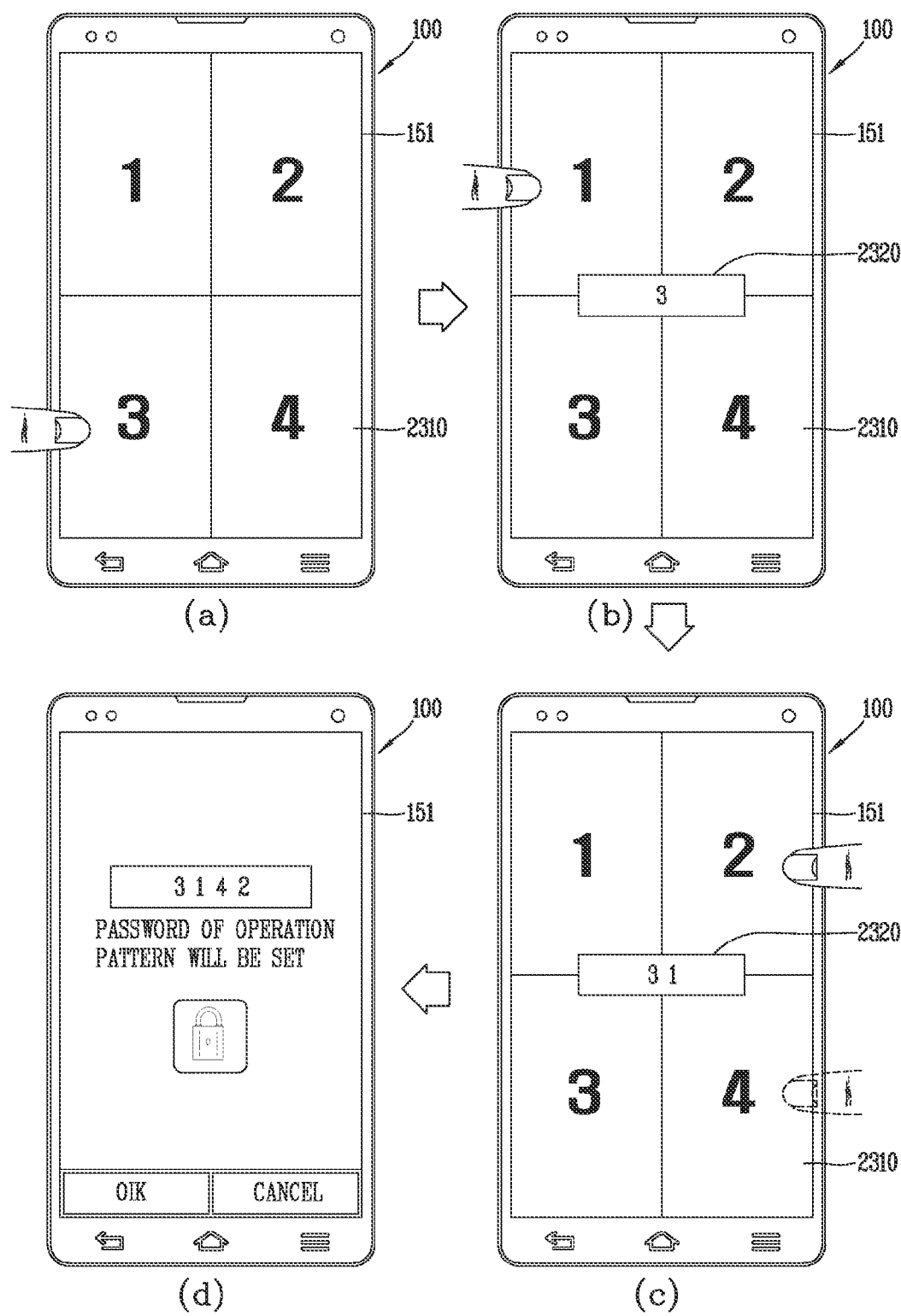

In a case where an application for registering a motion pattern is executed, the controller 180 may display a plurality of regions 2310 for inputting a motion pattern, on the display unit 151 as shown in FIG. 23(*a*). For convenience, it is assumed that an entire region of the display unit 151 is divided into 4 regions. However, the present invention is not limited to this. The number of the regions may be changed by a user's input.

The controller 180 may set a motion pattern for releasing a locked state, based on a tap applied to one of the plurality of regions on the display unit 151. Upon application of a tap to one of the plurality of regions, an identification number corresponding to said one region may be displayed on a region 2320 of the display unit 151. For instance, if a first tap (e.g., ①) is applied to a third region as shown in FIG. 23(*b*), a number '3' corresponding to the third region may be displayed on the region 2320.

First to fourth taps are sequentially applied to a third region, a first region, a fourth region and a second region, the controller 180 may newly set a password for releasing a locked state (e.g., '3142') and a motion pattern for releasing a locked state.

In a state where a plurality of regions for inputting a motion pattern have been displayed on the display unit 151, a pinch-in operation and a pinch-out operation with respect to the plurality of regions may be sensed. The pinch-in operation indicates that at least one of a first touch and a second touch moves so as to be close to another touch, from the initial point. On the other hand, the pinch-out operation indicates that at least one of a first touch and a second touch moves so as to be far from another touch, from the initial point. The controller 180 may re-divide the entire region of the display unit 151 in response to the pinch-in operation and the pinch-output operation, and may display the re-divided regions on the display unit 151.

As one example, upon detection of a pinch-in operation in a state where 4 regions have been displayed on the display unit 151 as shown in FIG. 24(*a*), the controller 180 may more divide the display unit 151 in proportion to a decreasing distance between a first touch and a second touch ('segmentation function'). More specifically, as the first touch and the second touch become closer to each other, an entire region of the display unit 151 may be divided into more regions.

As another example, upon detection of a pinch-out operation in a state where 4 regions have been displayed on the display unit 151 as shown in FIG. 24(*b*), the controller 180 may less divide the display unit 151 in proportion to an increasing distance between a first touch and a second touch ('integration function'). More specifically, as the first touch and the second touch become farther from each other, an entire region of the display unit 151 may be divided into less regions.

The controller 180 may execute a segmentation function in response to a pinch-out operation with respect to a plurality of regions for inputting a motion pattern, and may execute an integration function in response to a pinch-in operation. Alternatively, the controller 180 may execute an integration function in response to a pinch-out operation, and may execute a segmentation function in response to a pinch-in operation.

As the divided regions are displayed on the display unit 151, a user can input a motion pattern for releasing a locked state in a more convenient manner. This can allow a more enhanced user interface to be provided.

Figure 25:
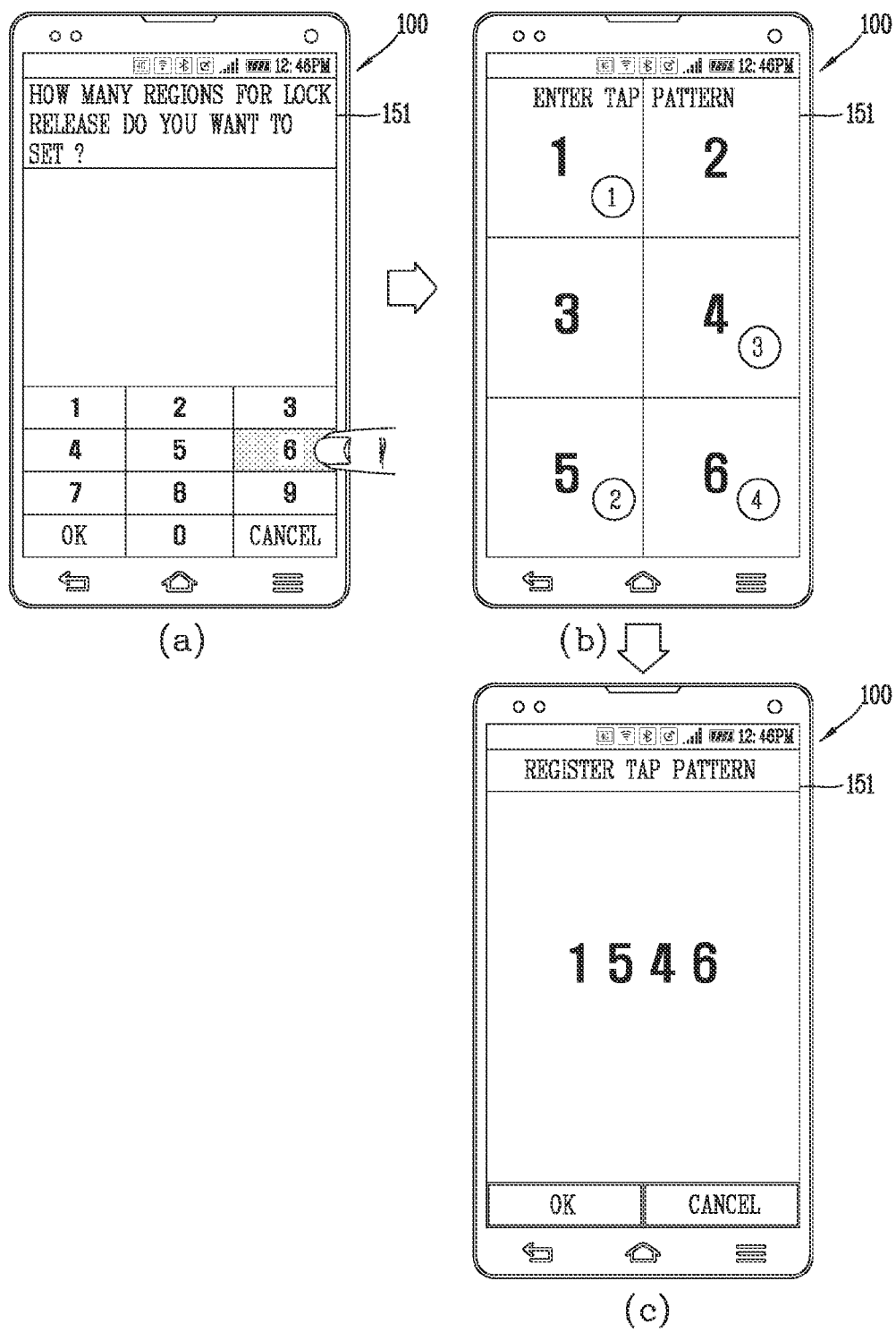

On the other hand, when the user wants to divide the entire region of the display unit 151 into a plurality of regions, numeric pads corresponding to the total number of desired regions may be touched. For example, as illustrated in FIG. 25(*a*), when "6" is entered by the user's input, the controller 180 may divide the display unit 151 into total six regions, and provide identification number (1-6) for each region. Then, the controller 180 may display information on each region on the display unit 151.

Subsequently, the user may check information on regions displayed on the display unit 151 to sequentially enter a tap pattern for lock release. For example, as illustrated in FIG. 25(*b*), a first through a fourth tap ((①,②,③,④)) may be sequentially entered into region 1→region 5→region 4→region 6. As a result, the controller 180 may newly set "1546" as a password for lock release.

On the other hand, in a mobile terminal according to the present disclosure, the user may release a lock state using a knockknock-and-drag. In other words, the user may hit the body as many as a reference number of times while the display unit 151 is in an inactive state to enter a touch for releasing a lock state.

Figure 26:
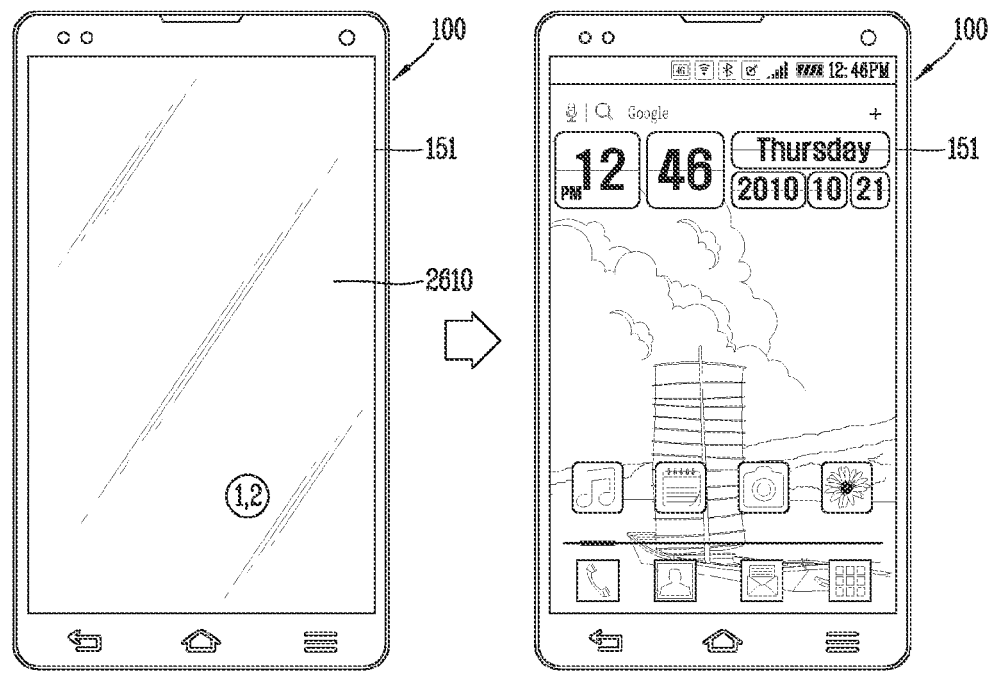
FIG. 26 is conceptual view for explaining a method to release a locked state according to a user's motion pattern, or a method to execute a guest mode for using only some applications, in a mobile terminal according to an embodiment of the present invention.

FIG. 26 is a conceptual view for explaining a method to release a locked state according to a user's motion pattern, or a method to execute a guest mode for using only some applications, in a mobile terminal according to an embodiment of the present invention.

Referring to FIG. 26, at least two taps applied onto the display unit 151 within a predetermined time may be sensed in a deactivated state of the display unit 151. The controller 180 may execute a guest mode in response to 'knock-on', and may display an execution screen of the guest mode on the display unit 151. The guest mode means a state where only one or more preset applications can be executed. Such guest mode is executed in order to protect a user's privacy from a third party. That is, if 'knock-on' is sensed in a locked state, a guest mode is executed. On the other hand, if a preset motion pattern is sensed in a locked state, the locked state is released.

FIGS. 27A, 27B, 27C and 27D is a view for explaining a method of releasing a lock state by a tap-and-drag in a mobile terminal according to an embodiment of the present disclosure.

The controller 180 may switch the lock state to a release state based on a user's request for releasing the lock state of the mobile terminal in a lock state. For example, the user's request for releasing the lock state may be accomplished in various ways, such as a touch command, a fingerprint recognition, a face recognition, a gesture command, or the like. In other words, the present disclosure may sense various user's requests for releasing a lock state, and perform different controls according to the posture of the body upon sensing the various touches.

Hereinafter, a method of using a touch command as a user's request for switching the lock state to a release state will be described, but the present disclosure may not be necessarily limited to this, and may be also applicable to a fingerprint recognition scheme, a face recognition scheme, a gesture command scheme, or the like in a similar manner.

When a predetermined type of touch is applied to screen information for releasing the lock state, the controller 180 may switch the lock state to a release state. For example, the predetermined type of touch may be dragging in a predetermined direction, dragging to a specific graphic object displayed on a lock screen, a predetermined type of pattern input, and the like. Here, the predetermined type of pattern input may be a moving path of a touch moved from a first position to a second position which is different from the first position. Furthermore, the predetermined type of touch may be predetermined or set by the user's selection.

Figure 27A:
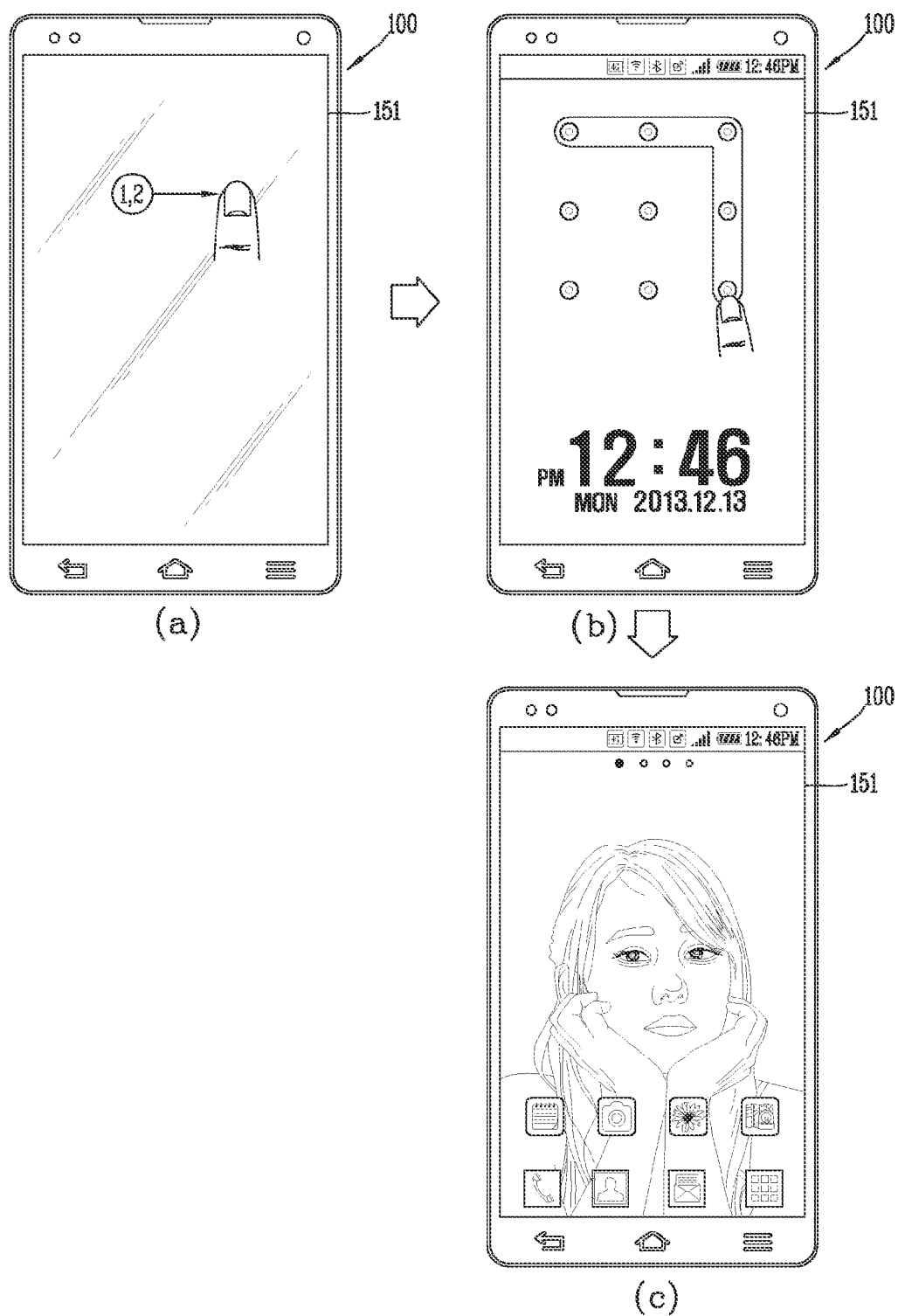
FIGS. 27A to 27D is a view for explaining a method of releasing a lock state by a tap-and-drag in a mobile terminal according to an embodiment of the present disclosure.

On the other hand, while the display unit 151 is in an inactive state, screen information for releasing a lock state cannot be displayed as illustrated in FIG. 27A. However, when the body is hit as many as a reference number of times and consecutively moved without releasing the contact of the last tap in a mobile terminal according to the present disclosure, the controller 180 may activate the display unit 151 to receive a touch for lock release, and display screen information for releasing a lock state.

At this time, the display location of the screen information for releasing a lock state may vary according to at least one of a location at which the last tap is applied and a posture of the terminal body. For example, as illustrated in FIG. 27A, when the last tap is applied to one position of an upper end portion of the terminal, the controller 180 may display screen information for releasing a lock state around the one position at which the last tap is applied.

Figure 27B:
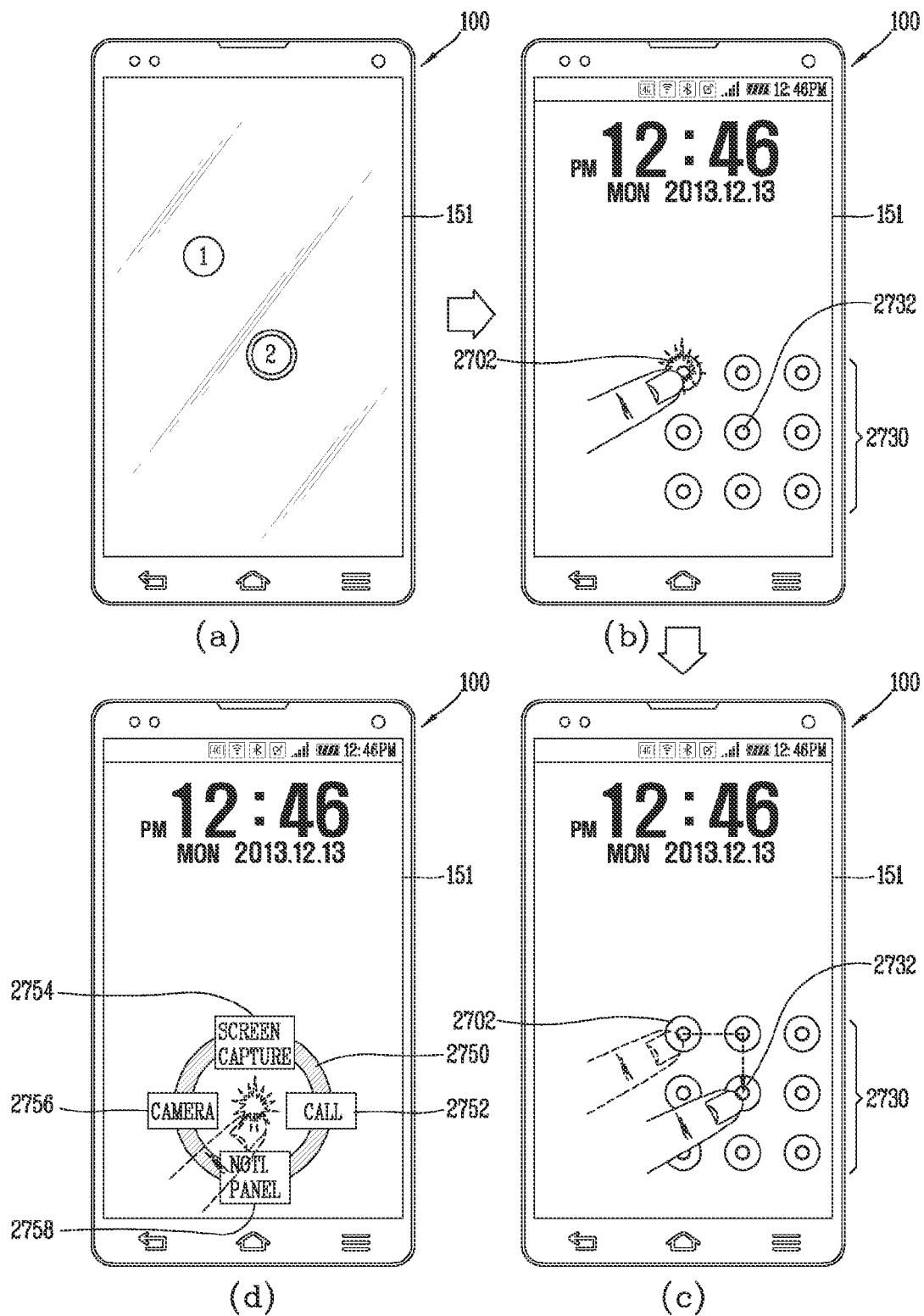

FIG. 27B is a view illustrating an example in which a plurality of taps are sense when a lock screen is set in a mobile terminal according to an embodiment of the present disclosure.

For example, when a lock screen, for example, a pattern lock, is set, the controller 180 may display a short-cut menu 2730 as illustrated in FIG. 27B(b) on the display unit 151 when a plurality of taps are sensed as illustrated in FIG. 27B(a) while the display unit 151 is in an inactive state (for example, doze mode). Here, the short-cut menu may be to enter a touch gesture (for example, pattern) for releasing the pattern lock.

Here, the controller 180 may display the short-cut menu 2730 in a predetermined region on the display unit 151 on the basis of a location at which a touch input corresponding to the last tap between the plurality of taps 2700, 2702 is sensed. Accordingly, the user may apply a touch input to the short-cut menu subsequent to a touch corresponding to the last tap 2702.

Furthermore, as illustrated in FIG. 27B(c), when the user applies a touch gesture input to the short-cut menu to release a lock screen, the controller 180 may compare a pattern of the entered touch gesture with a predetermined lock release pattern to release the lock screen. In this case, the controller 180 may display a direct execution menu 2750 including graphic object 2752, 2754, 2756, 2758 corresponding to different functions, respectively, around a location 2732 at which the user's touch gesture input is completed. Furthermore, the controller 180 may execute at least one function based on a direction in which the user's drag input faces.

On the other hand, in the foregoing FIG. 27B, it has been described on the assumption that a short-cut menu is displayed at a location at which a last tap of the plurality of taps is sensed, but the present disclosure may not be of course necessarily limited to this. For example, the short-cut menu may be displayed on the display unit 151 on the basis of a location at which an initial tap of the plurality of taps is applied.

On the other hand, for the release of a lock screen, the lock screen may be of course released based on a user's touch gesture input without displaying the short-cut menu on the display unit 151.

Figure 27C:
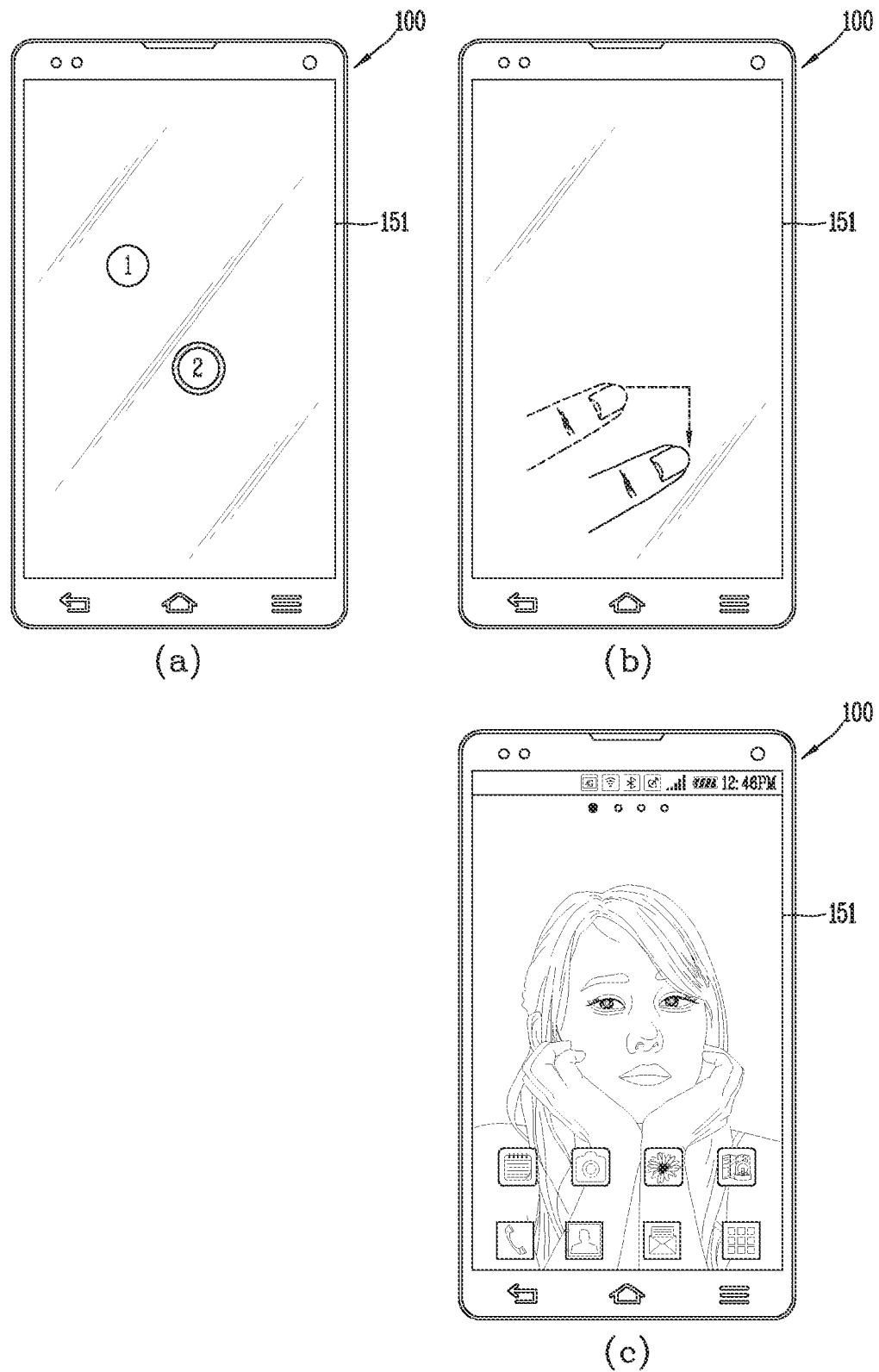

FIG. 27C is a view illustrating an example in which a lock screen is released when the lock screen is set in a mobile terminal according to an embodiment of the present disclosure in such a case.

For example, as illustrated in FIG. 27C(a), when a plurality of taps are applied from the user while the display unit 151 is turned off, namely, in a doze mode state, the controller 180 may sense them. Furthermore, as illustrated in FIG. 27C(b), when a touch gesture input is applied to the plurality of taps from the user, the controller 180 may recognize it as a pattern input for releasing a lock screen. Accordingly, the controller 180 may compare a pattern due to the user's touch gesture with a predetermined lock release pattern to release the lock screen if they are the same as illustrated in FIG. 27C(c). Furthermore, the controller 180 may of course maintain a state in which the display unit 151 is turned off, namely, a doze mode state until releasing the lock screen.

Figure 27D:
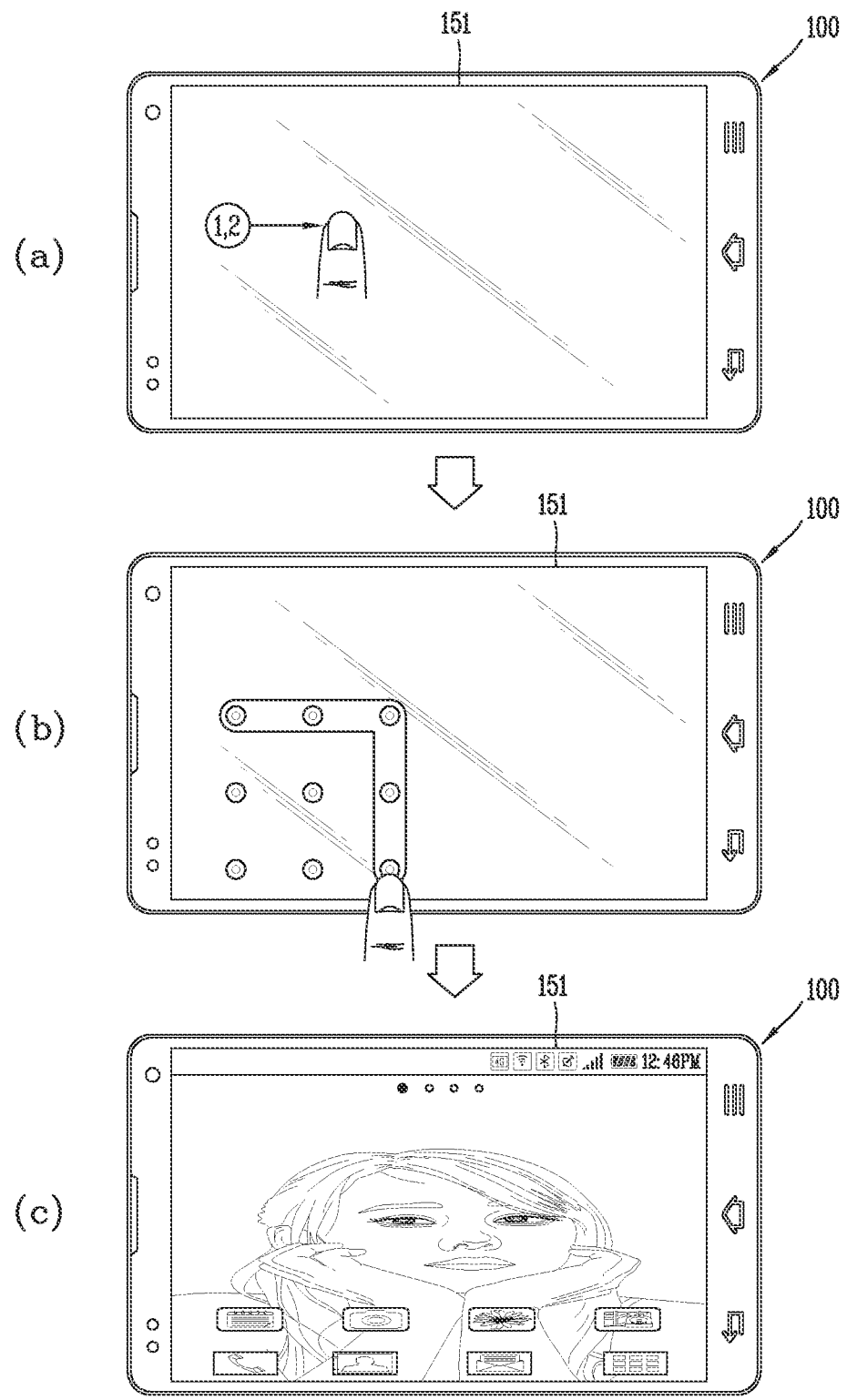

In addition, as illustrated in FIG. 27D, the display location and size of screen information for releasing a lock state may vary according to the posture of the terminal body. The controller 180 may produce a rotational angle of the body, a rotational direction of the body, a rotational speed of the body, a rotational acceleration of the body and the like using a gravity sensor, a geomagnetic sensor, an inertial sensor, a gyro sensor and the like for sensing the posture of the body, thereby determining the posture of the body. Furthermore, the controller 180 may determine the display location and size of screen information for releasing a lock state based on the posture of the body and a location at which the last tap is applied.

As a result, according to the present disclosure, a lock may not only be released according to the pattern of "knockknock" as well as released by the dragging of a touch applied subsequent to "knockknock".

Though not shown in the drawing, the controller 180 may sense a tap hitting the body as many as a reference number of times while the display unit 151 is in an inactive state, and sense a touch being consecutively moved from a location at which the last tap is sensed. At this time, the controller 180 may trace a touch trajectory while maintaining the display unit 151 in an inactive state.

On the other hand, upon releasing the touch, the controller 180 may determine whether or not a shape forming the touch trajectory matches a predetermined moving path of the touch to release a lock state. At this time, the controller 180 does not take a size of the touch trajectory or a location from which the touch trajectory is started into consideration. In other words, when a shape of the touch trajectory matches a shape of the predetermined moving path, the controller 180 can release the lock state. For example, when the moving path of the predetermined touch is "¬" and the sensed touch trajectory matches to "¬", the controller 180 releases the lock state.

In the preferred embodiment of the present invention aforementioned with reference to FIGS. 3 to 27, a motion pattern, formed by sequentially connecting points of sensed taps with one another, may be replaced by a motion pattern formed by a touch orbit which consecutively moves from a first point to a second point on the display unit 151.

Figure 28A:
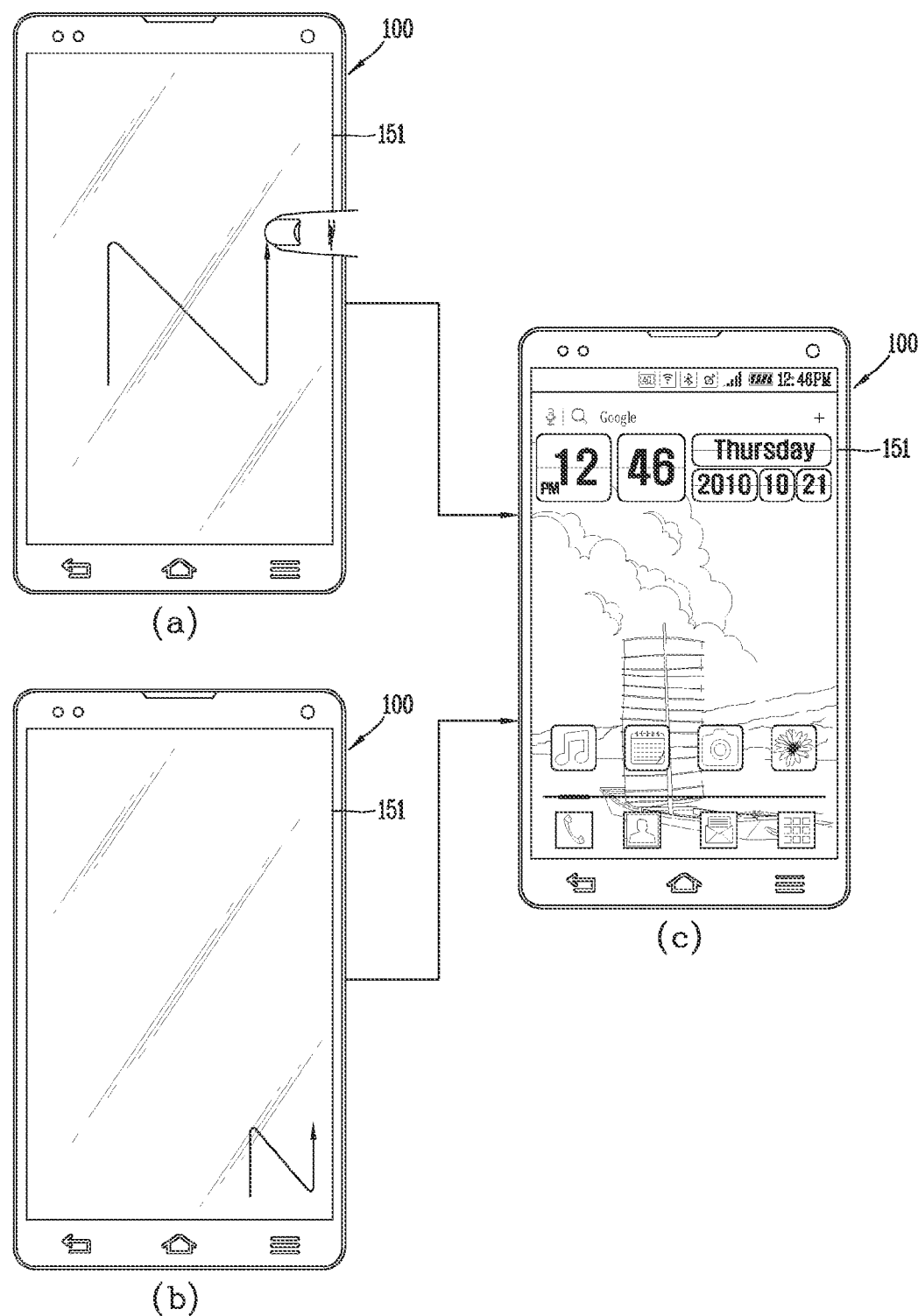

As shown in FIG. 28A, if a touch orbit applied to the display unit 151 in a deactivated state of the display unit 151 matches a preset motion pattern, the controller 180 may perform a locked-state releasing function. In this case, such locked-state releasing function may be executed if a motion pattern has the same shape as a preset motion pattern, even if the motion pattern has a different touch position and a different touch orbit size from the preset motion pattern.

As shown in FIG. 28B, a touch orbit formed by applied touches matches a preset motion pattern. If a touch is maintained (held) at a specific position, the controller 180 may release a locked state, and may display one or more preset graphic objects on the specific position.

Hereinafter, a method of controlling a function suitable to a specific situation when a mobile terminal is hit while the display unit 151 is in an inactive state will be described in more detail with reference to the accompanying drawings.

FIGS. 29A, 29B, 29C, 29D, 30A, 30B and 31 are conceptual views for explaining a method of controlling a mobile terminal in response to the mobile terminal being hit in a specific situation in a mobile terminal according to an embodiment of the present disclosure.

A mobile terminal according to an embodiment of the present disclosure may immediately perform a function pre-matched to the relevant attribute according to the attribute of a tap object or the attribute of a tap while the display unit 151 is in an inactive state.

For example, when a music play function is carried out while the illumination of the display unit 151 is turned off, the controller 180 may control a music play function in response to a tap applied to the display unit 151. For example, the controller 180 may adjust the sound (or volume) of a music being played, or switch the music being played to another music. Moreover, when a tap is applied, and then a drag input consecutively moved from an initial position at which the tap is applied is sensed, the controller 180 may control a music play function in various ways based on the sensed drag direction. Such an input is referred to as a "tap and drag".

Figure 29A:
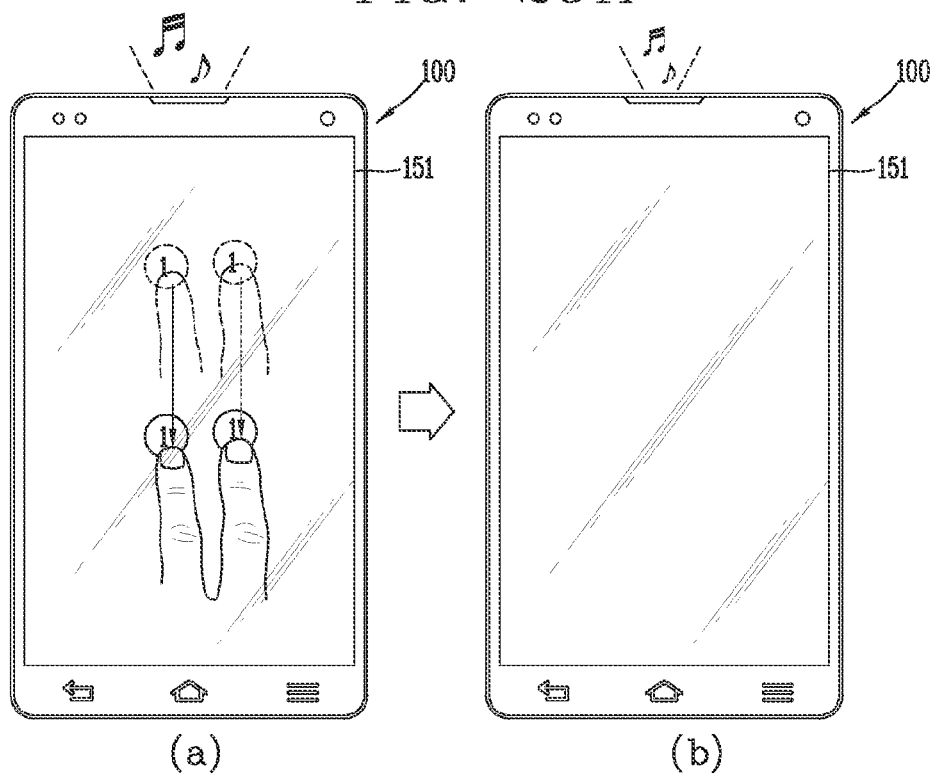
FIGS. 29A, 29B, 29C, 29D, 30A, 30B and 31 are conceptual views for explaining a method of controlling a mobile terminal in response to the mobile terminal being hit in a specific situation in a mobile terminal according to an embodiment of the present disclosure.
Figure 29B:
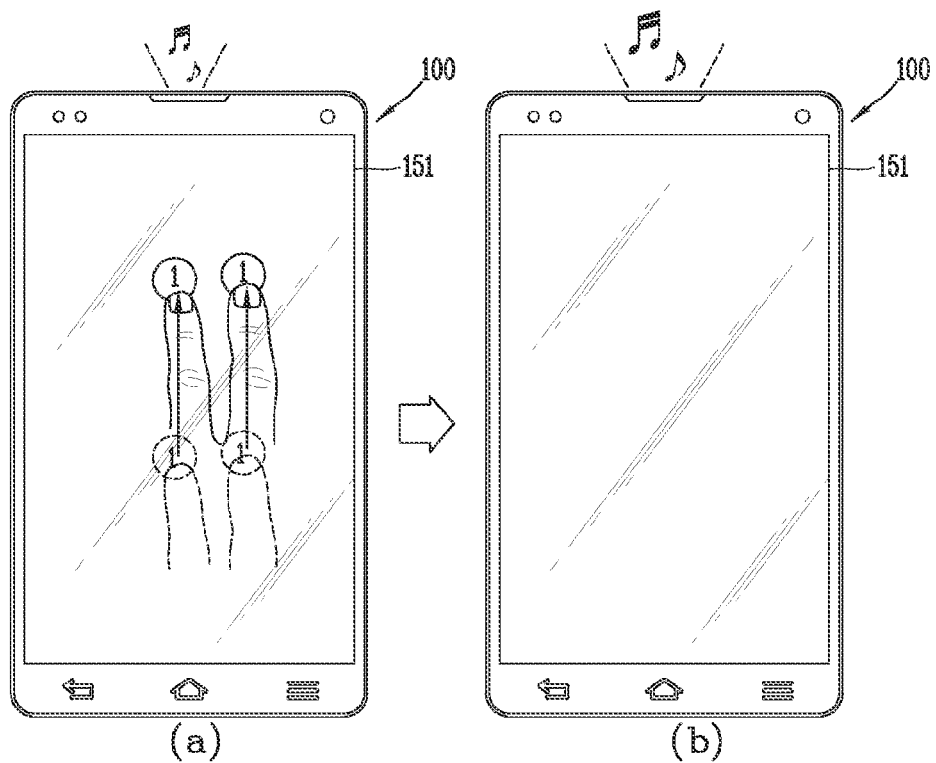

For example, as illustrated in FIG. 29A, when a first tap is applied by two tap objects and switched to a drag input consecutively moved to a lower end of the display unit 151 from a location at which the first tap is initially applied, the controller 180 may reduce the volume (or loudness). Furthermore, as illustrated in FIG. 29B, when switched to a drag input consecutively moved to an upper end of the display unit 151 from a location at which the first tap is applied, the controller 180 may increase the volume.

At this time, a change amount of volume may be controlled in a different manner based on a moving distance of the drag input. In other words, the volume may be increased or decreased in proportion to the moving distance of the drag input.

Figure 29C:
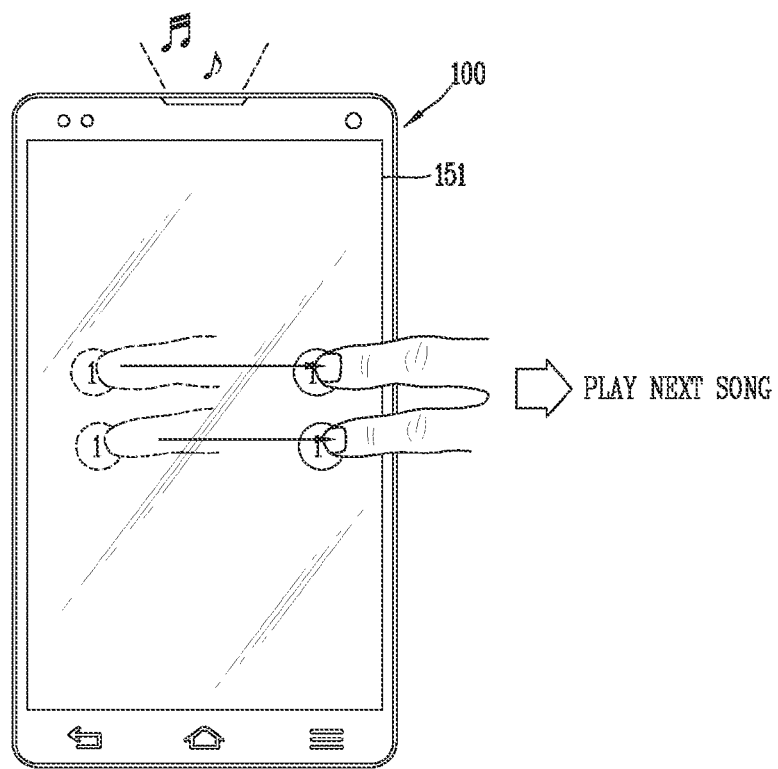
Figure 29D:
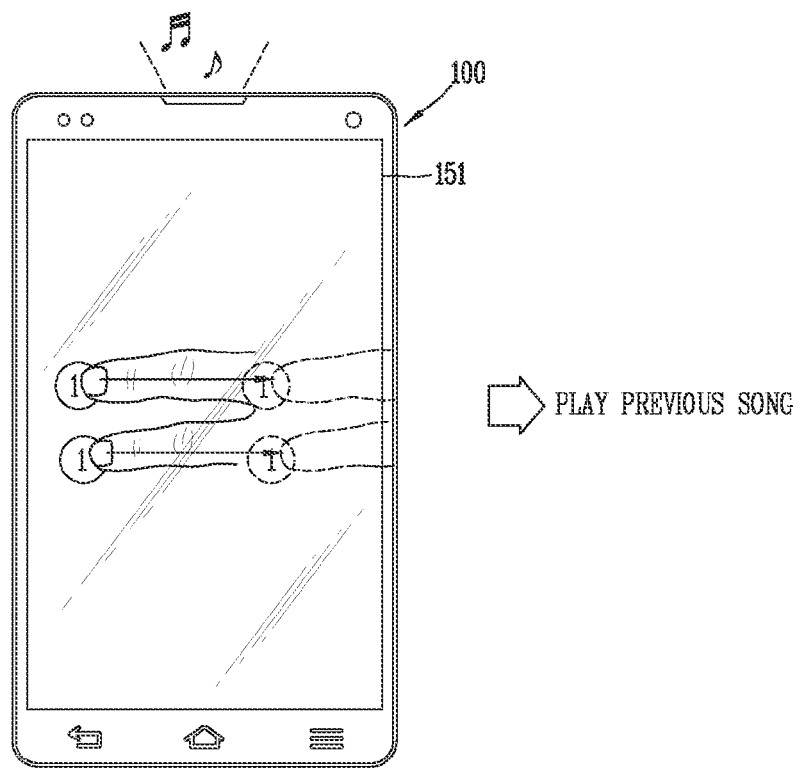

Moreover, as illustrated in FIG. 29C, when a first tap is applied by two tap objects and switched to a drag input consecutively moved to a right end of the display unit 151 from a location at which the first tap is initially applied, the controller 180 may immediately switch a music to be played next to a currently played music. Furthermore, as illustrated in FIG. 29D, when a first tap is applied by two tap objects and switched to a drag input consecutively moved to a left end of the display unit 151 from a location at which the first tap is initially applied, the controller 180 may play a music that has been played prior to a currently played music again.

In this manner, a mobile terminal according to the present disclosure may perform a different control according to the drag direction of a tap-and-drag. Furthermore, the drag direction may be a typically or ideologically recognizable direction by the user. Through this, the controller 180 may provide a more user-friendly User Experience (UX).

Figure 30A:
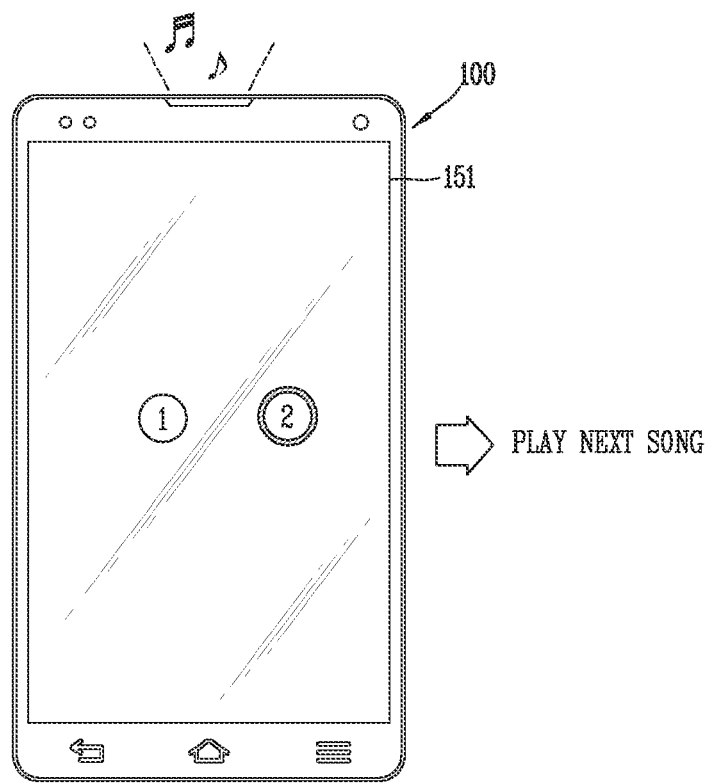
Figure 30B:
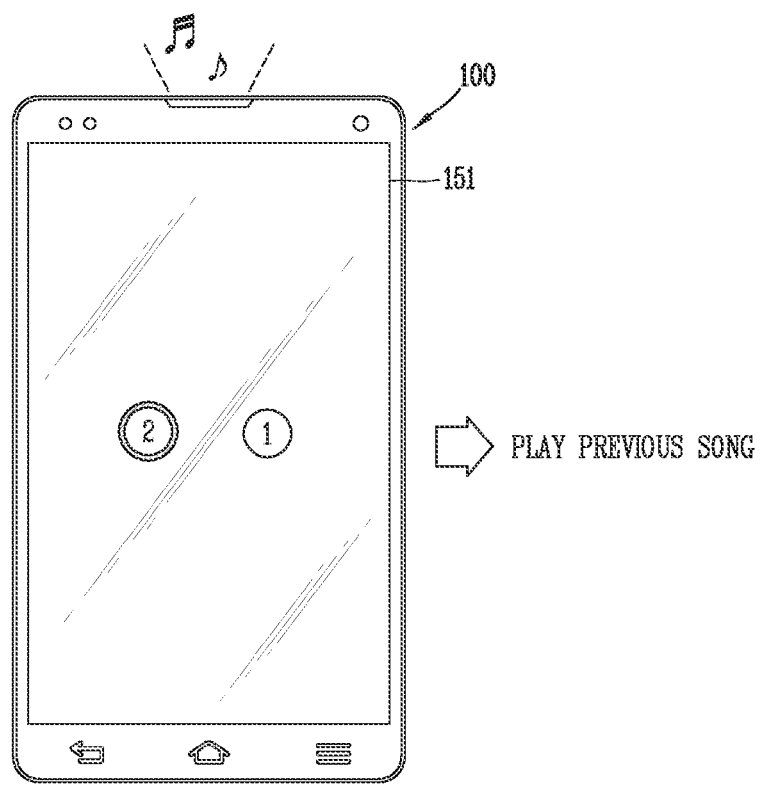

For another example, the controller 180 may adjust the volume of a music being played or switch the music being played to another music. Tap-and-hold denotes an operation that is not being released for a predetermined period of time in a state that a first tap is sensed and then a second tap is sensed within a reference period of time, and the second tap is brought into contact with the body. As illustrated in FIG. 30A, when a second tap in a tap-and-hold manner is applied to a right region on the basis of a location at which a first tap is applied, the controller 180 may immediately switch a music to be played next to a currently played music. Furthermore, as illustrated in FIG. 30B, when a second tap in a tap-and-hold manner is applied to a left region on the basis of a location at which a first tap is applied, the controller 180 may play a music that has been played prior to a currently played music again.

Figure 31:
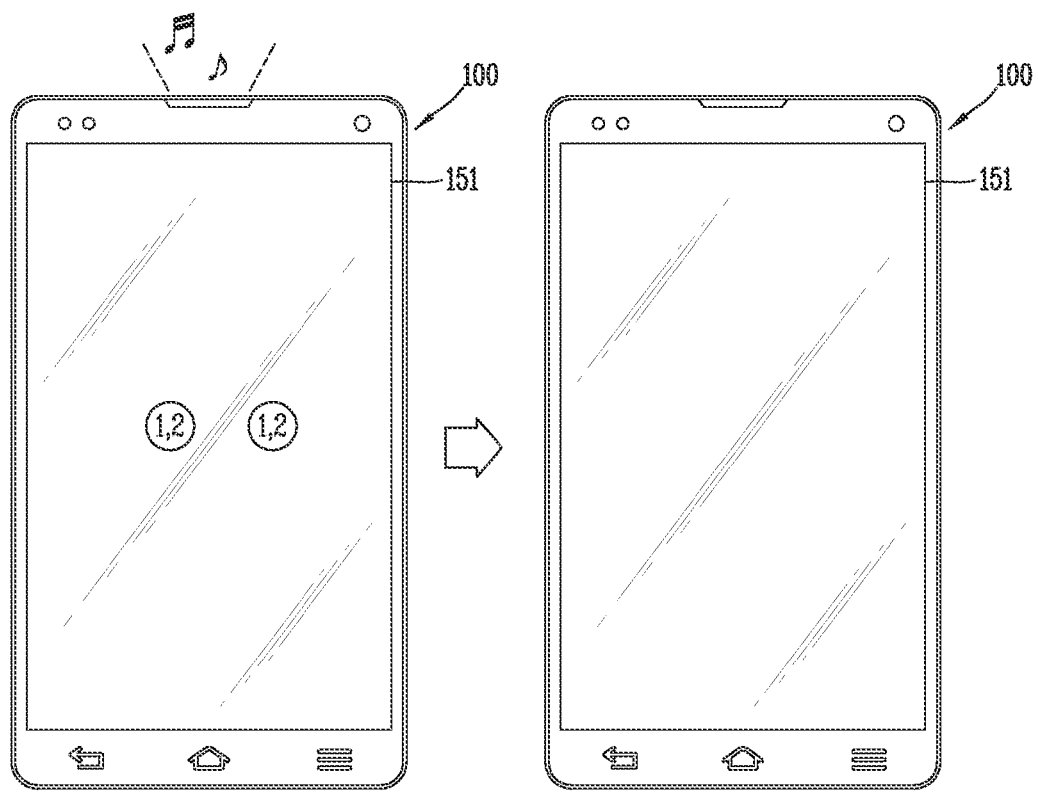

In addition, as illustrated in FIG. 31, when a first tap is sensed by two tap objects, and a second tap is sensed by the two tap objects within a predetermined period of time, the controller 180 may stop the playing of a music.

Though not shown in the drawing, when a function being executed by a tap pattern is controlled, the controller 180 may display at least one of visual, tactile and auditory schemes. For example, the controller 180 may illuminate blue light when the volume of a music is increased using a light-emitting unit (for example, light-emitting diode) disposed at a front surface of the terminal body, and illuminate red light when decreasing the volume of a music. At this time, the controller 180 may provide an intuitive interface to the user using the color or blinking of illumination according to the level of increasing or decreasing the volume. Furthermore, the controller 180 may control the brightness of the light-emitting unit 156 to become gradually brighter as increasing the volume, and to become gradually darker as decreasing the volume. In addition, when there is no functions being controlled, the controller 180 may allow the light-emitting unit 156 to blink with red light a plural number of times, thereby guiding the user that there is no functions being controlled.

On the other hand, when a multi tap is sensed at an end of the display unit 151 while the display unit 151 is in an inactive state, the controller 180 may display at least part of a curtain window in response to a touch being sensed at an end of the display unit 151.

Subsequently, when the sensed tap object is consecutively moved toward the other end thereof from a location at which the sensed tap object is sensed, the controller 180 may change the display region of the curtain window based on the movement of the tap object. For example, when a touch is consecutively moved in the downward direction from an upper one position of the display unit 151, the controller 180 may expand the display region of the curtain window from the upper end of the display unit 151 to a location at which the touch is completed. In other words, the controller 180 may generate an animation effect, such as the curtain window coming down from the upper end thereof.

Figure 32A:
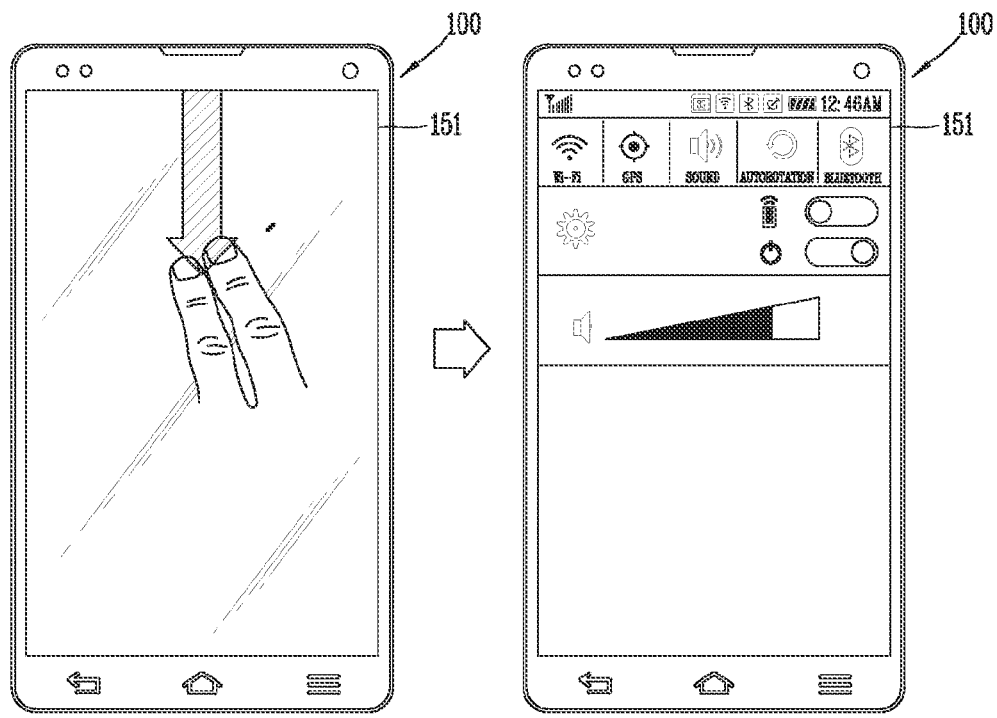
FIGS. 32A and 32B are views for explaining a method of displaying different curtain window according to a tap-applied location in a mobile terminal according to an embodiment of the present disclosure.

On the other hand, in a mobile terminal according to an embodiment of the present disclosure, the controller 180 may display different execution screens whether a multi tap is sensed at an upper or lower end of the display unit 151. For example, as illustrated in FIG. 32A, when a multi tap is sensed, and then a tap object is dragged from an upper end to a lower end thereof, the controller 180 may display a setting screen. The setting screen is to change a setting value associated with terminal, and may include objects for easily changing a Wi-Fi mode, a Bluetooth mode, and the like using a touch. In addition, when an event occurs such as received text, missed call or the like in the terminal, it may include notification information notifying the occurred event to the user.

Figure 32B:
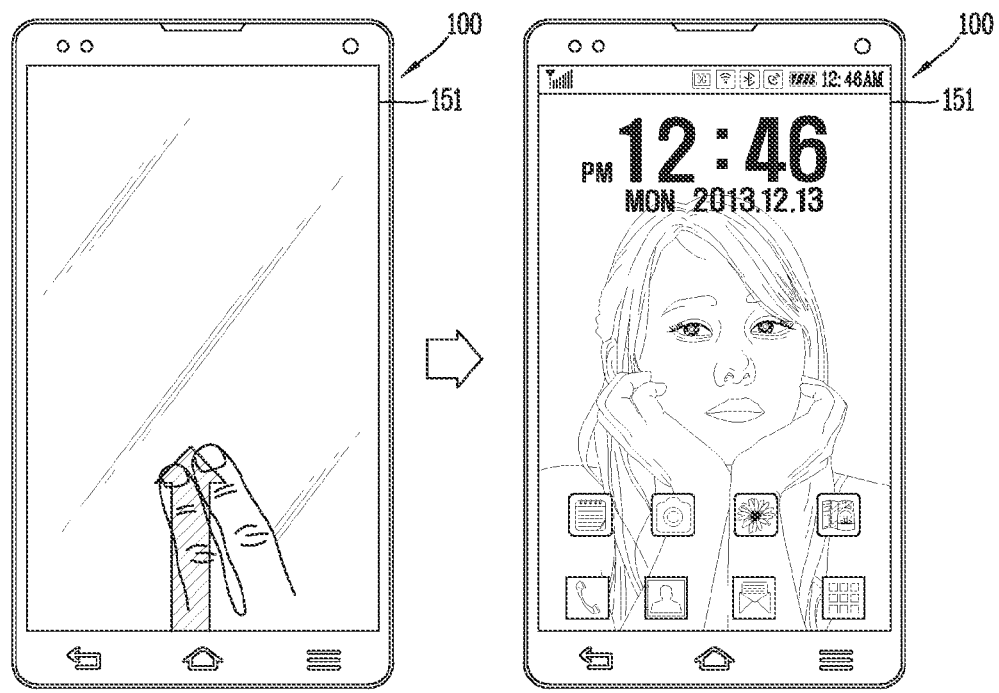

Moreover, as illustrated in FIG. 32B, when a multi tap is sensed at a lower end thereof and a tap object is dragged from the lower end to an upper end thereof, executable application icons may be displayed along with images.

The mobile terminal according to the present invention can have the following advantages.

As aforementioned, the controller 180 may perform a locked-state releasing function, based on a motion pattern formed by a plurality of taps in a deactivated state of the display unit 151. A user can convert a locked state of the mobile terminal into a released state in a simple manner, e.g., by knocking on an object such as the display unit 151. Accordingly, a new user interface can be provided, and thus a user's convenience can be enhanced.

The aforementioned method may be implemented as a program code stored in a computer-readable storage medium. The storage medium may include ROM, RAM, CD-ROM, a magnetic tape, a floppy disc, an optical data storage device, etc. The storage medium may be implemented as carrier wave (transmission through the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen configured to switch between an inactivated state in which illumination is not applied to the touch screen and an activated state in which illumination is applied to the touch screen; and
a controller configured to release a locked state of the mobile terminal and switch the touch screen to the activated state, when a plurality of touch inputs is input in the inactivated state and the plurality of touch inputs matches a predefined pattern,
wherein the predetermined pattern is initially set using a quadrant image displayed on the touch screen in the activated state,
wherein touch inputs for setting the predetermined pattern are applied to at least one of quadrant I, II, III and IV included in the quadrant image displayed on the touch screen in the activated state of the touch screen,
wherein a first touch input included in the plurality of touch inputs in the inactivated state is applied to the touch screen,
wherein quadrant areas on the touch screen for receiving the plurality of touch inputs in the inactivated state change based on a first touch position of the first touch input and a second touch position of a second touch input of the plurality of touch inputs in the inactivated state, and
wherein the controller is further configured to set the quadrant areas on the touch screen based on the positions of the first and second touch inputs.

2. The mobile terminal of claim 1, wherein the controller sets the quadrant areas to be smaller when the first and second touch inputs are closer together and sets the quadrants areas to be larger when the first and second touch inputs are farther apart.

3. The mobile terminal of claim 1, wherein the plurality of touch inputs include consecutive touch inputs on the quadrant areas in any numbered order and shape that matches a predetermined passcode.

4. The mobile terminal of claim 3, wherein the shape of the predetermined pattern is defined by connecting points of the plurality of touch inputs.

5. The mobile terminal of claim 1, wherein the quadrant areas occur anywhere on the touch screen such that the predetermined pattern can be input anywhere on the touch screen in the inactivated state.

6. The mobile terminal of claim 1, wherein the plurality of touch inputs occur on a lower left hand corner or lower right hand corner of the touch screen such that the predetermined pattern can be input via a thumb of a hand holding the mobile terminal.

7. The mobile terminal of claim 1, wherein the inactivated state of the touch screen is free of any guide for inputting the predetermined pattern in order to release the locked state of the mobile terminal.

8. The mobile terminal of claim 1, wherein the controller is further configured to display a home screen or a most recently used screen when the locked state of the mobile terminal is released.

9. The mobile terminal of claim 1, wherein the controller is further configured to turn on a light emitting element with a first color when the plurality of touch inputs match the predetermined pattern and turn on the light emitting element with a second color when the plurality of touch inputs do not match the predetermined pattern.

10. The mobile terminal of claim 1, wherein the controller is further configured to release the locked state of the mobile terminal when the plurality of touch inputs match the predetermined pattern without displaying a passcode screen for entering a passcode for releasing the locked state.

11. The mobile terminal of claim 1, wherein the controller is further configured to maintain the inactivated state of the touch screen and the locked state of the mobile terminal when the plurality of touch inputs do not match the predetermined pattern.

12. The mobile terminal of claim 11, wherein the controller is further configured to switch the inactivated state of the touch screen into the activated state and display a lock screen with a password window for releasing the locked state of the mobile terminal, if the plurality of touch inputs are input incorrectly a set number of times without matching the predetermined pattern.

13. The mobile terminal of claim 12, wherein the controller is further configured to output guidance information indicating that the plurality of touch inputs applied on the touch screen do not match the predetermined pattern.

14. The mobile terminal of claim 1, wherein the controller determines that the plurality of touch inputs matches the predefined pattern based on an orientation of the mobile terminal when receiving the plurality of touch inputs.

15. The mobile terminal of claim 1, wherein the quadrants areas on the touch screen are equal areas.

16. A method of controlling a mobile terminal, the method comprising:
switching, via a touch screen, between an inactivated state in which illumination is not applied to the touch screen and an activated state in which illumination is applied to the touch screen; and
releasing, via the controller, a locked state of the mobile terminal and switching the touch screen to the activated state, when a plurality of touch inputs is input in the inactivated state and the plurality of touch inputs matches a predefined pattern,
wherein the predetermined pattern is initially set using a quadrant image displayed on the touch screen in the activated state,
wherein touch inputs for setting the predetermined pattern are applied to at least one of quadrant I, II, III and IV included in the quadrant image displayed on the touch screen in the activated state of the touch screen,
wherein a first touch input included in the plurality of touch inputs in the inactivated state is applied to on the touch screen,
wherein quadrant areas on the touch screen for receiving the plurality of touch inputs in the inactivated state change based on a first touch position of the first touch input and a second touch position of a second touch input of the plurality of touch inputs in the inactivated state, and wherein the method further comprises setting, via the controller, the quadrant areas on the touch screen based on the positions of the first and second touch inputs.

* * * * *